United States Patent [19]
Nezu

[11] Patent Number: 5,970,228
[45] Date of Patent: Oct. 19, 1999

[54] METHOD OF MAINTAINING SECURITY IN A COMMON OUTPUT MEANS AND SYSTEM FOR MAINTAINING SECURITY

[75] Inventor: Mitsumasa Nezu, Kawasaki, Japan

[73] Assignee: Fujitsu Limited, Kanagawa, Japan

[21] Appl. No.: 08/789,964

[22] Filed: Jan. 31, 1997

Related U.S. Application Data

[62] Division of application No. 08/267,598, Jun. 28, 1994, Pat. No. 5,638,511.

[30] Foreign Application Priority Data

Jun. 28, 1993 [JP] Japan .................................. 5-157215
Jun. 24, 1994 [JP] Japan .................................. 6-143517

[51] Int. Cl.⁶ .............................................. G06F 11/00
[52] U.S. Cl. ..................................... 395/186; 271/287
[58] Field of Search ................................ 271/278, 207, 271/287, 288, 298, 58; 395/186, 187.01

[56] References Cited

U.S. PATENT DOCUMENTS 5,308,058  5/1994  Mandel et al. .......................... 271/201
5,358,238  10/1994 Mandel et al. .......................... 271/298
5,435,544  7/1995  Mandel .................................. 271/298

*Primary Examiner*—Robert W. Beausoliel, Jr.
*Assistant Examiner*—Nadeem Iqbal
*Attorney, Agent, or Firm*—Helfgott & Karas, P.C.

[57] ABSTRACT

A common output unit such as a print server maintains security when an output request unit, serving as a client, sends a job to be processed to the output unit. The output unit accepts and puts the job in queue. The output unit then creates a collation key that is sent back to the output request unit, which stores the collation key in a storage medium. The output unit searches the storage medium for the collation key and processes the queued job corresponding to the collation key. The print server includes a locked stacker and an ordinary stacker to minimize the output waiting time of the print job.

25 Claims, 35 Drawing Sheets

Fig.9(a)

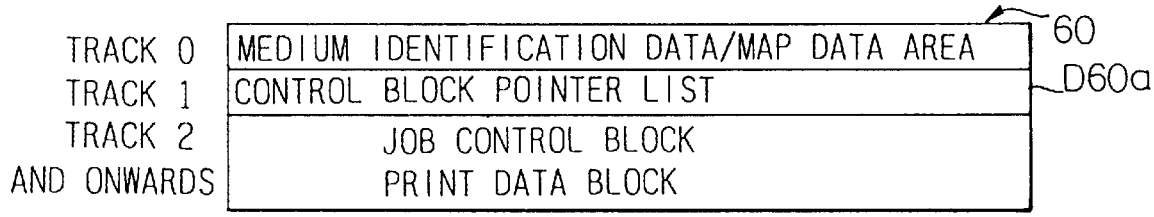

| | | |
|---|---|---|
| TRACK 0 | MEDIUM IDENTIFICATION DATA/MAP DATA AREA | 60 |
| TRACK 1 | CONTROL BLOCK POINTER LIST | D60a |
| TRACK 2 AND ONWARDS | JOB CONTROL BLOCK<br>PRINT DATA BLOCK | |

Fig.9(b)

CONTROL BLOCK POINTER — D61

| | |
|---|---|
| PRINT SERVER ADDRESS/ID | D61a |
| JOB CONTROL BLOCK POINTER | D61b |
| JOB CONTROL BLOCK NEST COUNTER | D61c |

Fig.9(c)

JOB CONTROL BLOCK — D62

| | |
|---|---|
| JOB CONTROL BLOCK POINTER | D62a |
| CLIENT'S ADDRESS/ID | D62b |
| RECEPTION DATE AND TIME | D62c |
| RETENTION PERIOD | D62d |
| RETENTION PERIOD END PROCESS FLAG | D62e |
| LENGTH OF RECEIVED DATA | D62f |
| JOB NAME | D62g |
| COLLATION KEY | D62h |
| PRINT DATA BLOCK POINTER | D62i |
| RESERVE | D62j |

Fig.9(d)

PRINT DATA BLOCK — D63

| | |
|---|---|
| PRINT DATA BLOCK POINTER | D63a |
| DATA DIVISION FLAG | D63b |
| DATA LENGTH | D63c |
| PRINT DATA | D63d |

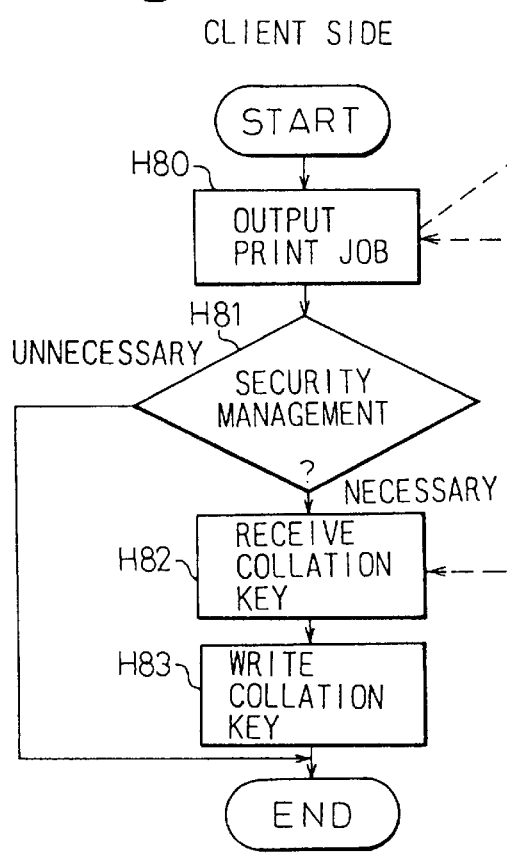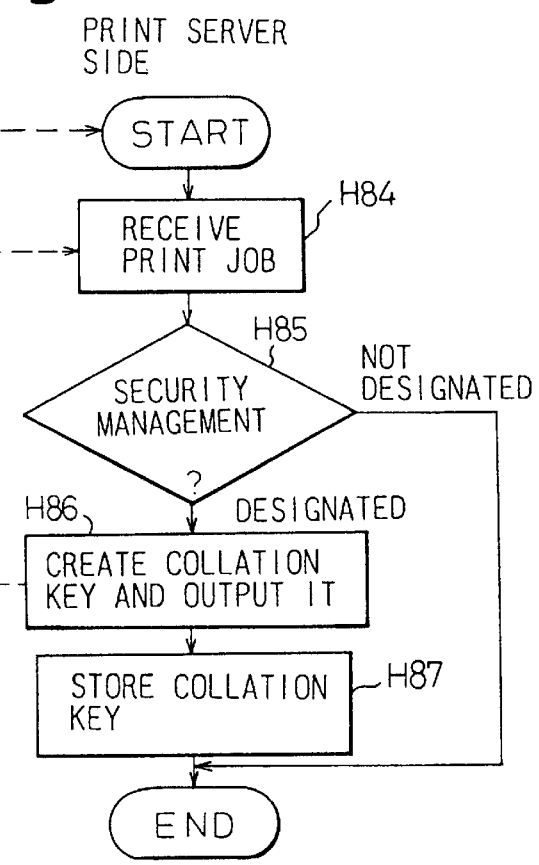

FORMAT OF MEDIUM

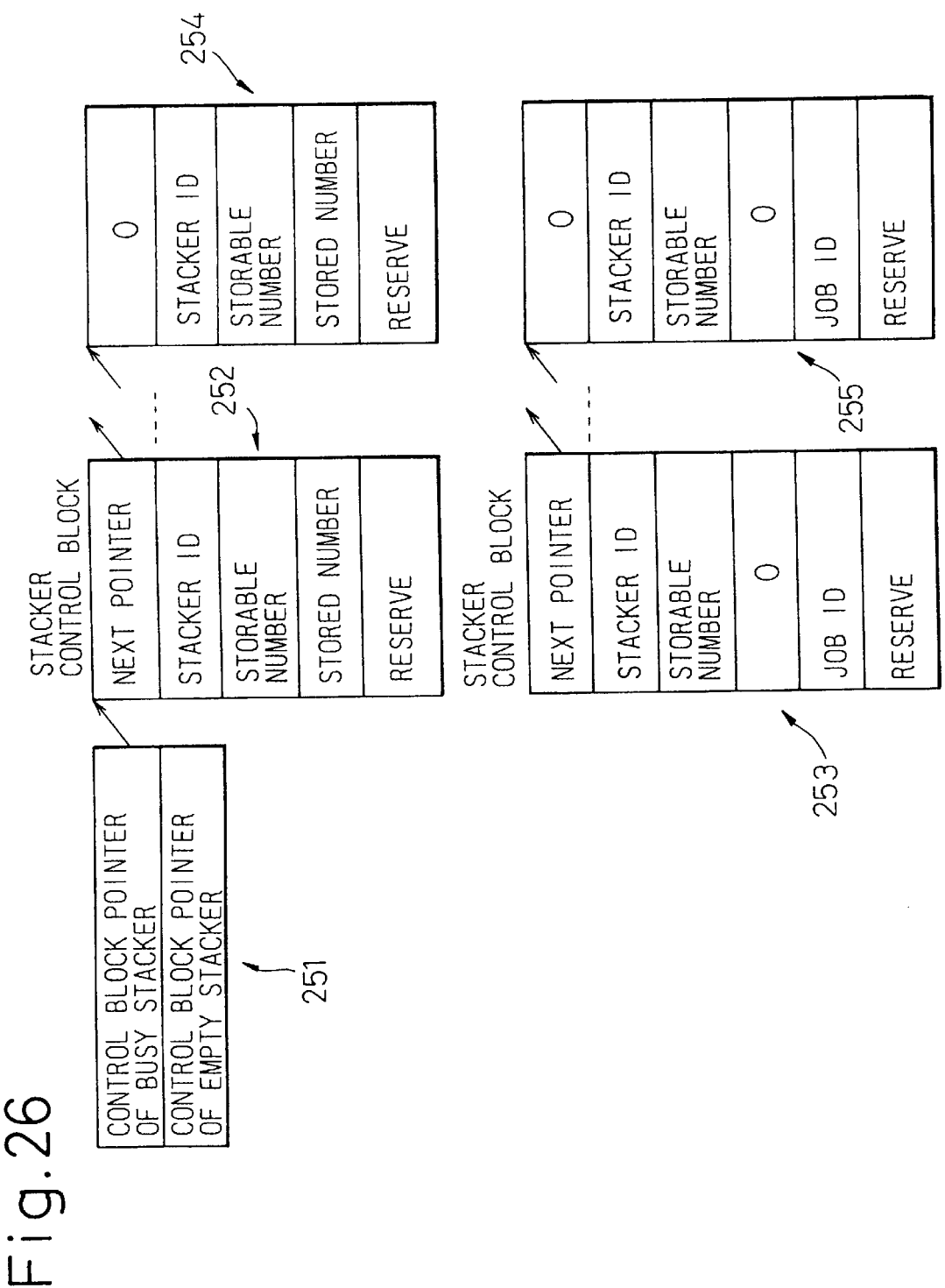

METHOD OF MAINTAINING SECURITY IN A COMMON OUTPUT MEANS AND SYSTEM FOR MAINTAINING SECURITY

This is a division of application Ser. No. 08/267,598, filed Jun. 28, 1994, now U.S. Pat. No. 5,638,511.

BACKGROUND OF THE INVENTION

1. Field of the Invention The present invention relates to a method of maintaining security in a common output means such as a print server and to a system for maintaining security for realizing the method of maintaining security. More specifically, the invention relates to a method of maintaining security which guarantees security in the common output means such as printer means represented by a network printer that is used in common by clients such as a plurality of personal computers, as well as to a system for maintaining security adapted to such a method.

In an environment where there exist many clients and at least one or more print servers, it is a tendency that less and less printers are now locally connected to clients but, instead, one or more network printers are used in common via a network such as LAN (local area network). The present invention is adapted to a constitution having a print server that is used in common being connected to the LAN but is in no way limited thereto only.

2. Description of the Related Art

In an apparatus including a printer as an output means (i.e., a printer and its peripheral units, as usually called printer unit), it is not desired to provide many printer units despite there are many people who use the printer unit, since provision of many printer units decreases space efficiency in an office.

Moreover, improved printing performance is accompanied by an increase in the cost of the printer unit, and provision of such expensive printer units in great numbers must be avoided from the standpoint of installation cost, as well.

In general, inquiries about the print jobs and the preferential process input by the clients can be carried out by a management function of a common internal spool for holding print job of a print server or a file server (inclusive of processing of the server acted by the client). In recent years, furthermore, there can be contrived a LAN environment which carries out the operation in a simplified manner by omitting dedicated server systems but using a network printer that has a large capacity of memory for the internal spool. In this case, the print jobs thrown into the internal spool of the network printer by the individual clients are queued in the spool and are then output usually in the form of first-in, first-out (FIFO).

Because of such backgrounds, therefore, one or more common print servers are now used under most LAN environments. FIG. 1 is a diagram illustrating the constitution of a conventional print server. A print server 505 is generally constituted by a printer unit 503 and a work-station 502.

The work-station 502 is connected to a network 504, and the printer unit 503 is connected to the work-station 502. In this constitution, the print job is received by the work-station 505 via the network 504.

The received print jobs are determined for their order of printing by way of control by the work-station 502 according to a predetermined rule such as order of decreasing priorities, order of reception, etc., and are printed by the printer unit 503.

The print jobs are designated by so-called clients 500 to 501 connected to the same network 504. Being controlled by the work-station 502, the printer unit 503 is used in common by the plurality of clients 500 and 501.

It is now presumed that a user A throws in a print job "a" through the client 500 that must be kept secret from other persons. Then, another user B throws in a print job "b" through the client 501.

Under this condition, if the user B comes over to the print server 505 earlier than the user A while the print job "a" thrown in by the user A is being printed, then, the output result of the print job "a" which the user A wishes to keep secret may be watched by the user B, i.e., the printed result of the printer unit may be watched by the user B. Besides, there is a likelihood that the printed result may be obtained by the user B.

In the conventional constitution of using the print server in common, therefore, the user A must go to the print server 505 immediately after he has thrown in the print job if he wishes to keep it secret. Despite of rushing to the print server 505, however, the printing may have already been executed or, conversely, the print job that is thrown in may have been waiting for a long period of time until other print jobs are done.

If locally dedicated printer units are made available to only limited persons, on the other hand, the merit of saving the cost by using a printer unit in common eliminating the individual printer units, is not sufficiently exerted and, besides, the problem of unfairness takes place in that the chances for outputting confidential print jobs are restricted only to limited number of persons.

Moreover, even when a printer unit dedicatedly used for security output only is provided, there develops the same problem as the one described above, in the case where it is used in common by more than one persons.

Furthermore, even when the printer unit is equipped with locked stackers, it will be difficult to assign one such locked stacker for each person who wishes to use the printer unit without arousing the problem of unfairness. If a plurality of users are assigned to one stacker in order to increase the number of persons who use the printer unit, the secrecy will be easily broken depending upon the manner of using the keys.

In an environment in which the printer unit is used in common as described above, it is difficult to easily output the prints that should be kept secret from other persons. It has therefore been desired to provide a method of maintaining security without losing the merit of using the printer unit in common.

SUMMARY OF THE INVENTION

The present invention was accomplished in view of the above-mentioned problems, and its first object is to provide a method of maintaining security in a common output means, which is capable of guaranteeing security for the output results of print jobs in a constitution in which an output means such as a print means represented by a network printer is used in common by a plurality of clients without losing the merit of saving the cost which stems from the omission of the individual printer units as a result of using the output means in common.

A second object of the present invention is to provide a system for maintaining security for easily executing the method of maintaining security in the common output means maintaining high space efficiency.

A third object of the present invention is to provide a system for maintaining security which minimizes the waiting time necessary for a user utilizing the common output means until the print job is output.

To attain the above objects, the method of maintaining security in a common output means has an output request means that designates output process, i.e., a job to be processed, to a predetermined output means which executes the output process upon receiving a designation from output request means.

When the output means is designated by the output request means, the output means receives the output process but holds the execution of the output process, and forms a necessary collation key and sends it to the output request means, and the output request means stores the collation key that is sent in a storage medium, and, upon finding the collation key as a result of retrieving the contents stored in the storage medium, the output means executes the output process that is held (namely, put in a queue) and that corresponds to the collation key.

Desirably, upon finding the collation key as a result of retrieving the contents stored in the storage medium, the output means executes the output process that is held and that corresponds to the collation key taking the precedence over other output processes.

More desirably, the output means cancels the holding of the output process when the time for holding the output process exceeds a predetermined maximum retention period.

More desirably, the maximum retention period can be arbitrarily set. The method of canceling the holding of the output process can be arbitrarily set, too.

More desirably, the output means 2 informs the output request means of the state of the output process that is held.

More desirably, in the method of maintaining security in a common output means according to the present invention, the conditions for the output process that is held can be set again.

According to a preferred embodiment of the present invention, a print server used for the system for maintaining security or the present invention is connected to a network and executes the output process by receiving the print jobs via the network connected thereto. Furthermore, security is guaranteed concerning the output of the print server in the case where the print server of the invention is commonly used as a common output means. Here, the print server comprises a print job storage means for storing the print job received through the network, a collation key-forming means which forms a collation key for the print job that is stored and outputs it to the network, a collation key storage means for storing the collation key formed by said collation key-forming means, a storage medium read means for reading the contents stored in a storage medium in the print server, and a control means which retrieves the contents stored in the storage medium via the storage medium read means, reads the print job corresponding to the collation key from the print data storage means when a collation key coincident with the collation key stored in the collation key storage means is found, and starts processing the print job.

Desirably, a means connected to said network in the print server, the collation key-forming means, the collation key storage means, the storage medium read means and the control means are provided inside a printer unit.

In the case where the print server of the present invention is commonly used as a common output means by a plurality of clients, each of the plurality of clients comprises a storage medium write means that rewrites the contents stored in the storage medium in the client, and a control means which, when the print job is designated via the network, receives a collation key via the network and writes the collation key into the storage medium via the storage medium write means.

According to a preferred embodiment of the present invention, furthermore, the system for maintaining security has a plurality of clients connected to a network to designate print jobs via the network connected thereto, has a print server which receives the print jobs designated from said plurality of clients and executes the output process, and guarantees security concerning the output of the print server in the case when the print server is used in common by the plurality of clients, wherein the print server is provided with a storage medium drive unit for driving the storage medium having the same specifications as that of the case of the clients, and is further provided with a locked stacker having a structure in which a portion for taking out the output result is locked in addition to a stacker for an ordinary output without function for locking the output result, and the locked stacker can be designated to a destination of output concerning the print jobs that are thrown in from the clients onto the network.

In this case, based upon the management of the state of using the locked stackers, the process is executed on the side of the print server in regard to which locked stacker be assigned to the print job and then management data related to the print job are sent to the side of the clients, and it is possible to output the print job into the locked stacker of the print server, and after the management data are stored in the storage medium, the storage medium is separately loaded in the storage medium drive unit of the print server on the side of the clients, and, upon loading the storage medium, the electronic lock of the corresponding locked stacker is unlocked to take out the output result from the locked stacker.

More desirably, in the system for maintaining security according to an embodiment of the present invention, provision is made of a control unit for controlling a variety of print jobs between the client and the print server, the control unit so controls the internal spool and the internal memory in the print server as to cope with either a print job for an ordinary output or a print job that designates the locked stacker to the destination of output, in order to maintain security equivalent to that of a locally connected printer, even in the case where the print server is used in common and to realize preferential output to the stacker for an ordinary output or to the locked stacker.

More desirably, in a system for maintaining security according to an embodiment of the present invention, the locked stacker is designated to a destination of output, and the print server is allowed to designate the operation for changing the mode of the subsequent output process concerning a print job that is being output or is going to be output to the locked stacker.

More desirably, in a system for maintaining security according to an embodiment of the present invention, on the side of the client are written a variety of management data of the storage medium that are received from the side of the print server, the variety of management data indicating that the process including the print job that designates said locked stacker to the destination of output can be done, and said print server discriminates a variety of management data that are written.

More desirably, in a system for maintaining security according to an embodiment of the present invention, the electronic lock of the locked stacker is unlocked by safe and reliable collation checking which is based upon storage data that cannot be known from outside the common storage medium of the client and the print server.

More desirably, in a system for maintaining security according to an embodiment of the present invention, a paper sensor is provided in the stackers that need be checked in the print server that is equipped with one or more locked stackers, in order to check whether or not the output result of the print job is reliably taken out from the stackers, and an alarm is produced or preventive measure is taken to prevent the output result from not being taken out.

More desirably, in a system for maintaining security according to an embodiment of the present invention, provision is made of a mechanism that prevents the storage medium from being taken out as a measure for preventing the output result of the print job from not being taken out.

More desirably, in a system for maintaining security according to an embodiment of the present invention, vacant state of the locked stacker is managed for each of the locked stackers based upon the data from the paper sensors in the locked stackers in order to grasp the vacant state related to presence or absence of the papers for outputting the print jobs, and a locked stacker needed by the client is reliably assigned or returned depending upon the management of the vacant state.

More desirably, in a system for maintaining security according to an embodiment of the present invention, the locked stacker requested by the client is not only assigned in a fixed manner but is also assigned and returned dynamically and reliably.

More desirably, in a system for maintaining security according to an embodiment of the present invention, the electronic lock of the locked stacker can be unlocked as required by using a storage medium storing a master code of a person who manages the print server, in order to cope with trouble in the system for maintaining security or to cope with long-term occupation of the locked stacker.

More desirably, in a system for maintaining security according to an embodiment of the present invention, it is allowed to output again the output result of the print job by holding the data of the print job within the internal spool in the print server until the storage medium is unloaded from the print server, in order to cope with damage concerning the output result of the print job in the locked stacker.

More desirably, in a system for maintaining security according to an embodiment of the present invention, the locked stackers are each provided with a paper sensor for grasping the vacant state related to the presence or absence of the papers for outputting the print jobs, a processed mark is imparted at a moment when it is detected by the paper sensor that the output result of the print job is taken out from the locked stacker, and the data of the storage medium related to the print job with the processed mark is deleted when the storage medium is loaded again in the client or in the print server.

More desirably, in a system for maintaining security according to an embodiment of the present invention, the locked stackers are each provided with an intra-stacker full sensor for checking whether or not the papers for outputting the print job are fully stacked in the corresponding locked stackers, output to the locked stacker is discontinued during the output process of the print job based upon the data from the intra-stacker full sensors, and another locked stacker is assigned to output the remaining non-processed print job.

More desirably, in a system for maintaining security according to an embodiment of the present invention, when it is not allowed to assign the print job to another locked stacker, a mark is attached to the position of the output process-done data of the print job, another job is processed while temporarily holding the print job, and when any locked stacker is placed in an empty state, the output result of the print job corresponding to the temporarily held job is output in the locked stacker.

More desirably, in a system for maintaining security according to an embodiment of the present invention, the client is allowed to determine a mode of output process of the print job by inquiring the print server whether the locked stacker can be utilized or not prior to transmitting the security designated job for designating the locked stacker to the destination of output concerning the print job thrown into the network.

More desirably, in a system for maintaining security according to an embodiment of the present invention, a maximum retention period that corresponds to a maximum value of the retention time for holding the print job as a temporarily held job is set in the internal spool of the print server after the security designated job is received for designating the locked stacker to the destination of output but before executing the output process of the print job.

More desirably, in a system for maintaining security according to an embodiment of the present invention, when the retention time for holding said print job as a temporarily held job has exceeded the maximum retention period, the security designated job corresponding to the job being temporarily held is set to either a mode of being deleted from the internal spool or a mode of being treated and output as a print job for an ordinary output after the holding of the output process of the print job has been canceled.

More desirably, the client is allowed to request, to the print server, a retention period for temporarily holding the print job as a temporarily held job together with the throwing of the security designated job onto the network to designate the locked stacker to the destination of output, and the print server employs the maximum retention period as a retention period to store it in the internal memory of the print server when the value of the retention period requested by the client is longer than the maximum retention period, employs the requested retention period as a retention period and stores it in the internal memory of the print server in other cases, and transmits the contents stored in the internal memory to the client together with various data in order to obtain agreement between the client and the print server in regard to which one of the requested retention period or the maximum retention period be employed.

More desirably, the client is allowed, at the same time, to request, to the print server, a method of handling the security designated job as to whether or not the security designated job corresponding to the temporarily held job should be deleted from the internal spool in the print server after the employed retention period has passed or be handled and output as a print job for an ordinary output after the holding of the output process of the print job has been canceled, and when the method of handling the security designated job is requested from the client and when the time for holding the print job as a temporarily held job has exceeded the maximum retention period, the print server regards the contents requested by the client to be effective taking the precedence over the process of setting either to a mode of deleting the security designated job that corresponds to the temporarily held job from the internal spool or a mode of handling and outputting the security designated job as a print job for an ordinary output after the holding of the output process of the print job has been canceled, and when no request is issued from the client, the print server regards the contents of the process that should be set to either one of the modes to be effective, and stores it in the internal memory in the print server and sends it to the client together with various data.

According to the method of maintaining security in the common output means of the present invention, the output process designated by the output request means is received by the output means, but its execution is held in the case where the security designated job uses an ordinary output stacker.

In order that the output process that is held is executed by the output means, the user must possess a storage medium recording a collation key issued to the above output process that was received by the output means.

That is, the execution of the output process is reliably held until the user who has designated the output process arrives at the output means carrying the storage medium in person, and the output process is executed in the presence of the user.

According to the above-mentioned method of maintaining security in the common output means, the output is executed in the presence of the user. Even when the output means is used in common, therefore, it is possible to prevent the output result from being watched by other person or from being obtained by other person. Thus, security is reliably maintained concerning the output result of the output means.

Furthermore, the output process that must maintain security is executed with priority in the presence of the person who requested the output process. Therefore, according to the above-mentioned method of maintaining security in the common output means, the user who came to the output means to receive the output result that must be kept secret is liberated from the need of waiting for an extended period of time.

According to the above-mentioned method of maintaining security in the common output means, furthermore, the holding of the output process is necessarily canceled after it is executed or after some time has passed even when it is not executed. It is therefore made possible to avoid the storage region of the output means from being filled with the output processings that are held.

According to the above-mentioned method of maintaining security in the common output means, furthermore, it is allowed to set a period before the holding of the output process is forcibly canceled, enabling the user to use the system more freely.

According to the method of maintaining security in the common output means, furthermore, it is allowed to designate the method of canceling the holding, enabling the user to use the system more freely. Here, the method of canceling the holding stands for deleting the output process that is held, canceling the holding of the output process, etc.

According to the above-mentioned method of maintaining security in the common output means, furthermore, it is allowed to know the state of the output process that is held, enabling the user to use the system more freely. Here, the state of the output processing that is held stands for whether the output process is still held or not.

According to the above-mentioned method of maintaining security in the common output means, furthermore, it is allowed to set again the conditions for the output process that is held. Here, the conditions for the output process that is held include a period until the holding is forcibly canceled, deletion of the output process that is held and cancellation of the holding of the output process.

In the print server used in the system for maintaining security, furthermore, the user must possess the storage medium recording the collation key issued to the print job from the collation key-forming means, in order to process the print job that is held. Execution of the print job is reliably held until a person who has requested the print job arrives at the print server or output means.

That is, the print process of the print job is executed in the presence of the person who has requested the process. It is therefore made possible to prevent the printed result (output result of the print server) from being watched by other person or from being obtained by other person. Moreover, since the above printing is executed taking the precedence over the other printings, the user who has come to the apparatus does not have to wait for long (In this case, unlike the case of a locked stacker that will be hereinafter described, the user may have to wait for a short time until the output process is completed).

Furthermore, in the print server, in which the printer unit is directly connected to the network, the conventionally used work station is not necessary, the apparatus is realized in a small size, and the cost can be reduced. Moreover, the system is installed requiring reduced space contributing to enhancing the space efficiency.

In a client in the system for maintaining security, furthermore, the collation key notified from the print server is recorded in the storage medium. It is therefore made possible to maintain security in an environment in which the print server is commonly used in the system for maintaining security.

According to the above-mentioned method of maintaining security in the common output means, furthermore, the output process designated by the output request means is received by the output means but is held from being executed.

In order that the output process that is held is executed by the output means, the user must input the collation key issued to the output process that is received by the output means.

That is, the execution of the output process is reliably held until the user who has designated the output process arrives at the output means and inputs the collation key and, then, the output process is executed in the presence of the user.

According to the above-mentioned method of maintaining security in the common output means, furthermore, the output is executed in the presence of the user, and the collation key formed by the output means is displayed for confirmation. Even in the system in which the output means is used in common, therefore, it is made possible to prevent the output result from being watched by other person or from being obtained by other person.

In the case where the output process is carried out by utilizing a stacker for an ordinary output, the output process, that is designated by the output request means, is received by the output means. However, the thus received output process is put in a queue (The case where a locked stacker is designated will be hereinafter described).

In the system for maintaining security according to a preferred embodiment of the present invention, furthermore, the printer unit of the print server is provided with a locked stacker of which the paper take-out port has a normally-locked structure in addition to a stacker for an ordinary output in a unitary structure together with the print server. Here, when the client (or the user) has designated the locked stacker as a destination of output of the print job, the system for maintaining security of the present invention holds the print job until the output can be sent to the locked stacker, and sends the output at a moment when it is allowed to send the output. Owing to the locked function of the stacker, the user does not have to rush to the print server immediately after he has thrown in the print job, and there does not, either, occur such an inconvenience that the user have to wait for a long period of time in front of the common print server. This makes it possible to minimize the time of output which the user must wait for after he has thrown in the print job.

In this case, furthermore, the print server is controlled by a control unit that controls a variety of print jobs between the clients and the print server, so as to cope with a print job using a stacker for normal output or a print job that designates a locked stacker to the destination of output. Despite of being used in common, therefore, the print server functions as a locally connected printer which features high security. That is, according to the embodiment of the present invention, the output is preferentially sent to either the stacker for an ordinary output or to the locked stacker, and the designation of preferential output can be changed depending upon the judgement of the user. For instance, when the print job has not yet been output to the locked stacker at a moment when the storage medium is mounted, the preferential output mode is switched to the stacker for an ordinary output to quickly execute the print job.

According to the embodiment of the present invention, furthermore, outputs may be sent to the same locked stacker with the client as a unit. The thus designated print jobs can be output to the same stacker as far as it is considered that the locked stacker still have a sufficient space. It therefore becomes possible to impart flexibility to the method of using locked stackers.

According to the embodiment of the present invention, furthermore, the print job is carried out by a number of pages when the number of pages of the papers to be output has been known or by a number of pages that is estimated from the amount of the data when the number of pages has not been known maintaining a margin in the locked stacker based upon the result of detection by the paper sensor. When it is detected by a full sensor in the stacker while the print job is being output that the remaining amount is insufficient in the stacker, another locked stacker is secured when the print job still has output pages and the rest of the pages is output therein. When the additional locked stacker is not secured, a mark is attached to a position where the print job is finished to hold it temporarily, and the output job is executed into a normal stacker. At a moment when an empty locked stacker becomes available, the process of the job that is temporarily held is resumed. According to this constitution, it becomes possible to prevent an output of the print job into the locked stacker from being unfinished, and to quickly carry out the output process of the print job.

Moreover, on the side of the print server is displayed that the print job is not output, that can be seen by the user, and the user is allowed to select any one of the following modes to carry out the subsequent process.

(1) Wait until the print job is output into a locked stacker.
(2) Change to a preferential output to a stacker for an ordinary output.
(3) Change completely to the output to a stacker for an ordinary output.
(4) Cancel the print job.

As described above, the user is allowed to select any one of the above-mentioned modes. Therefore, depending upon the individual situations, it becomes possible to use the print server of the invention without any inconvenience.

According to the embodiment of the present invention, furthermore, the locked stacker is usually closed to maintain secrecy of the printed result but is unlocked while the corresponding storage medium is being loaded. The locked stacker, however, is provided with a mode that can be forcibly unlocked to cope with the following circumstances.

(a) When the locked stacker cannot be unlocked due to a trouble in the system.
(b) When the user who had outputted the print job into the locked stacker does not take out the printed result for an extended period of time causing a trouble in the use of the locked stacker.

In the above-mentioned cases, a manager of the print server unlocks the electronic lock, opens the take-out port of the locked stacker and takes out the printed result stored in the stacker. Then, there is no likelihood that the electronic lock of the locked stacker is not unlocked for an extended period of time or the locked stacker is occupied by a particular user only. Therefore, quickly usable nature of the locked stacker is not hindered, and secrecy of the output result is maintained, owing to the locking function of the stacker. Further, very short period of time needs be waited for to obtain the output.

BRIEF DESCRIPTION OF THE DRAWINGS

The above object and features of the present invention will be more apparent from the following description of the preferred embodiments with reference to the accompanying drawings, wherein:

FIGS. 9(*a*) through 9(*d*) show a data structure in an external storage medium according to the present invention;

FIGS. 11(*a*) & 11(*b*) are a flowchart explaining a first example of print job inserting control according to the present invention;

FIG. 26 shows locked stacker control blocks according to the second embodiment of the present invention;

DESCRIPTION OF THE PREFERRED EMBODIMENTS

Described below are the embodiments illustrating how the method of maintaining security in the common output means and the system for maintaining security according to the present invention are really put into practice, together with block diagrams (FIGS. 2 through 4) each showing a principle of the present invention.

Figure 1:
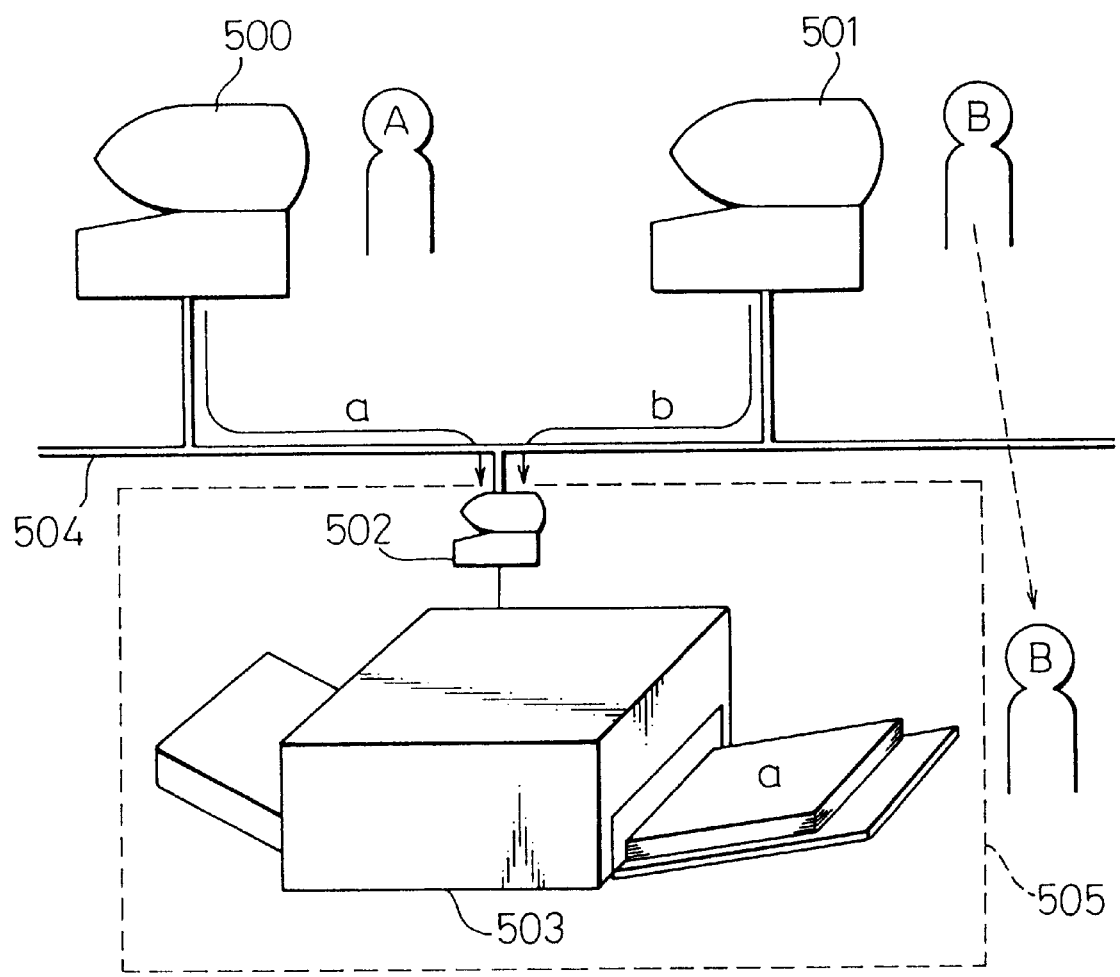
FIG. 1 explains the problems of a print server according to a prior art.
Figure 2:
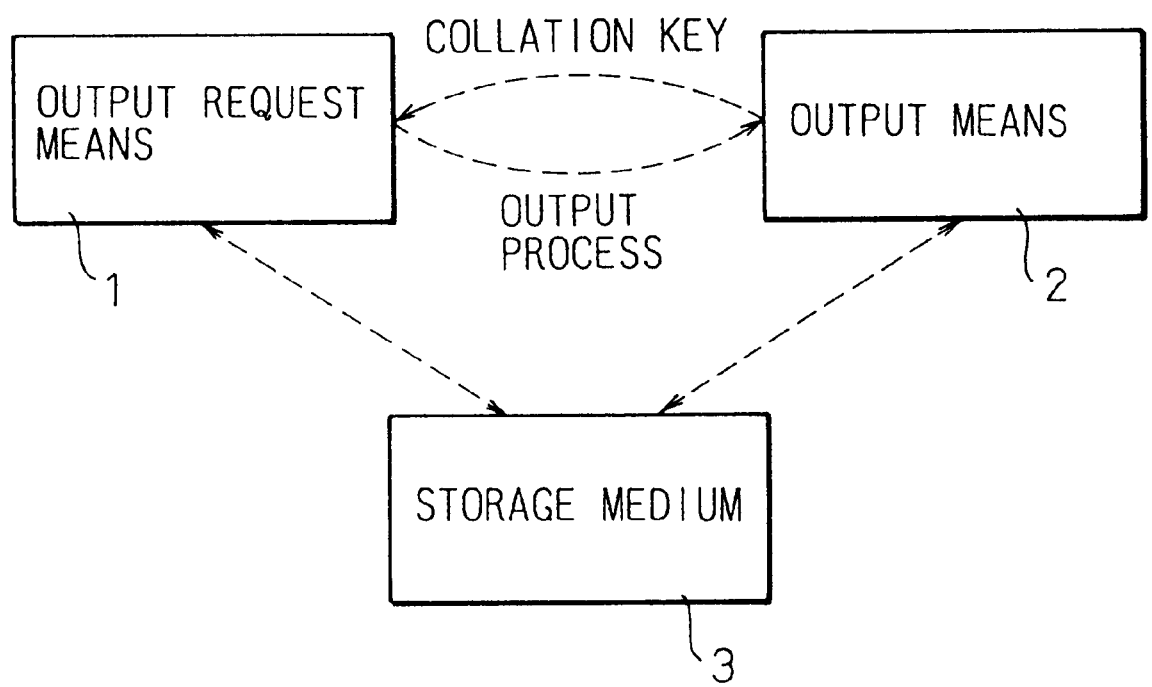
FIG. 2 is a block diagram showing a principle of the present invention.

FIG. 2 is a block diagram illustrating the basic principle of the present invention. According to the method of maintaining security in a common output means of the present invention as shown in FIG. 2, being designated by an output request means 1, an output means 2 receives the output process but holds the execution of the output process and forms a predetermined collation key and sends it to the output request means 1, the output request means 1 stores the collation key that is sent in a storage medium 3, and upon finding the collation key as a result of retrieving the contents stored in the storage medium 3, the output means 2 executes the output process that is held and that corresponds to the collation key.

Desirably, upon finding the collation key as a result of retrieving the contents stored in the storage medium 3, the output means 2 executes the output process, i.e., a job to be processed, that is held and that corresponds to the collation key taking the precedence over other output process.

More desirably, the output means 2 cancels the holding of the output process when the time for holding the output process exceeds a predetermined maximum retention period.

More desirably, the maximum retention period can be arbitrarily set. The method of canceling the holding of the output process can be arbitrarily set, too.

More desirably, the output means 2 informs the output request means 1 of the state of the output process that is held.

More desirably, in the method of maintaining security in a common output means according to the present invention, the conditions for the output process that is held can be set again.

Figure 3:
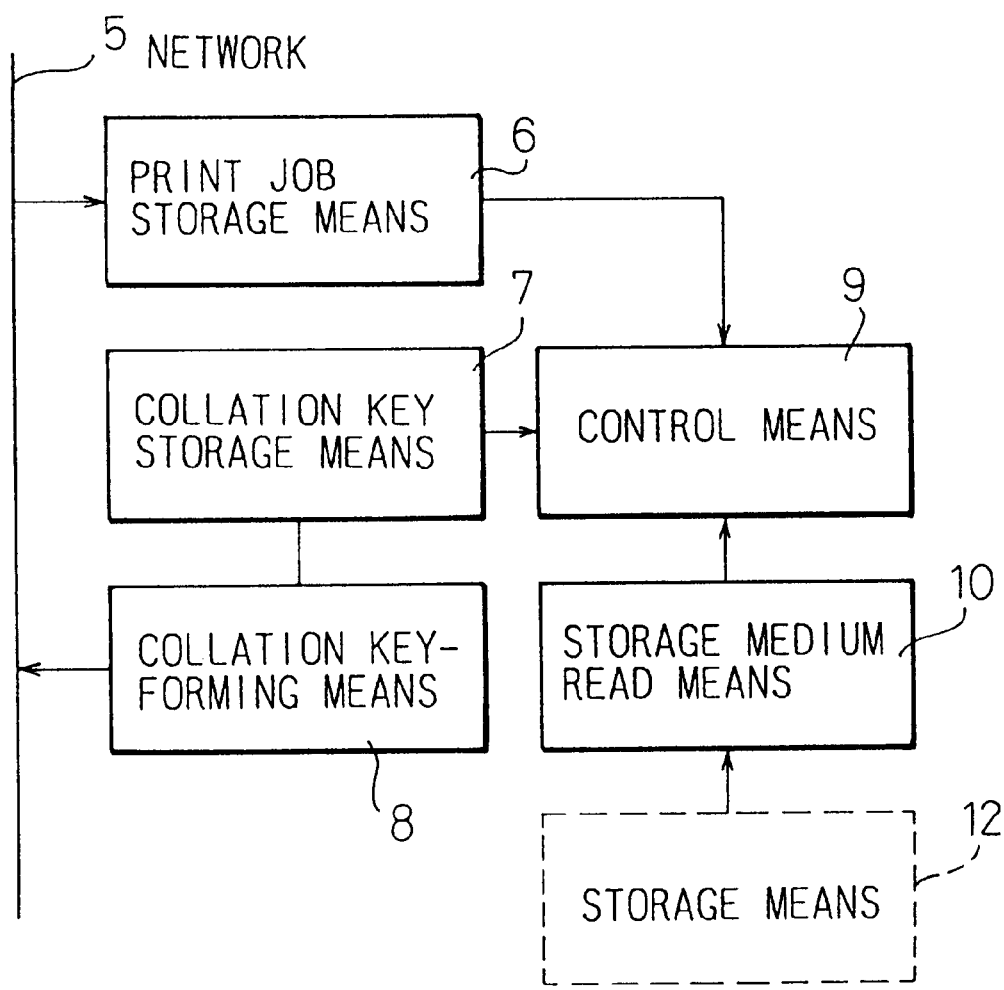
FIG. 3 is a block diagram showing a principle of a print server according to the present invention.

FIG. 3 is a block diagram illustrating the principle and constitution of the print server used for the system for maintaining security for executing the method of maintaining security of the present invention. As shown in FIG. 3, the print server used for the system for maintaining security of the present invention is connected to a network and executes the output process by receiving the print jobs via the network connected thereto. In FIG. 3, furthermore, security is guaranteed concerning the output of the print server in the case where the print server of the invention is commonly used as a common output means. Here, the print server comprises a print job storage means 6 for storing the print job received through the network 5, a collation key-forming means 8 which creates a collation key for the print job that is stored and outputs it to the network 5, a collation key storage means 7 for storing the collation key formed by the collation key-forming means 8, a storage medium read means 10 for reading the contents stored in a storage medium 12 in the print server, and a control means 9 which retrieves the contents stored in the storage medium 12 via the storage medium read means 10, reads the print job corresponding to the collation key from the print job storage means 6 when a collation key coincident with the collation key stored in the collation key storage means 7 is found, and starts processing the print job.

Desirably, a means connected to said network in the print server, the collation key-forming means 8, the collation key storage means 7, the storage medium read means 10 and the control means 9 are provided inside a printer unit.

Figure 4:
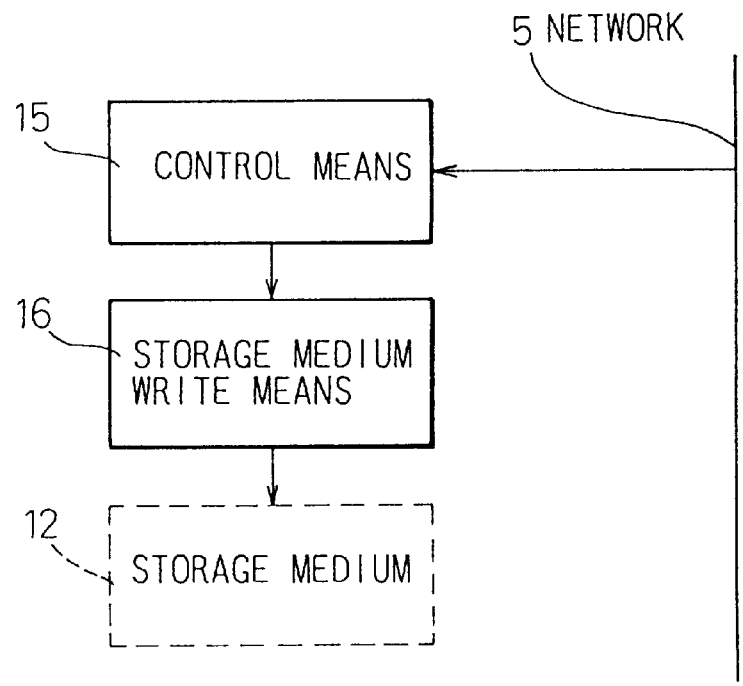
FIG. 4 is a block diagram showing a principle of a client according to the present invention.

FIG. 4 is a block diagram illustrating the principle and constitution of a client used in the system for maintaining security for executing the method of maintaining security of the present invention. Hereinafter, the same constituent elements as those mentioned above are denoted by the same reference numerals. As shown in FIG. 4, each of the plurality of clients used in the system for maintaining security of the present invention is connected to the network and the print job is designated via the network connected thereto. In FIG. 4, furthermore, security is guaranteed concerning the output of the case when the print server of the invention is commonly used as a common output means by the plurality of clients.

Here, each of the plurality of clients comprises a storage medium write means 16 that rewrites the contents stored in the storage medium 12 in the client, and a control means 15 which, when the print job is designated via the network 5, receives a collation key via the network 5 and writes the collation key into the storage medium 12 via the storage medium write means 16.

Figure 5:
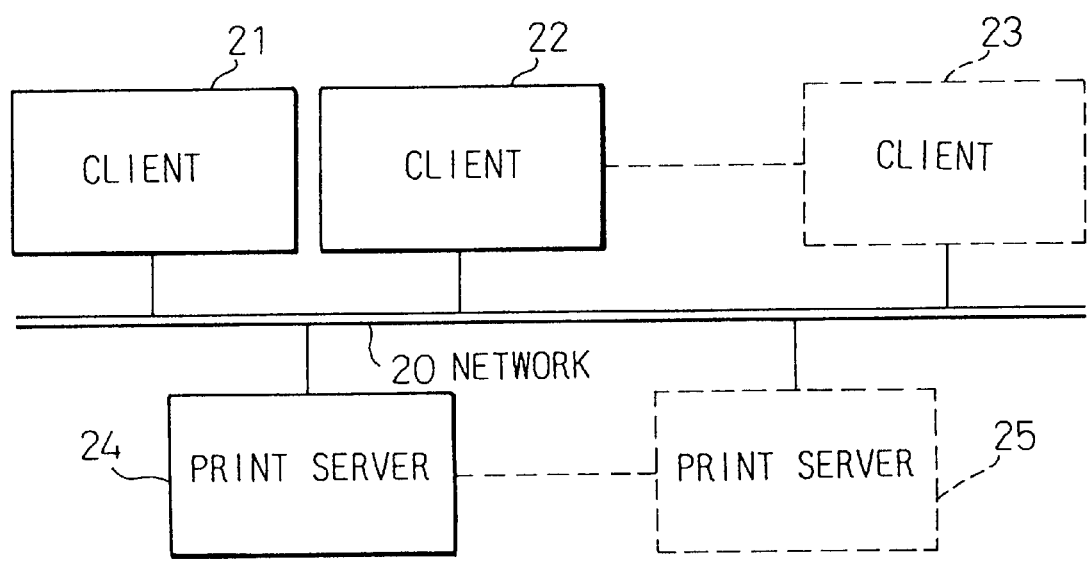
FIG. 5 is a block diagram showing a first embodiment of the present invention.

FIG. 5 is a block diagram illustrating a first embodiment of the present invention, and schematically shows the constitution of a network adapted to the present invention. Hereinafter, the same constituent elements as those mentioned above are denoted by the same reference numerals. In FIG. 5, a plurality of clients 21, 22 and 23 are connected to a network 20 to which are further connected one or more print servers 24 and 25.

To the clients 21, 22 and 23 are assigned unique client IDs (or addresses), respectively. To the print servers 24 and 25 are assigned unique print server IDs (or addresses), respectively.

Figure 6:
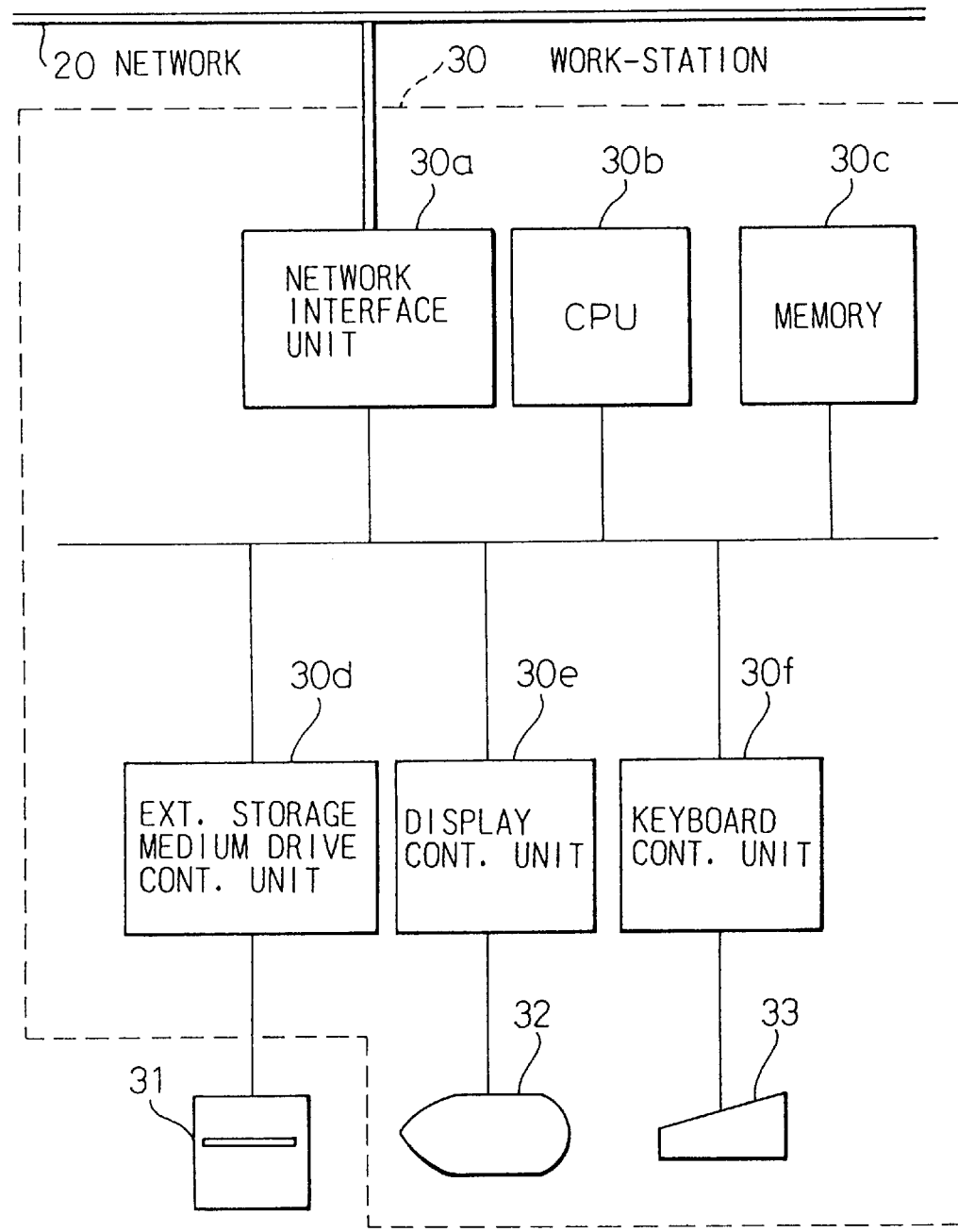
FIG. 6 is a block diagram showing an example of the client according to the present invention.
Figure 7:
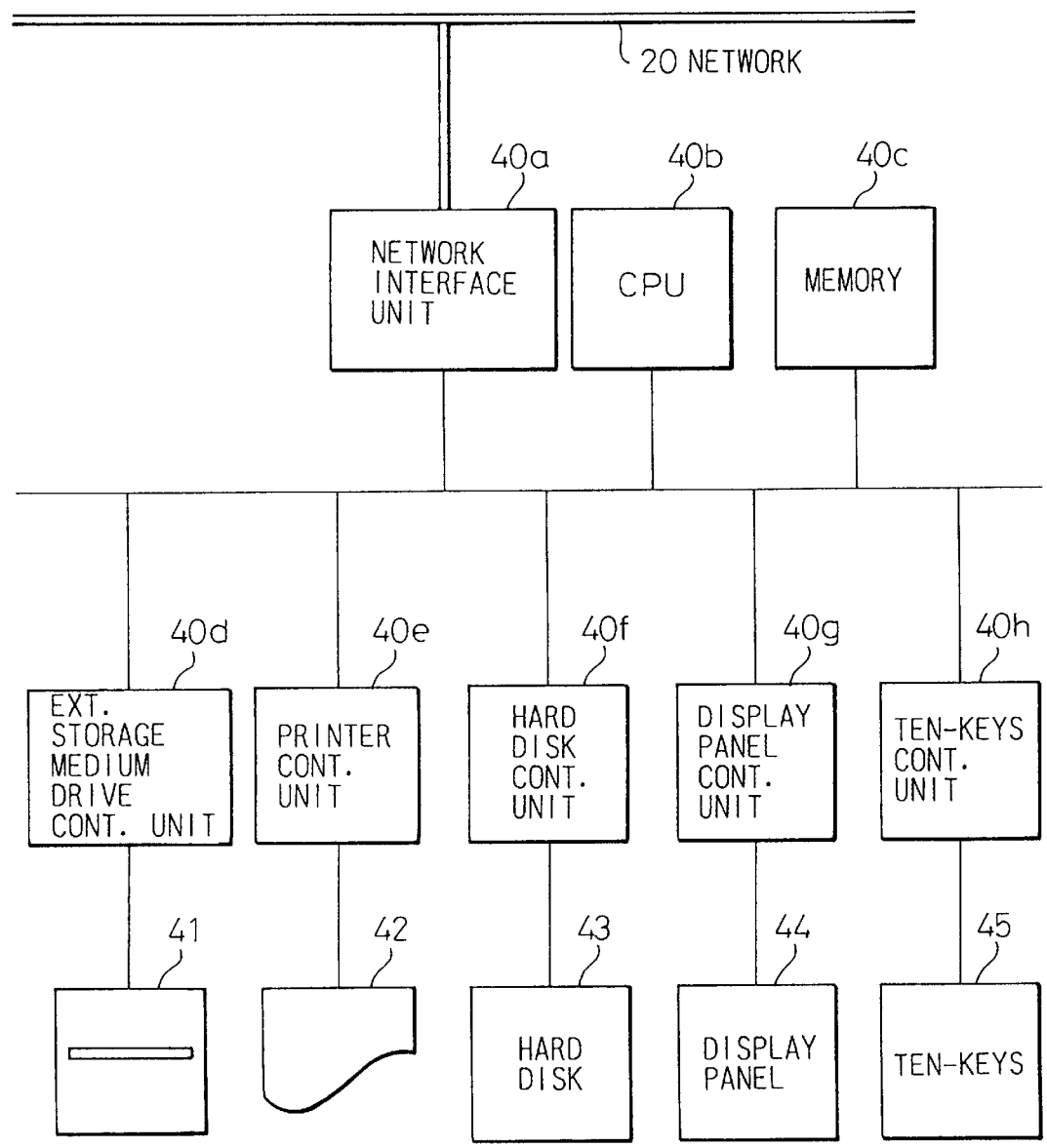
FIG. 7 is a block diagram showing a first example of the print server according to the present invention.
Figure 8:
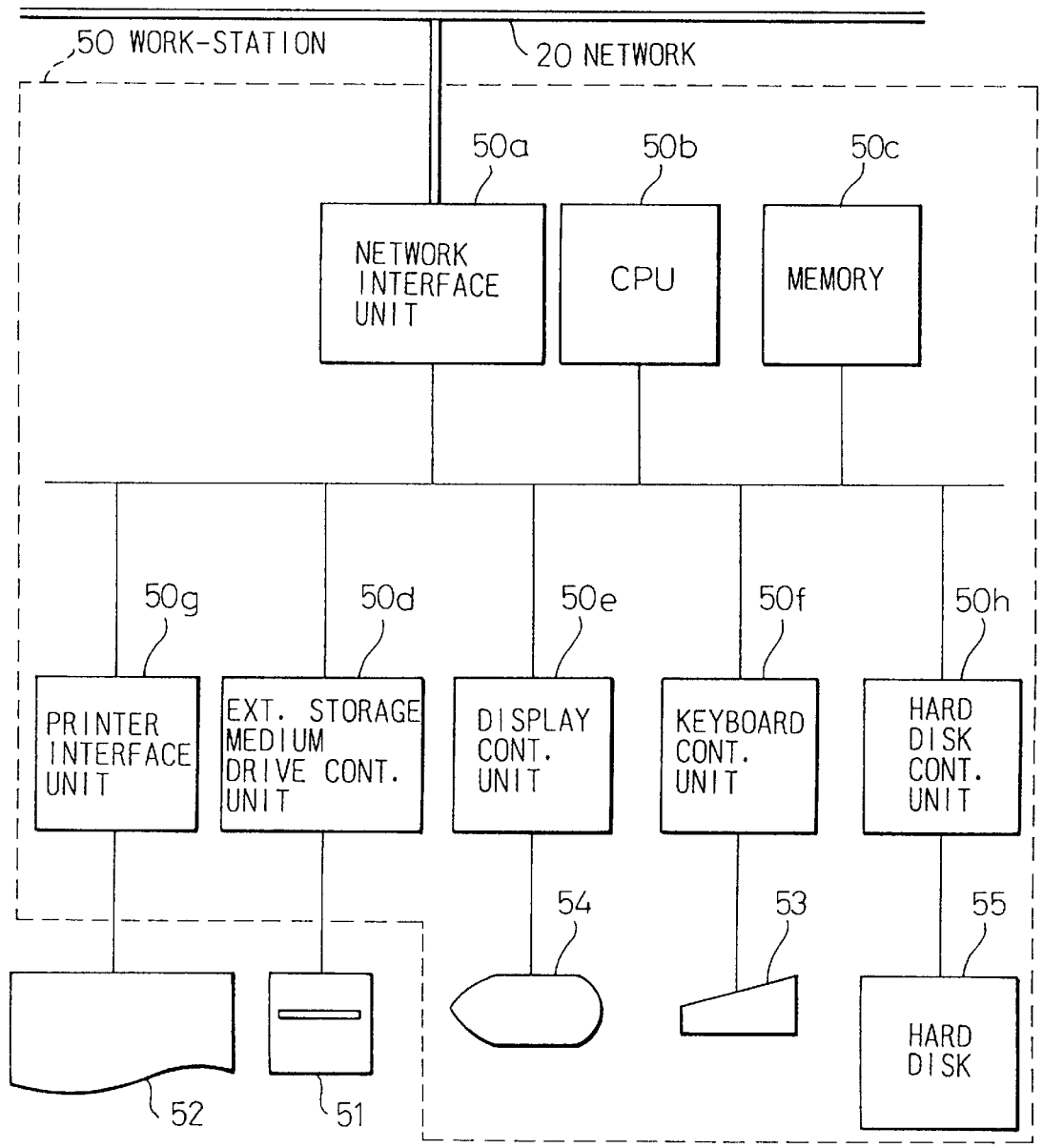
FIG. 8 is a block diagram showing a second example of the print server according to the present invention.

FIG. 6 is a block diagram explaining a constitution of the clients 21, 22 and 23, and FIGS. 7 and 8 are block diagrams explaining a first constitution and a second constitution of the print servers 24 and 25.

Constitution of the Clients

As shown in FIG. 6, the clients 21, 22 and 23 are each constituted by a work-station 30 and an external storage medium drive unit 31 that functions as a storage medium drive unit. The work-station 30 has a network interface unit 30a that connects to the network 20 and an external storage medium drive control unit 30d that connects to the external storage medium drive unit 31.

The work-station 30 further has a display 32 and a display control unit 30e for controlling the display 32. Moreover, the work-station 30 includes a keyboard 33, a keyboard control unit 30f for controlling the keyboard 33, a CPU 30b and a memory 30c.

The above work-station 30 may be a personal computer or the like that is similarly constituted.

Constitution of the Print Server

As FIG. 7 illustrates a first constitution, the print server 24 or 25 has a network interface unit 40a connected to the network 20, an external storage medium drive unit 41, an external storage medium drive control unit 40d for controlling the external storage medium drive unit 41, a printer mechanical unit 42 for effecting the printing, and a printer control unit 40e for controlling the printer mechanical unit 42.

The print server 24 or 25 further has a hard disk 43, a hard disk control unit 40f for controlling the hard disk 43, a display panel 44, a display panel control unit 40g for controlling the display panel 44, ten-keys 45, a ten-keys control unit 40h for controlling the ten-keys 45, a CPU 40b, and a memory 40c.

As FIG. 8 illustrates a second constitution, furthermore, the print server 24 and 25 is constituted by a work-station 50, an external storage medium drive unit is 51, and a printer unit 52. The work-station 50 has a network interface unit 50a connected to the network 20, an external storage medium drive control unit 50d connected to an external storage medium drive unit 51, and a printer interface unit 50g connected to a printer unit 52.

The work-station 50 further has a display 54, a display control unit 50e for controlling the display 54, a hard disk 55, and a hard disk control unit 50h for controlling the hard disk 55. The work-station 50 further has a keyboard 53, a keyboard control unit 50f for controlling the keyboard 53, a CPU 50b and a memory 50c.

The work-station 50 may be a personal computer that is similarly constituted. With the print server 24 or 25 being constituted as shown in FIG. 6, furthermore, no work station is necessary; i.e., the apparatus can be constructed in a small size at a reduced cost, and can be installed requiring reduced space.

External Storage Medium

The above-mentioned external storage medium drive units 31, 41 and 51 operate to drive a common external storage medium. The external storage medium should be compact in size so that it can be conveniently carried. Preferred examples include a magneto-optical disk cartridge, a floppy disk, an IC memory card, and the like.

Data Stored in the External Storage Medium

Described below is an example of data structure in the external storage medium. FIGS. 9(a) through 9(d) are diagrams each illustrating an example of data structure in the external storage medium. As shown in FIG. 8(a), in a track 0 of the external storage medium 60 are recorded medium identification data indicating that the external storage medium 60 has been formatted as well as map data for managing the memory area onwards of track 2 of the external storage medium 60 with a block as a unit.

In the track 1 of the external storage medium 60 are recorded a control block pointer list D60a in which are arranged control block pointers D61 that are shown in FIG. 9(b). In the onward of track 2 of the external storage medium 60 are recorded a job control block D62 and a print data block D63 that are shown in FIGS. 9(c) and 9(d).

Onward of the track 2 of the external storage medium 60 is sectionalized with a block of a fixed length as a unit, and emptiness of the blocks and connections among the blocks are managed relying upon the above map data. Constitution for storing and managing the block units relying upon the map data can be realized in compliance with the conventional technology and is not described here.

In the control block pointer D61 are recorded a print server address (designates a print server ID in this embodiment) D61a that designates the print server 24 or 25, a job control block pointer D61b that designates the job control block D62, and a job control nest counter D61c. The control block pointer D61 is formed for every use of the print server.

In the job control block D62 are recorded a job control block pointer D62a that designates the next job control block D62, a client's address (designates client ID in this embodiment) D62b that designates clients 21, 22 and 23, and the reception date and time D62c of receiving the print job.

In the job control block D62 are further recorded a retention period D62d of the print job, a retention period end process flag D62e that designates the method of processing the print job held exceeding the retention period D62d, a received data length D62f of print data, a job name D62g for designating the print job, a collation key D62h, and a print data block pointer D62i for designating the print data block D63.

In this embodiment, the job control block D62 has a reserve D62j so that the data structure can be expanded. The job control block D62 is formed for each of the print job that is thrown in.

In the print data block D63 are recorded a print data block pointer D63a that designates the next print data block D63, a data division flag D63b designating the division of the print data D63d, a data length D63c of the print data D63d, and the print data D63d.

Data Stored in the Print Server

Next, described below are the data stored in the print servers 24 and 25. The data described below are recorded in the hard disk 43 in the constitution of FIG. 7 or are recorded in the hard disk 55 in the constitution of FIG. 8. FIGS. 10(a) through 10(f) are diagrams of data structure for explaining the memory structure of the print servers 24 and 25.

Figure 10A:
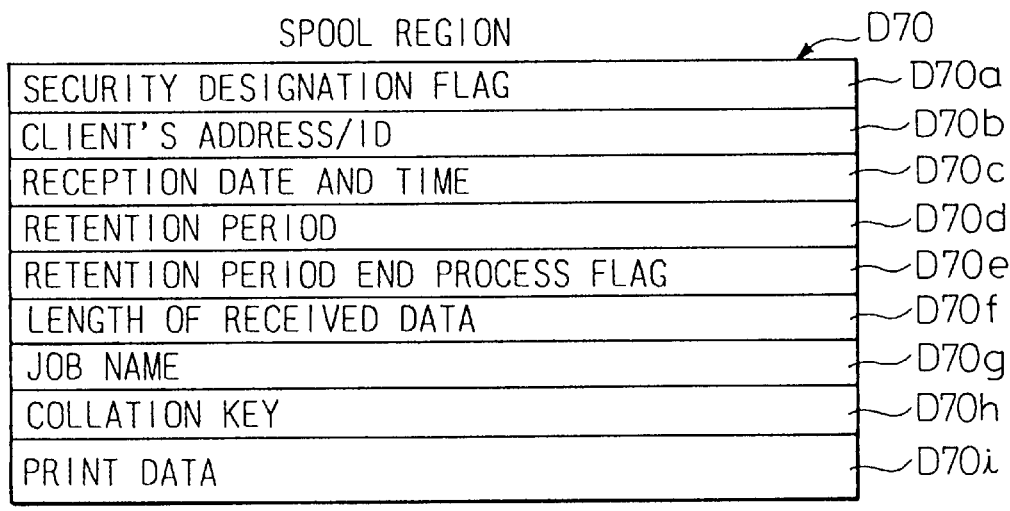
FIGS. 10(*a*) through 10(*f*) show a storage structure in the print server according to the present invention.

As shown in FIG. 10(a), in a spool region D70 are recorded a security designation flag D70a for instructing the holding of print execution, client's address (designates client ID in this embodiment) for designating the clients 21, 22 and 23, and the reception date and time D70c of receiving the print job. Here, the spool region in the external storage medium stands for a place where the output of the print job is temporarily stored in the form of a software prior to designating it to the printer unit or the like in the print server.

In the spool region are further recorded a print job retention period D70d, a retention period end process flag D70e for designating a method of processing the print job that is held exceeding the retention period D70d, the length D70f of the received print data, a job name D70g for designating the print job, a collation key D70h, and a print data D70i for designating the contents of print. The spool region D70 is formed for every print job that is thrown in.

Figure 10B:
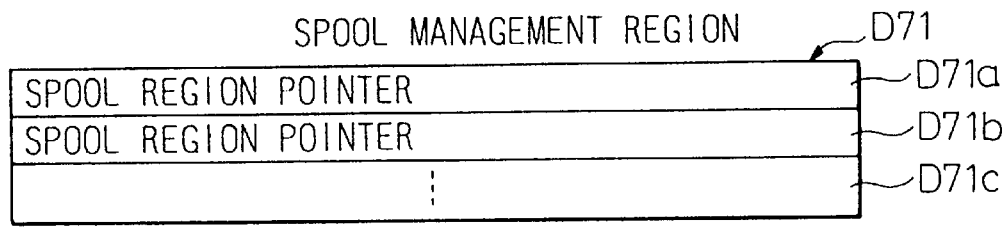

As shown in FIG. 10(b), in a spool management region D71 are recorded spool region pointers D71a, D71b and D71c for designating the spool region D70.

Figure 10C:
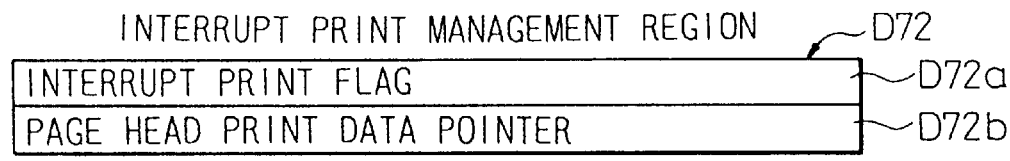

As shown in FIG. 10(c), in an interrupt print management region D72 are recorded an interrupt print flag D72a for designating the state of receiving the interrupt print, and a page head print data pointer D72b for designating the print data D70i at the head of a page on which the printing was discontinued.

Figure 10D:
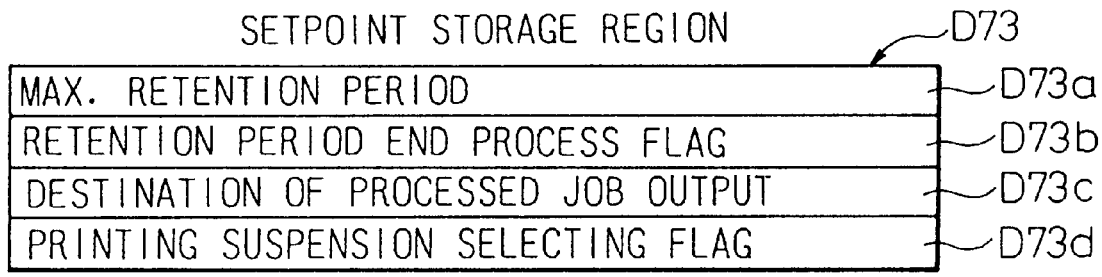

As shown in FIG. 10(d), in a setpoint value storage region D73 are recorded a maximum retention period D73a for designating a maximum value of the period for holding the print job, a retention period end process flag D73b for designating a method of processing when the print job is held in excess of the retention period, a destination of processed job output for designating the destination of list output of the print job that is processed because the retention period is exceeded, and a print discontinue select flag D73d for designating a method of discontinuing the printing in response to interrupt printing.

Figure 10E:
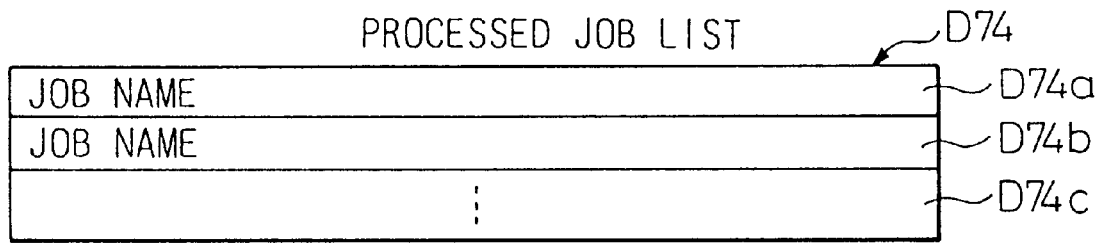

As shown in FIG. 10(e), in a processed job list D74 are recorded job names D74a, D74b and D74c of print jobs that are processed because the retention period is exceeded.

Figure 10F:
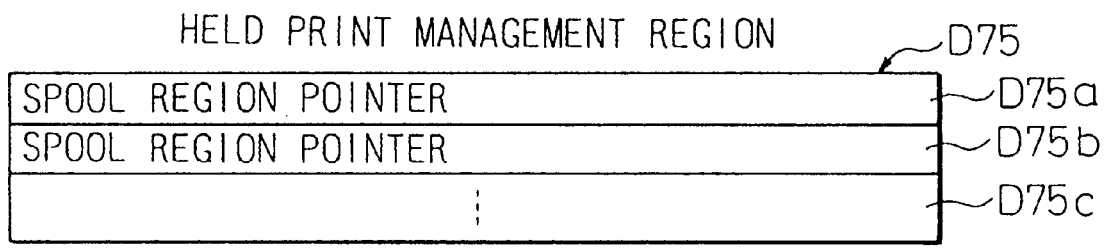

As shown in FIG. 10(f), in a held print management region D75 are recorded spool region pointers D75a, D75b and D75c for designating the spool region D70.

Contents to be Controlled

Described below are the contents to be controlled by the clients 21, 22 and 23 and the contents to be controlled by the print servers 24 and 25. In the clients 21, 22 and 23, the control is executed by a CPU 30b and in the print servers 24 and 25, the control is executed by a CPU 40b or a CPU 50b.

Figure 12A:
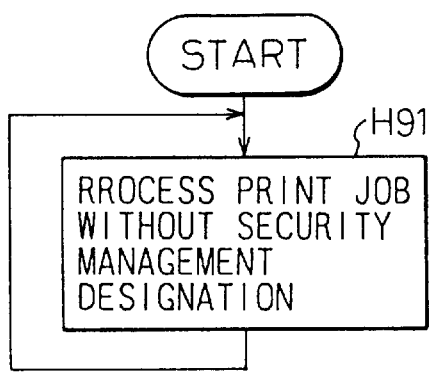
FIGS. 12(*a*) & 12(*b*) are a flowchart explaining a first example of printing control in the print server according to the present invention.
Figure 12B:
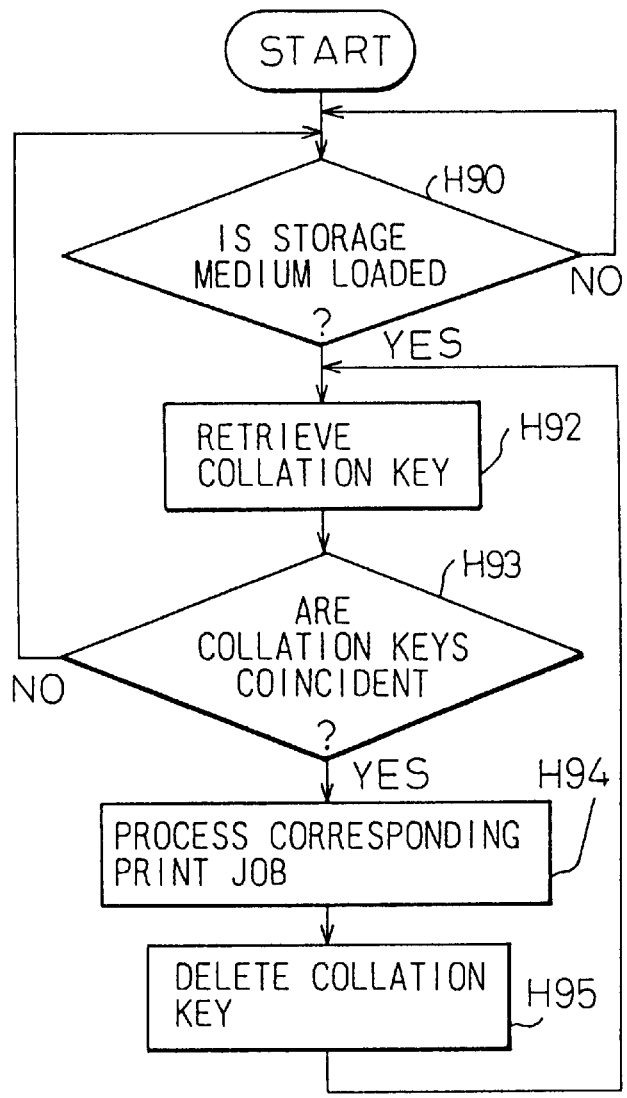
Figure 13:
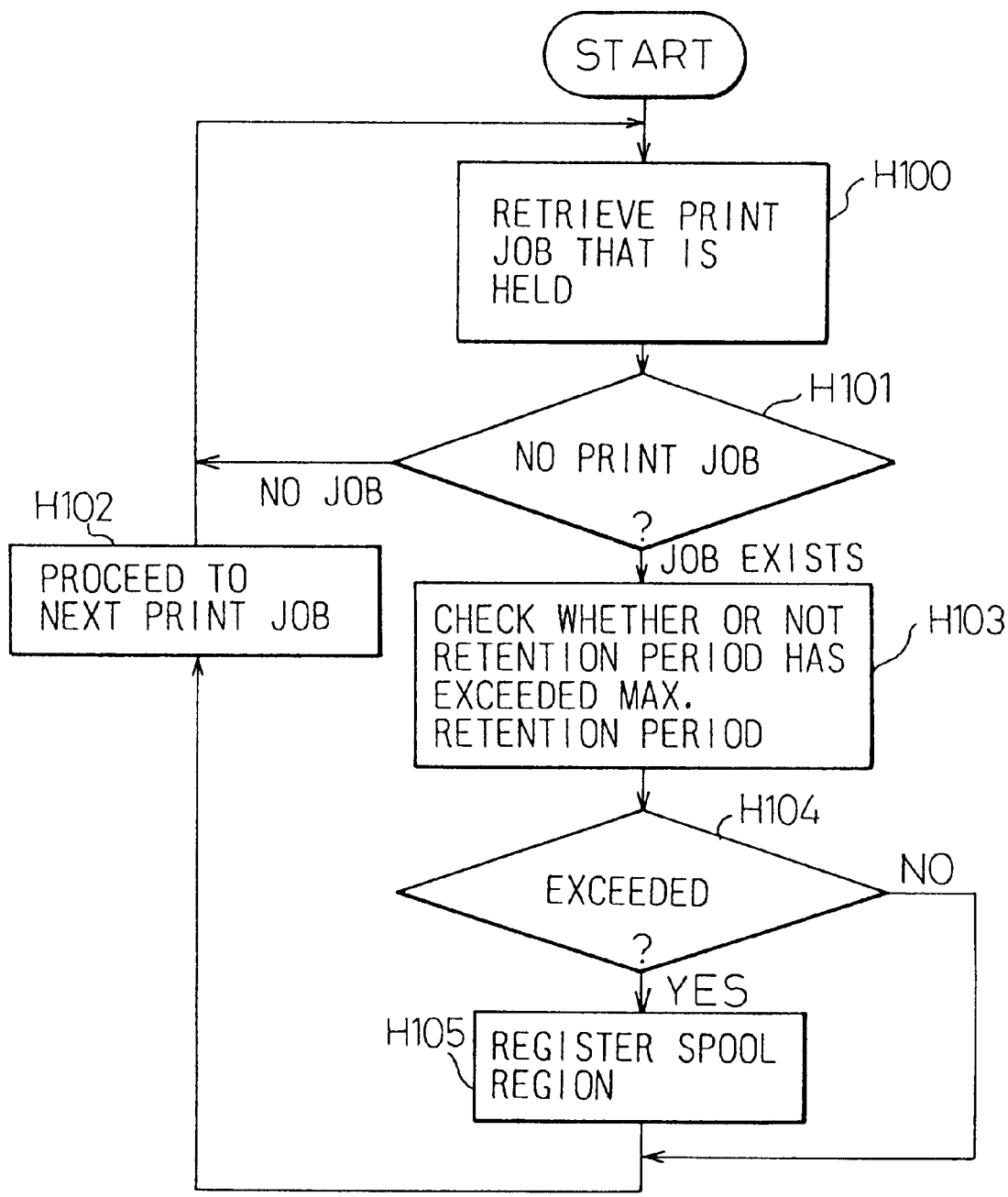
FIG. 13 is a flowchart explaining control of managing queued print jobs in the print server according to the present invention.
Figure 14:
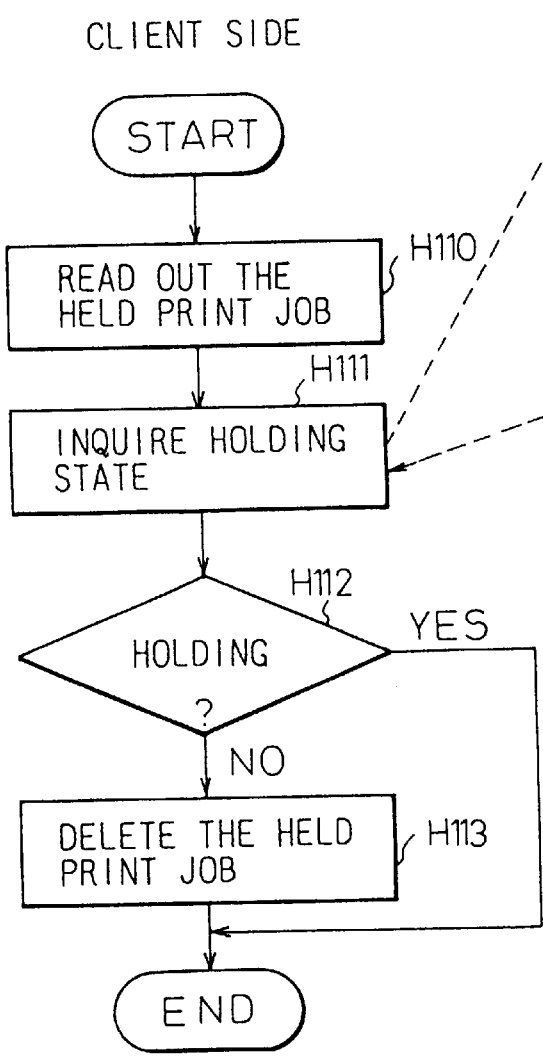
FIGS. 14(*a*) & 14(*b*) are a flowchart explaining control of inquiring a queued print job according to the present invention.
Figure 15:
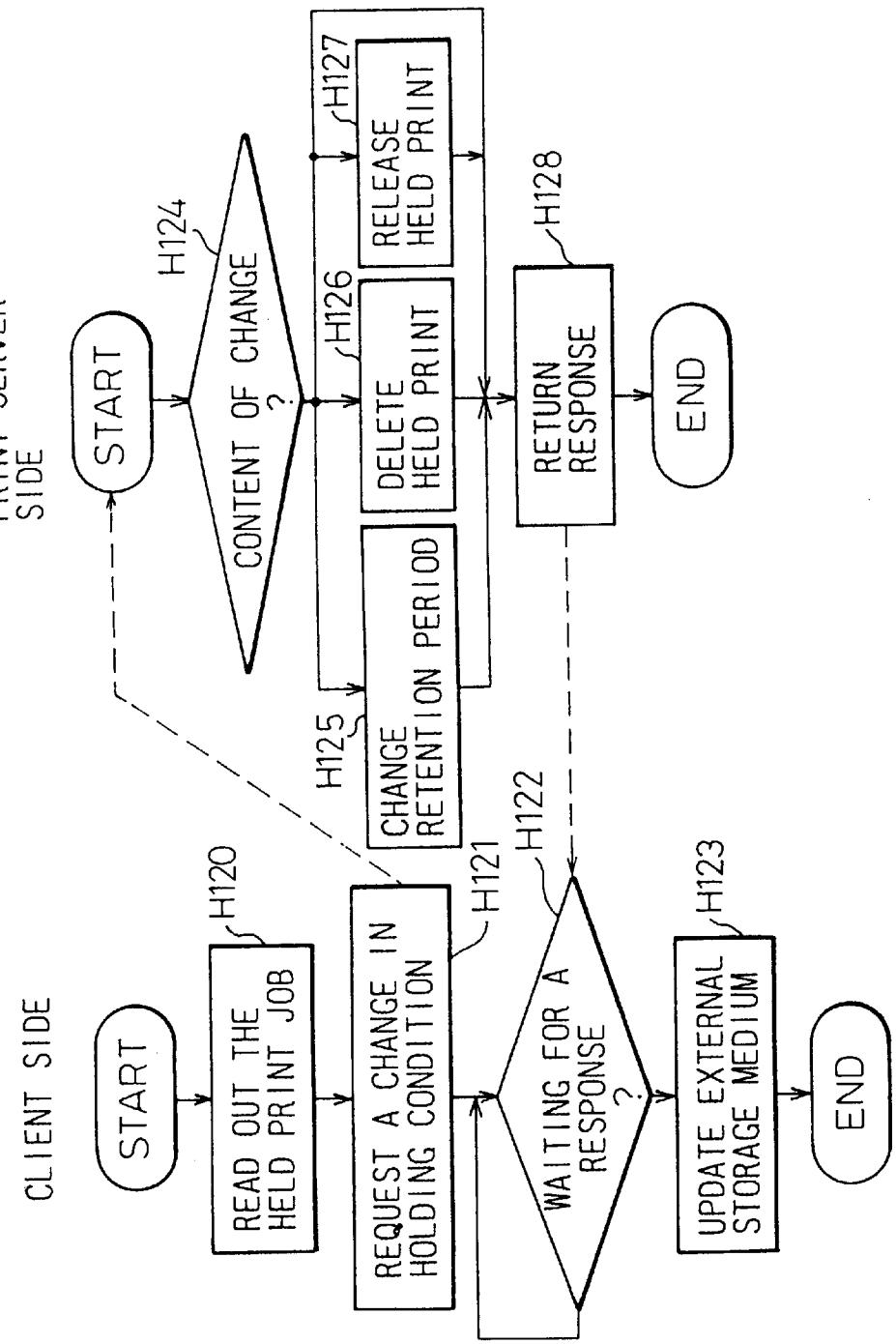
FIGS. 15(*a*) & 15(*b*) are a flowchart explaining control of changing conditions of a queued print job according to the present invention.
Figure 16:
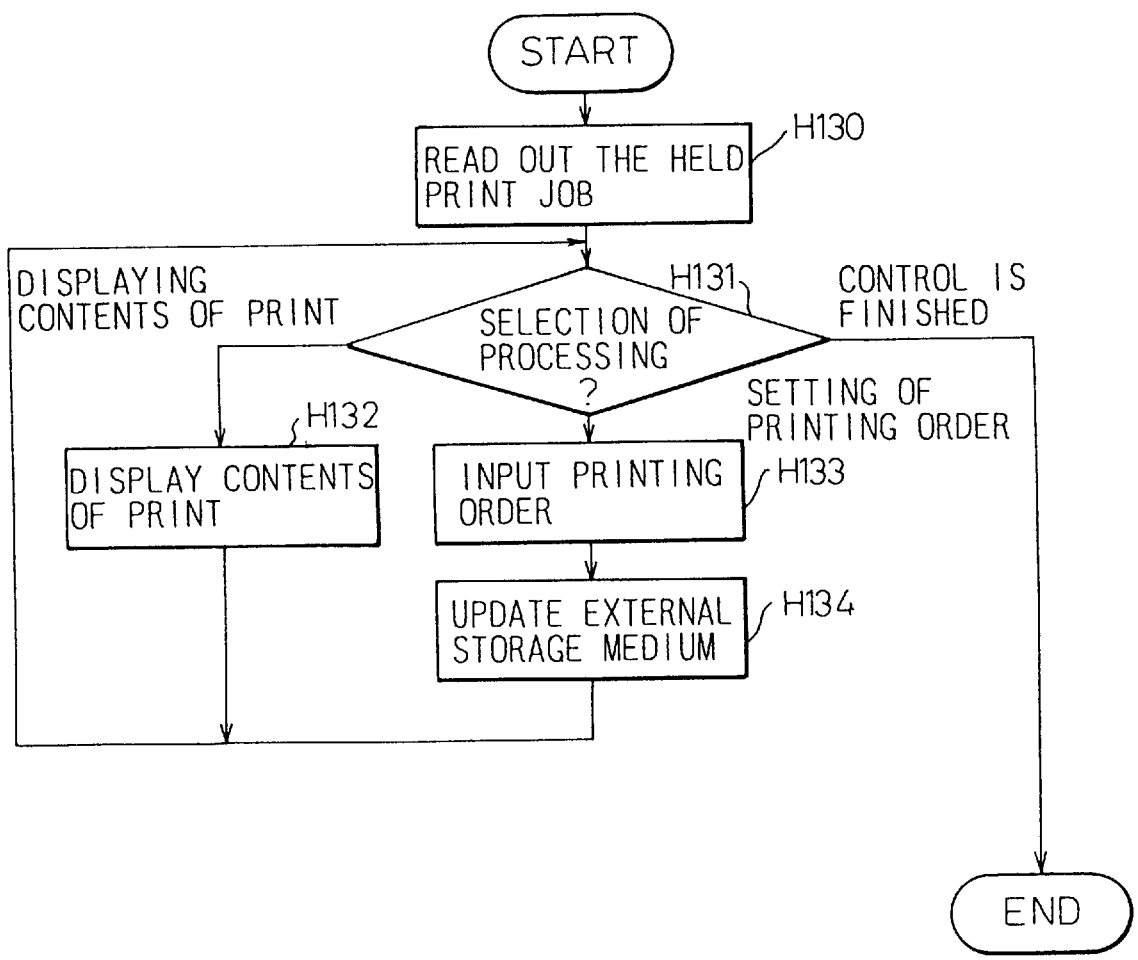
FIG. 16 is a flowchart explaining control of displaying contents of a queued print job in the client according to the present invention.

FIG. 11 is a flow chart for explaining a first example of control of when a print job is thrown in that is adapted to the present invention, FIG. 12 is a flow chart for explaining a first example of control during the printing on the side of the print server, FIG. 13 is a flow chart for explaining an example of control in managing the held print job on the side of the print server, FIG. 14 is a flow chart for explaining an example of control in collating held print job, FIG. 15 is a flow chart for explaining an example of control in changing the conditions for the held print job, and FIG. 16 is a flow chart for explaining an example of control in displaying the contents of the held print job on the side of the client.

Figure 17:
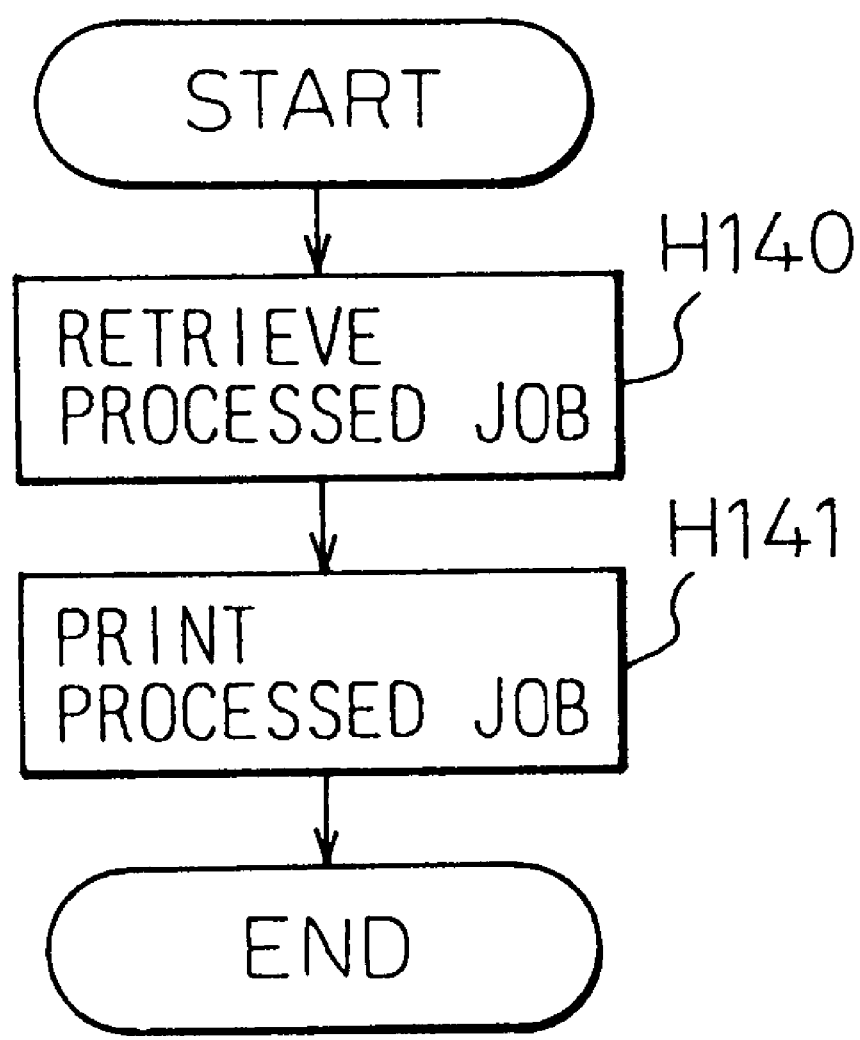
FIG. 17 is a flowchart explaining control of confirming a processed job according to the present invention.
Figure 18:
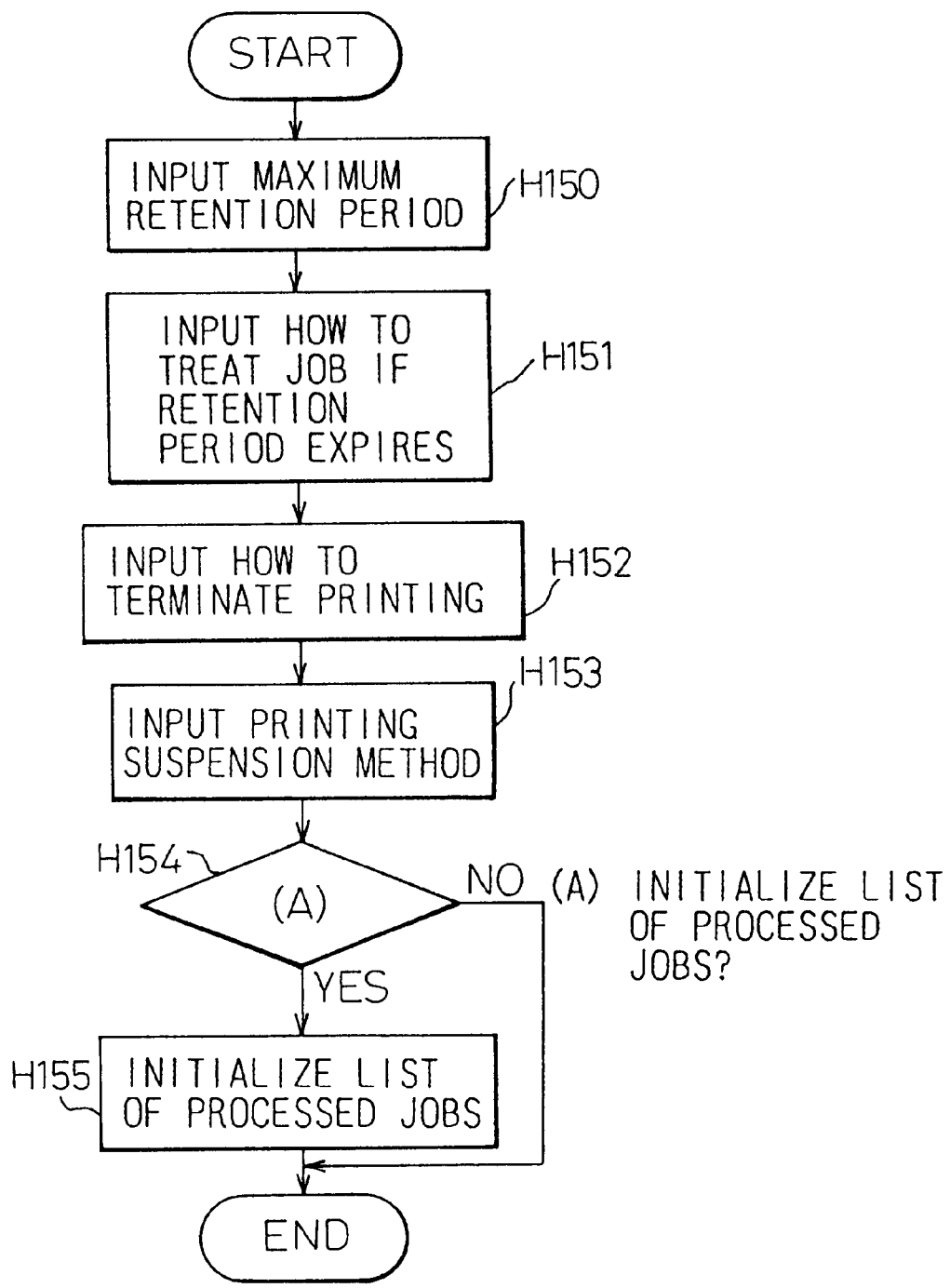
FIG. 18 is a flowchart explaining control of changing set values of a print server according to the present invention.
Figure 19:
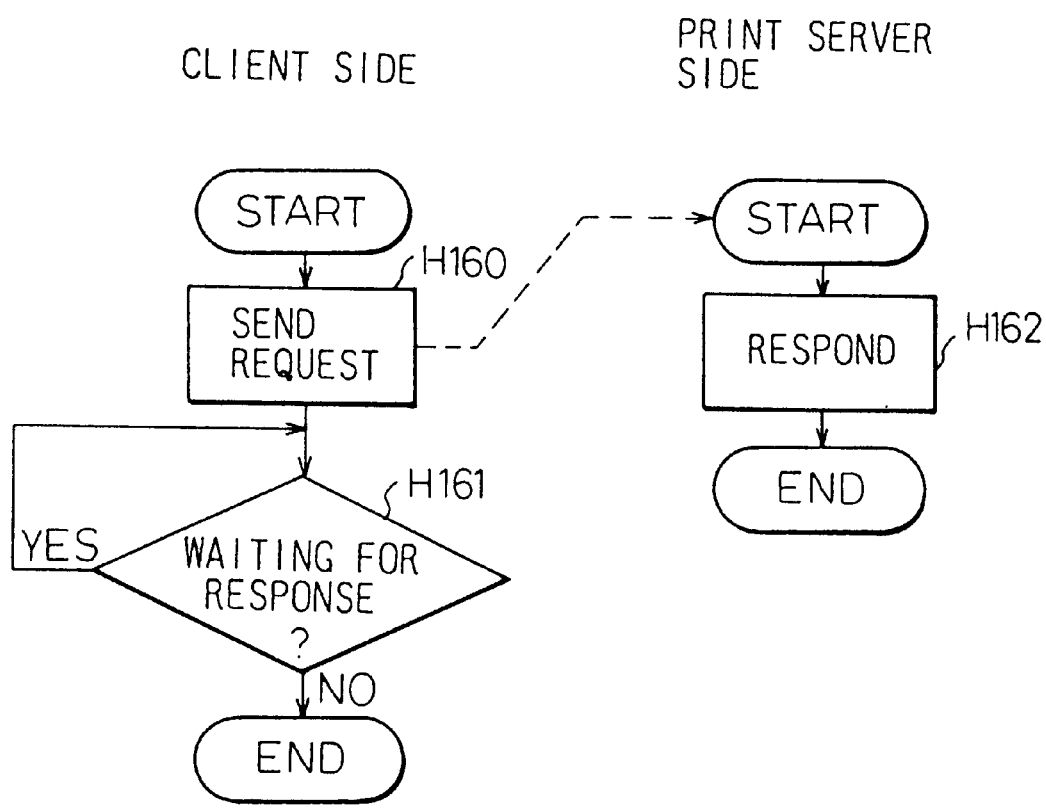
FIGS. 19(*a*) & 19(*b*) are a flowchart explaining connection confirming control according to the present invention.

FIG. 17 is a flow chart for explaining an example of control in confirming the processed job that is adapted to the present invention, FIG. 18 is a flow chart for explaining an example of control in changing a setpoint of the print server on the side of the print server, and FIG. 19 is a flow chart for explaining an example of control in confirming the connection.

The flow charts of FIGS. 11{(a) portion}, 14{(a) portion}, 15{(a) portion} 16, and 19{(a) portion} illustrate the contents of controls executed by the clients 21, 22 and 23. Controls shown in FIGS. 11{(a) portion}, 14{(a) portion}, 15{(a) portion} and 16 are selectively started upon manipulation of the keyboard 33 by an operator.

The flow charts of FIGS. 11{(b) portion}, 12, 13, 14{(b) portion}, 15{(b) portion}, 17, 18 and 19{(b) portion} illustrate the contents of controls executed by the print servers 24 and 25. Controls shown in FIGS. 11{(b) portion}, 14{(b) portion}, 15{(b) portion} and 19{(b) portion} are selectively started in accordance with messages sent from the clients 21, 22 and 23 via the network 20.

On the other hand, controls shown in FIGS. 12 and 13 are executed at all times in parallel with the above-mentioned other controls., Moreover, controls shown in FIGS. 17 and 18 are started upon manipulating the ten-keys 45 or the keyboard 53 by an operator.

The method of executing a plurality of controls in parallel and a method of starting a particular control in accordance with given conditions, have been widely known in a so-called multi-task real-time operating system and the like systems, and are not described here.

Control when a Print Job is Thrown In

First, described below is a control of when a print job is thrown in assuming the case where the client 21 is manipulated to throw the print job into the print server 24. Here, the print server 24 has the constitution shown in FIG. 7, when the operator operates the keyboard 53 of the client 21 to select the throw-in of a print job, the CPU 30b in the client 21 starts controlling the operation shown in (a) portion of FIG. 11.

At a step H80, the display control unit 30e is controlled to display a menu on the display 32 which promotes the operation for inputting a file name to be transmitted, a print server ID, presence or absence of security designation, retention period of when the security is designated, and a processing method of when the security is designated and when the retention period is exceeded. There is no need of necessarily designating the period for holding the security or designating the processing method after the period for holding the designation of security has passed.

After the input operation by the operator, the connection to the designated print server is confirmed. When the connection is abnormal as a result of confirmation, the display 32 displays a message indicating that the process is impossible, and the control of the client 21 is finished.

When the connection is normal as a result of confirmation, the network interface unit 30a is controlled at the step H80, and whereby a print throw-in message, print data stored in the file to be transmitted, above-mentioned various settings and the client ID are transmitted onto the network 20.

Here, when no retention period is designated despite the security is designated or when no processing method is designated after the passage of the holding period of when the security is designated (H81), they are replaced by particular values, respectively.

After the transmission is finished, a standby state is maintained at the step H80 until the network interface unit 30a informs the reception of data from the network 20.

In the print server 24, the transmitted data are received by the network interface unit 40a that is connected to the network 20, and a print server ID that is received is collated with the print server ID that has been assigned thereto.

When they do not coincide as a result of collation, the received data are discarded away. When the print server IDs are coincident as a result of collation, however, the received data are transferred from the network interface unit 40a to the memory 40c, and the CPU 40b is informed of that the data are received from the network 20. In this embodiment, it is presumed that the above-mentioned print server ID is the one that has been assigned to the print server 24.

Upon decoding the above notice and the print throw-in message, the CPU 40b starts controlling the operation shown in (b) portion of FIG. 11, A new spool region D70 is secured at a step H84, and the above transmitted print data, presence or absence of security designation and client ID are stored in a print data D70i, security designation flag D70a and client's address D70b of the spool region D70, respectively.

In a constitution equipped with a calendar timepiece that counts the calendar and the time, the date and time are read by the calendar timepiece at the step H84 and are stored in the reception date and time D70c in the spool region D70.

At the step H84, furthermore, the length of the transmitted print data is counted and is stored in the received data length D70f in the spool region D70. When the presence/absence of the security designation that is transmitted is not designating the security, then the transmitted retention period of when the security is designated and the processing method after the passage of the retention period of when the security is designated are stored at the step H84 in the holding period D70d and in the retention period end process flag D70e in the spool region D70.

At this moment, when the transmitted retention period of when the security is designated is larger than a value that has been set to the maximum holding period D73a in the setpoint storage region D73 or is equal to the above-mentioned particular value, the value set to the maximum retention period D73a is stored in the retention period D70d.

Furthermore, when the transmitted method after the passage of the retention period of when the security is designated has the above-mentioned particular value, then, the value that is set to the retention period end process flag D73b in the setpoint storage region D73 is stored in the retention period end process flag D70e.

At the step H84, furthermore, a job name is formed and is stored in the job name D70g in the spool region D70. The job name has an initial value of 0, and is assigned with a serial number in the order of print jobs that are thrown in. For instance, the job names are PRN2#0001, PRN2#0002, PRN2#0003, - - - . The first block "PRN2#" is a fixed code which is unique to the print servers 24 and 25. The job name is constituted by several digits that will be easily grasped by the operator.

In the step H84, furthermore, when the transmitted presence/absence of security designation is designating the absence of security, then, a spool region pointer is registered to designate the spool region D70 that is secured for the spool management region D71.

In registering the spool region pointer to the spool management region D71, the spool region pointers D71a, D71b, - - - are arranged in the order of print jobs in accordance with a separately determined print priority order.

At the step H84, on the other hand, when the transmitted presence/absence of security designation is designating the presence of security, a spool region pointer is registered to the held print management region D75 to designate the above newly secured spool region D70.

After the above processing is finished, the network interface unit 40a is controlled at the step H84, and the client ID stored in the client's address D70b and the job name stored in the job name D70g are transmitted to the network 20.

The control is then shifted to a step H85, and the control in the print server 24 is finished when the transmitted presence/absence of security designation is designating the absence of security. When the presence/absence of security designation is designating the presence of security, on the other hand, the control is shifted to the step H86.

In the client 21, at this moment, the data transmitted from the print server 24 are received by the network interface unit 30a connected to the network 20, and the client ID that is received is collated with the client ID that has been assigned thereto (H82).

When they do not coincide as a result of collation, the received data are discarded away. When the print server IDs are coincident as a result of collation, however, the received data are transferred from the network interface unit 30a to the memory 30c (H83), and the CPU 30b is informed of that the data are received from the network 20. The standby state is then released at the step H80.

After the standby state is released, the display control unit 30e is controlled at the step H80 and the job name that is received is displayed on the display 32. That is, the operator is informed of the job name of the print job that was thrown in. Control is then shifted to the step H81. Control in the client 21 is finished when no security has been designated by the operator at the step H80.

When the operator is designating the security at the step H80, on the other hand, the control is shifted to the step H82 and the standby state is established until the reception of data by the network interface unit 30a from the network 20 is notified. The data transmission/reception operation between the client 21 and the print server 24 via the network 20 holds true even in the control operation described below. Hereinafter, therefore, this operation is simply expressed as "transmit to the network" and "receive from the network".

In the print server 24, at this moment, the control is shifted to a step H86 where a collation key is formed.

The collation key, client's address D70b in the spool region D70, reception date and time D70c, retention period end process flag D70e and received data length D70f are transmitted to the network 20. The collation key is a sequence of symbols of several tens to several hundred of digits prepared by using random numbers.

After the transmission is finished, the control is shifted to a step H87 where the collation key is stored in the collation key D70h in the spool region D70. At the step H87, the print server is placed in the standby state and waits for the reception of data from the network 20.

Upon receiving the data transmitted from the print server 24, on the other hand, the client 21 is liberated from the standby state, and the control is shifted to the step H83 where the external storage medium drive control unit 40d is controlled, and the contents stored in the external storage medium loaded in the external storage medium drive unit 41 are updated.

Contents stored in the external storage medium are updated as described below. That is, the control block pointer D61 recorded in the control block pointer list D60a is read out, the print server address D61a is collated with the print server ID at the destination of throwing in the print job, and a control block pointer D61 is retrieved in which the collation becomes coincident.

The collation is carried out by successively reading the control block pointers D61 from the control block pointer list D60a. When the control block pointer list D60a contains no control block pointer D61 with which the collation becomes coincident, unused control block pointers D61 are retrieved. The print server ID of the destination of throwing in the print job is recorded in the print server address D61a of the control block pointer D61, and 0 is recorded in the job control block nest counter D61c.

The unused control block pointer D61 can be identified by assigning print server IDs of 1 or larger to all of the print servers and by recording a singular value 0 in the print server address D61a.

Next, a job control block D62 is newly secured. Then, a pointer that designates the thus secured job control block D62 is recorded in the job control block pointer D61b of the control block pointer D61.

In retrieving the control block pointer D61, at this moment, if a control block pointer D61 with which the print server ID coincides has been found, the job control block pointer D61b is not updated, and a pointer for designating the above newly secured job control block D62 is recorded into the job control block pointer D62a of the job control block D62 that is designated by the job control block pointer D61b.

Here, however, if the job control block pointer D62a of the job control block D62 is further designating another job control block D62, the job control block pointer D62a of the job control block D62 is not updated, and the job control block pointer D62a of the latter job control block D62 is inspected. Inspection of the job control block pointer D62a is continued until there is found a job control block pointer D62a that is not designating another job control block D62. The pointer that designates the newly secured job control block D62 is recorded into the thus retrieved job control block pointer D62a.

The job control block pointer D62a that is not designating another job control block D62 is identified by assigning addresses other than 0 to onwards of the track 2 of the external storage medium, and by recording a singular value 0 in the job control block pointer D62a.

Then, 1 is added to the job control block nest counter D61c of the control block pointer D61. The client ID received as mentioned above, reception date, and time, retention period, retention period end process flag, received data length, job name and collation key are, respectively, recorded into the client's address D62b, reception date and time D62c, retention period D62b, retention period end process flag D62e, received data length D62f, job name D62g and collation key D62h of the above newly secured job control block D62. The singular value 0 is recorded into the print data block pointer D62i of the job control block D62.

When the contents stored in the external storage medium are updated, the display control unit 30e is controlled at the step H83 to display a message on the display 32 in order to promote the operation for selecting whether or not the print data of the print job that is thrown in be copied onto the external storage medium.

If the operator manipulates the keyboard 33 to instruct that the copy is not necessary, a command designating the end of throw-in of printing is transmitted to the network 20. The control operation in the client 21 is thus finished.

When the operator instructs that the copy is necessary, then the print data are read out from the designated file and are displayed on the display 32 to promote the operation for designating the range of copy.

If the operator manipulates the keyboard 33 to designate the copying range of the print data, the external storage medium drive control unit 40d is controlled, and the designated range of print data is recorded into the external storage medium loaded in the external storage medium drive unit 41.

The print data are recorded as described below. That is, a new print data block D63 is secured in the external storage medium. Then, a pointer that designates the print data block D63 is recorded in the print data block pointer D62i of the above newly secured job control block D62.

Then, the above-mentioned designated print data are recorded in the print data D63d of the print data block D63. In this case, when the capacity at the above designated print data is so large that it cannot be recorded in a maximum number of blocks that are linked together and are limited by the storage management based on the map data, another print data block D63 is secured, and the subsequent print data are recorded in the print data D63d.

In the print data block pointer D63a is recorded a pointer that designates the print data block D63 in which the subsequent print data are recorded. The divisional recording of the print data is carried out until the above designated print data are all recorded. The singular value 0 is recorded in the print data block pointer D63a of the print data block D63 which is not continuing.

The length of print data recorded in the print data D63d is recorded in the data length D63c of each of the print data blocks D63 recording the above designated print data. In the data division flag D63b is recorded a value that designates the presence or absence of divisional recording of the print data.

When the recording of the print data into the external storage medium is finished, a message designating the end of throw-in of print is transmitted to the network 20. The control operation in the client 21 is thus finished.

Upon receiving the message designating the end of throw-in of print from the network 20, the print server 24 is no longer placed in the standby state, and the control operation in the print server is finished.

In transmitting the print job in the client 21, i.e, at the step H80, when a message designating the halt of transmission is sent from the network 20, the transmission of print job is suppressed and is placed in the standby state until a message designating the resumption of transmission is sent from the network 20.

In receiving the print job in the print server 24, i.e., at the step H84, a message designating the halt of transmission is sent to the network 20 when there is no sufficient storage region in the hard disk 43 of the print server 24. When there is sufficient amount of emptiness in the storage region, a message designating the resumption of transmission is transmitted to the network 20.

In transmitting the print job in the client 21, i.e., at the step H80, a message designating the end of transmission of print job is sent to the network 20 after the print job is transmitted.

In receiving the print job in the print server 24, i.e., at the step H84, furthermore, the control is shifted to the step H85 after having waited for the reception of the message designating the end of transmission of print job from the network 20. This time of standby is counted, and the control in the print server 24 is finished when the standby time has exceeded a predetermined value.

In transmitting the print job in the client 21, i.e., at the step H80, the control in the client 21 is finished when a message indicating reception impossible is sent from the network 20.

In receiving the print job in the print server 24, i.e., at the step H84, a message indicating reception impossible is sent to the network 20 when any abnormal condition occurs in the hard disk 43 or the like in the print server 24, and the control in the print server 24 is finished.

In a variety of standby states in the client 21, the standby time in the standby state is counted and the control in the client 21 is finished when the standby time has exceeded a predetermined value.

In writing the data into the external storage medium from the client 21, i.e., at the step H83, it is checked whether the external storage medium has been properly formatted. When the external storage medium has not been properly formatted, formatting of the external storage medium is executed prior to writing the data.

In writing the data into the external storage medium from the client 21, i.e., at the step H83, it is inspected whether or not the data were written into the external storage medium as well as whether the formatting was properly executed. When the result of inspection is not proper, a message is sent to the network 20 to designate the discontinuation of throw-in of print, and the control in the client 21 is finished.

In the standby state of the print server 24 waiting for the reception of the print throw-in end message, i.e., in the standby state at the step H87, the standby time is counted. When the standby time exceeds a predetermined value or when the message designating the discontinuation of print throw-in is sent from the network 20 during the standby period, the control in the print server 24 is finished.

Prior to finishing the control, however, the above-mentioned newly secured spool region D70 is released, and the spool region pointer designating the spool region is deleted from the held print management region D75.

Examples of Control in the Printing

Described below are examples of control in the printing. FIGS. 12 is a flow chart illustrating examples of print control executed in the print servers 24 and 25. This control is executed at all times in the print servers 24 and 25 in parallel with other controls. In the following description, the control is executed assuming the print server of the constitution shown in FIG. 7.

It is inspected at a step H91 whether a spool region pointer is registered to the spool management region D71 or not. The spool management region D71 is initialized with the singular value 0. The spool region 070 is secured in a storage region having an address which is larger than 0. Therefore, the inspection is carried out by collating the spool region pointers D71a, D71b and 71c with the above singular value.

When the spool region pointer has not been registered to the spool management region D71, the interrupt print flag D72a in the interrupt print management region D72 is examined. When the interrupt print flag D72a is designating that the interrupt print is unnecessary, registration in the spool management region D71 is judged again. Under this condition, inspection of registration in the spool management region D71 and inspection of the interrupt print flag D72a are repeated at the step H91.

When the spool region pointer has been registered to the spool management region D71, on the other hand, the print data D70i in the spool region D70 designated by the spool region pointer D71a registered to the head of the spool management region D71 are successively read out, the print control unit 40e is controlled based upon the print data D70i, and the printing is executed by the printer mechanical unit 42.

At this moment, as the print data D70i are successively read out and a print data at the head of each printed page is found, a pointer that instructs this print data is recorded into a page head print data pointer D72b of the interrupt print management region D72.

The print data at the head of each printed page stands for a print data at the head and a print data next of the page-renewing mark in the print data D70i. The print data right after the range of printing of one page represents the head data despite there is no page-renewing mark just before it.

When the print data D70i are all printed, the spool region D70 is released. Furthermore, the positions of registration of the spool region pointers registered to the spool management region D71 are shifted up by one, respectively, and the spool region pointer D71a registered to the head of the spool management region D71 is deleted.

The spool management region D71 is updated by a method that does not cause trouble even when the region where the print is thrown in (where the print job is thrown into a print server such as a network) is updated in parallel with the updating of the same region by this control operation. This method has been known in a field where there is used a semaphore which is a system that controls the execution among the process in accordance with a rule that has been determined among different process, and is not described here. The same holds even for other storage regions.

During the execution of the printing, furthermore, the interrupt print flag D72a in the interrupt print management region D72 is inspected by utilizing the time until the printer control unit 40e becomes ready to accept the next print data. The printing is continued when the interrupt print flag D72a is designating that the interrupt printing is unnecessary.

The control shown in FIG. 12{(b) portion} is executed in parallel with the above control. At a step H90, it is examined whether or not the external storage medium is loaded in the external storage medium drive unit 41 or not. When the external storage medium is not loaded, the checking is repeated.

When the external storage medium is loaded, the control is shifted to a step H92 where the external storage medium drive control unit 40d is controlled and the collation key recorded in the external storage medium is retrieved. The retrieval is carried out as described below. First, print server addresses D61a of the control block pointers D61 recorded in the control block pointer list D60a are compared with the printer ID that is assigned thereto.

When there are no control block pointers D61 that coincide as a result of comparison, the control is shifted to a step H93 after the external storage medium is unloaded, and the control returns to the step H90.

When there are control block pointers D61 that coincide as a result of comparison, a job control block nest counter D61c of the control block pointer D61 is examined. When the counter value is 0, the control is shifted to the step H93 after the external storage medium is unloaded, and the control returns to the step H90.

When the counter value of the job control block nest counter D61c is not 0, a collation key D62h of the job control block D62 instructed by the job control block pointer D61b is read out. Here, the collation key D62h is tentatively referred to as collation key (A).

Next, it is inspected whether or not a spool region pointer is registered to the held print management region D75. The held print management region D75 is initialized with the singular value 0. Further, the spool region D70 is secured in a storage region of an address which is larger than 0. Therefore, this inspection is carried out by collating the spool region pointers D75a, D75b and D75c with the above singular value.

When the spool region pointer has not been registered to the held print management region D75, the control is shifted to the step H93 after the external storage medium is unloaded, and the control returns to the step H90. At this moment, the interrupt print flag D72a is so set as to designate that the interrupt printing is unnecessary.

When it has been registered, on the other hand, collation keys D70h of spool regions D70 designated by the registered spool region pointers D75a, - - - are successively read out and are compared with the above collation key (A).

When there is no spool region D70 having coincident collation key as a result of comparison, the collation key D62h of the job control block D62 designated by the job control block pointer D62a of the job control block D62 storing the collation key (A) is used as a new collation key (A), and the spool region D70 is retrieved that has a collation key that coincides in a manner as described above.

In repeating the collation key retrieval, when the job control block pointer D62a is designating the above singular value, the control is shifted to the step H93 after the external storage medium is unloaded, and the control returns to the step H90. At this moment, the interrupt print flag D72a is so set as to designate that the interrupt printing is unnecessary.

When there is a spool region D70 having a collation key that coincides, the control is shifted to a step H94 where the interrupt print flag D72a of the interrupt print management region D72 is so set as to designate the request of interrupt printing. Then, the standby state is established until the interrupt print flag D72a is so set as to designate interrupt print permission.

At the step H91, when the interrupt print flag D72a is designating the request of interrupt printing while the interrupt print flag D72a is being checked, the control in the printer control unit 40e is suppressed.

Here, however, when the print discontinue select flag D73d in the setpoint storage region D73 is designating a page unit, the control in the printer control unit 40e is suppressed after the printing is finished on a page that is being printed.

Then, at the step H91, the interrupt print flag D72a is so set as to designate the interrupt print permission. At the step H94, the standby state is released. At the step H91, on the other hand, the standby state is maintained until the interrupt print flag D72a is so set as to designate interrupt print unnecessary.

When the standby state is released at the step H94, the printer control unit 40e is controlled at the step H94, and the print data D70i in the spool region D70 having a collation key that is coincident are printed by the printer mechanical unit 42. After the printing is finished, the control is shifted to a step H95.

At the step H95, the spool region D70 having the collation key that coincides is released. Further, the spool region pointer designating the spool region D70 is deleted from the held print management region D75.

In the external storage medium, furthermore, the job control block D62 having the coincident collation key is released at the step H95. When the print data block pointer D63i of the job control block D62 does not have the above singular value, the print data block D63 designated by the pointer is released, too.

Furthermore, content of the job control block pointer D62a of the job control block D62 is copied into the job control block pointer D61b or into the job control block pointer D62a that is designating the job control block D62.

Moreover, 1 is subtracted from the job control block nest counter of the control block pointer D61 having the print server ID that is coincident. The control then returns to the step H92.

After the repetition of such interrupt printing, the interrupt print flag D72a is so set as to designate interrupt printing unnecessary and returns back to the step H80. The suppression of print at the step H91 is released.

At the step H81, the page head print data pointer D72b is read out. When the printing had been discontinued, the printing of print data designated by this pointer is resumed.

In retrieving the collation key, i.e., at the step H92, the job name D62g of the job control block D62 in which the collation key (A) has been recorded is compared with a job name that has been registered to the processed job list D74.

As a result of this comparison, when a job name which is the same as the job name of the job control block D62 has been registered to the processed job list D74, the job control block D62 in which the collation key (A) has been recorded is released in the external storage medium.

When the print data block pointer D63i of the job control block D62 does not have the above singular value, the print data block D63 designated by this pointer is released, too.

Contents of the job control block pointer D62a of the job control block D62 are copied onto the job control block pointer D61b or onto the job control block pointer D62a that is designating the job control block D62.

Then, one is subtracted from the job control block nest counter of the control block pointer D61 that is recording a print server address D61a that coincides with the print server ID thereof.

When the processed job output destination D73c of the setpoint storage region D73 is designating the printing, the printer control unit 40e is controlled and the coincident job name is printed by the printer mechanical unit 42. When the processed job output designation D73c is designating the display, on the other hand, the display panel control unit 40g is controlled and the coincident job name is displayed on the display panel 44.

In retrieving the collation key, i.e., at the step H92, the collation key (A) only is not collated but also the client's address D62b, reception date and time D62c, retention period D62d, retention period end process flag D62e, received data length D62f and job name D62g in the job control block D62 may be collated with the client's address D72b, reception date and time D72c, retention period D72d, retention period end process flag D72, received data length D72f and job name D72g of the spool region D70, respectively. In this case, the control is shifted to the step H94 when all of these collations are coincident, and the interrupt printing is executed.

During the interrupt printing, i.e., at the step H94, inspection is regularly carried out concerning whether or not the data are properly read out from the external storage medium and whether the external storage medium is loaded or not.

When abnormal condition is found as a result of inspection, when there occurs poor reading or when the external storage medium is not loaded, the interrupt printing is discontinued and alarm is displayed on the display panel 44. Then, the time in which the inspection indicates abnormal condition is counted.

When the inspected state returns to normal at the step H94, the interrupt printing that has been discontinued is resumed. When this time exceeds a predetermined value, however, the interrupt print flag D72$a$ is so set as to designate interrupt printing unnecessary, and the control returns to the step H90.

According to this control, the print job that is set to designate security when the print is thrown in is held from being executed until the external storage medium that had been loaded in the client at the time when the print job was thrown in is loaded in the print server that has received the print job.

That is, by designating security at the time of throwing in the print that is desired to be kept secret from other persons, it becomes possible to hold the printing. The user then goes to the print server carrying in person the external storage medium that was used for throwing in the print, and then the print that should be kept secret is printed out in the presence of the user who has thrown in the print.

Even if the other person wishes to obtain the print, he is not allowed to execute the printing unless he carries with him the external storage medium that was used for throwing in the print. The other person may try to forge the external storage medium. However, the collation key is so long as described above that it is quite difficult to bring it into coincidence by trial and error.

According to the above control, furthermore, unloading the external storage medium discontinues the execution of the print job that was set to designate security. In attending the execution of the printing that is desired to be kept secret from other persons, in case it happens that the secrecy cannot be maintained, then the user unloads the external storage medium and brings the printing into halt.

Examples of Control in the Held Print Job Management

Described below is an example of control in the held print job management. FIG. 13 is a flow chart illustrating an example of controlling the held print job management executed in the print servers 24 and 25. This control is executed in the print servers 24 and 25 at all times in parallel with other controls. In the following description, the control is carried out assuming a print server having the constitution as shown in FIG. 7.

At a step H100, spool regions D70 designated by spool region pointers D75$a$, - - - registered to the held print management region D75 are successively read out. The successive reading proceeds after every passage through a step H102, and returns to the first when the control returns from a step H101 back to the step H100.

At a step H103, the final retention date and time is calculated from the reception date and time D70$c$ of the spool region D70 that is read out and from the retention period D70$d$. The final retention date and time that is calculated is compared with the present date and time. When the final retention date and time is not exceeding the present date and time, the control is shifted from a step H104 to the step H102. When it has exceeded, the control is shifted to a step H105 where the job name D70$g$ of the spool region D70 that is read out is registered to the processed job list D74. Besides, a spool region pointer designating the spool region D70 is deleted from the held print management region D75.

At the step 105, furthermore, the retention period end process flag D73$b$ is inspected and when the holding release is designated, a pointer that designates the spool region D70 is registered to the spool management region D71. When the holding deletion is designated, the spool region D70 is released.

Examples of Control in the Held Print Job Collation

Next, described below is an example of control in the held print job collation by assuming the case where the held print job is collated to the print server 24 by manipulating the client 21. Here, the print server 24 has the constitution shown in FIG. 7.

The operator loads the external storage medium in the external storage medium drive unit 31, and manipulates the keyboard 53 to select the held print job collation. Then, the CPU 30$b$ in the client 21 starts controlling the operation shown in (a) portion of FIG. 14.

At a step H110, the control block pointer list D60$a$ is read out from the external storage medium, and print server addresses D61$a$ of the control block pointers D61 are displayed on the display 32 to promote the operation for selecting the print server.

When the operator selects the print server, a job control block pointer D61$b$ of the control block pointer D61 corresponding to the selected print server address is read out. The job control block D62 designated by the job control block pointer D61$b$ is read out.

When the job control block pointer D62$a$ of the job control block D62 does not have the above singular value, a job control block D62 designated by the job control block pointer D62$a$ is further read out. This reading is continued until the job control block pointer D62$a$ to which the singular value is set is found.

Job names D62$g$ of the job control blocks D62 that are read out are displayed on the display 32 to promote the operation for selecting the job that is inquired. When the operator selects the job that is inquired, the control is shifted to a step H111.

At the step H111, the holding collation message and the selected job name are sent to the network 20. Thereafter, the standby state is maintained until the data are received from the network 20.

The print server 24 receives the data transmitted from the network 20, and the control shown (b) portion of in FIG. 14 is started as the holding collation message is decoded. At a step H114, the spool regions D70 designated by the spool region pointers D75$a$, - - - registered to the held print management region D75 are read out.

Then, the job names D70$g$ of the spool regions D70 that are read out are compared with the job name that is transmitted. When there exist coincident spool regions D70 as a result of comprison, a response designating being held is transmitted at a step H115 to the network 20.

When there are no coincident spool regions D70 as a result of comparison, a response designating not being held is transmitted at the step H115 to the network 20, In either case, the control in the print server 24 is finished.

When the client 21 receives this response from the network 20, the standby state is relieased, and the control is shifted to a step H112 where the content designated by the response is displayed on the display 32.

When the response is designating being held, the control in the client 21 is finished. When the response is designating not being held, the control is shifted to a step H113.

At the step H113, the job control block D62 corresponding to the selected job name is released. When the print data block pointer D63i of the job control block D62 does not have the above singular value, the print data block D63 designated by the pointer is released.

Contents of the job control block pointer D62a of the job control block D62 are copied onto the job control block pointer D61b or onto the job control block pointer D62a that is designating the job control block D62.

Moreover, 1 is subtracted from the job control block nest counter of the control block pointer D61 that corresponds to the above selected print server. The control in the print server 24 is finished.

Example of Control in Changing the Condition of Holding the Pint Job

Described below is an example of control in changing the condition of holding the print job assuming the case where the client 21 is manipulated to designate to the print server 24 a change in the condition of holding the print job. Here, the print server 24 has the constitution shown in FIG. 7.

The operator loads the external storage medium in the external storage medium drive unit 31 and manipulates the keyboard 53 to select a change in the condition of holding the print job. Then, the CPU 30b in the client 21 starts controlling the operation shown in (a) portion of FIG. 15.

At a step H120, a control block pointer list D60a is read out from the external storage medium, and print server addresses D61a of the control block pointers D61 are displayed on the display 32 to promote the operation for selecting the print server.

When the operator selects the print server, a job control block pointer D61b of a control block pointer D61 corresponding to the selected print server address is read out. Then, a job control block D62 designated by the job control block pointer D61b is read out.

When the job control block pointer D62a of the job control block D62 does not have the above singular value, the job control block D62 designated by the job control block pointer D62a is further read out. This reading is continued until a job control block pointer D62a to which the singular value is set is found.

Job names D62g of the job control blocks D62 that are read out are displayed on the display 32 to promote the operation for selecting the job of which the holding condition is changed. When the operator selects the job of which the holding condition is changed, a menu is displayed on the display 32 to promote the operation for selecting the contents of change. The contents of change is a change in the retention period, the deletion of holding or the release of holding.

When the operator selects the content of change, the control is shifted to a step H121. Here, when the contents of change is a change in the retention period, a desired retention period can be designated, too.

At the step H121, a message designating the contents of change, a selected job name, and a collation key D62h of the job control block D62 corresponding to the job name are transmitted to the network 20. When the contents of change is a change in the retention period, the desired retention period is transmitted, too. Thereafter, the standby state is maintained until the data are received from the network 20 at the step H122.

The print server 24 receives the transmitted data from the network 20, and the control operation shown in (b) portion of FIG. 15 is started upon decoding the above-mentioned message. At a step H124, spool regions D70 designated by the spool region pointers D75a, - - - registered to the held print management region D75 are read out.

Job names D70g of the spool regions D70 that are read out are compared with the job name that is transmitted. When the spool regions D70 do not have job names that coincide with each other, the control is shifted to a step H128 where a response designating that there is no corresponding job is transmitted to the network 20. The process in the print server 24 is then finished.

When there is a spool region D70 having job name that coincides with the above job name as a result of comparison, the collation key D70h of the spool region D70 is compared with the collation key that is transmitted. When the collation keys do not coincide as a result of comparison, the control is shifted to a step H128, and a response designating change impossible of the job is transmitted to the network 20. The control in the print server 24 is then finished.

When the collation keys coincide as a result of comparison, the control is shifted to a step H125, H126 or H17 depending upon a command that is transmitted. That is, when it is a change in the holding period, the control is shifted to the step H125. When it is the deletion of holding, the control is shifted to the step H126. When it is the release of holding, the control is shifted to the step H127.

At the step H125, the desired retention period that is transmitted is stored in the retention period D70d of the spool region D70 with which the above collation key coincides. At this moment, when the desired retention period is greater than a value that has been set to the maximum retention period D73a of the setpoint storage region D73, a value that is set to the maximum retention period D73a is stored in the retention period D70d.

Thereafter, the control is shifted to a step H128 where a response designating normal end and the retention period stored in the retention period D70d are transmitted to the network 20. The control in the print server 24 is then finished.

At the step H126, the spool region D70 with which the collation key is coincident is released. Besides, the spool region pointer designating the spool region D70 is deleted from the held print management region D75. Thereafter, the control is shifted to the step H128 were a response designating normal end is transmitted to the network 20. The control in the print server 24 is then finished.

At the step H127, the spool region pointer designating the spool region D70 with which the collation key is coincident is deleted from the held print management region D75, and this pointer is registered to the spool management region D71. Thereafter, the control is shifted to the step H128 where a response designating normal end is transmitted to the network 20. The control in the print server 24 is then finished.

When the client 21 receives these responses from the network 20, the standby state is released and the control is shifted to the step H123. When the response is not designating normal end at the step H123, updating of the content stored in the external storage medium is suppressed. The control in the client 21 is then finished.

When the content of change is a change in the retention period and when the response is designating normal end, the retention period that is transmitted is recorded at the step H123 into the retention period D62d of the job control block D62 of the external storage medium that corresponds to the above selected job name. The control in the client 21 is then finished.

When the contents of change are the deletion or the release of holding and when the response is designating normal end, the job control block D62 corresponding to the above selected job name is released in the external storage medium. When the print data block pointer D63*i* of the job control block D62 does not have the above singular value, the print data block D63 designated by the pointer is released, too.

Furthermore, contents of the job control block pointer D62*a* of the job control block D62 are copied onto the job control block pointer 61*b* or onto the job control block pointer D62*a* that is designating the job control block D62.

Moreover, 1 is subtracted from the job control block nest counter of the control block pointer D61 that corresponds to the above selected print server. The control in the client 21 is thus finished.

Example of Control in Displaying the Contents of Held Print Jobs

Described below is an example of control in displaying the contents of the held print jobs assuming the case where the contents of the held print jobs are confirmed by manipulating the client 21.

The operator loads the external storage medium in the external storage medium drive unit 31 and manipulates the keyboard 33 to select the confirmation of contents of the held print job. Then, the CPU 30*b* in the client 21 starts controlling the operation shown in FIG. 16.

At a step H130, a control block pointer list D60*a* is read out from the external storage medium, and print server addresses D61*a* of the control block pointers D61 are displayed on the display 32 to promote the operation for selecting the print server.

When the operator selects the print server, a job control block pointer D61*b* of the control block pointer D61 corresponding to the selected print server address is read out. Then, a job control block D62 designated by the job control block pointer D61*b* is read out.

When the job control block pointer D62*a* of the job control block D62 does not have the above singular value, the job control block D62 designated by the job control block pointer D62*a* is further read out. The reading is continued until a job control block pointer D62*a* to which the singular value is set is found.

Job names D62*g* of the job control blocks D62 that are read out are displayed on the display 32. The control is shifted to a step H131 where the operation for selecting the process is promoted. The process for promoting the selection include display of print contents of the held print jobs, setting of the printing order of the held print jobs, and end of the control.

When the operator selects the end of control at the step H131, the control in the client 21 is finished.

When the operator at the step H131 selects the display of print contents of the held print jobs, the selecting the held job is promoted to display the print contents.

When the operator selects the held job to display the print contents, a print data block pointer D62*i* of the job control block D62 corresponding to the job name is read out. When the pointer has the above singular value, a message meaning display of print content impossible is displayed on the display 32, and the control returns to the step H131.

When the pointer does not have the above singular value, the print data D63*d* of the print data block D63 designated by the pointer is displayed on the display 32. The control then returns back to the step H131.

When the operator at the step H131 selects the setting of the printing order of the held print jobs, the control is shifted to the step H133 where the message is displayed on the display 32 to promote the operation for setting the order of printing.

When the operator sets the order of printing, the control is shifted to the step H134 where a pointer designating the job control block D62 corresponding to a print job that is designated to be printed first is recorded into the job control block pointer D61*b* of the control block pointer D61 of the external storage medium that corresponds to the selected print server.

Then, a pointer that designates the job control block D62 corresponding to a print job that is designated to be printed in the second time is recorded onto the job control block pointer D62*a* of the job control block D62.

The same recording is effected for the third and subsequent print jobs. Here, however, the above singular value is recorded into the job control block pointer D62*a* of the job control block D62 that corresponds to a print job that is designated to be printed last. When the recordings are all finished, the control returns back to the step H131.

Processed job confirming control

Processed job confirming control will be explained. FIG. 17 is a flowchart showing an example of the processed job confirming control carried out by the print servers 24 and 25. This control starts when the ten-key pad 45 or keyboard 53 is operated in any one of the print servers 24 and 25. The control in the print server 24 of FIG. 7 will be explained.

Step H140 reads job names out of the list D74 of processed jobs. If a destination D73*c* in an area D73 for storing set values is a printers step H111 controls the printer controller 40*e* to let the printer 42 print the job names. This completes the processed job confirming control in the print server 24.

If the destination D73*c* is a display, the display panel controller 40*g* displays the job names on the display panel 44, and the control ends.

Set value changing control in print server

Set value changing control in a print server will be explained. FIG. 18 is a flowchart showing an example of the set value changing control in the print servers 24 and 25. This control starts when the ten-key pad 45 or keyboard 53 is operated in any one of the print servers 24 and 25. The control in the print server 24 of FIG. 7 will be explained.

Step H150 displays a message on the display panel 44, to prompt an operator to enter a maximum retention period of a queued print job. The operator enters the maximum retention period with the ten-key pad 45, and it is registered as a maximum retention period D73*a*.

Step H151 displays a message on the display panel 44, to prompt the operator to select a method of handling the queued print job after the expiration of the retention period. Namely, the operator determines whether the print job must be deleted or released from the queue after the retention period. When the operator makes a choice with use of the ten-key pad 45, the choice is registered in a retention period end process flag D73*b*.

Step H152 displays a message on the display panel 44, to prompt the operator to select a processed job destination. The destination is one of the printer and display as mentioned above. When the operator makes a choice with use of the ten-key pad 45, the choice is registered in the processed job destination D73*c*.

Step H153 displays a message on the display panel 44, to prompt the operator to select a method of suspending the print job due to interrupt printing. This step determines whether or not a page under printing must be completed. When the operator makes a choice with use of the ten-key pad 45, the choice is registered in a print suspension selection flag D73d.

Step H154 displays a message on the display panel 44, to prompt the operator to determine whether or not the list of processed jobs must be deleted. If the operator determines with the ten-key pad 45 not to delete the list, the control in the print server 24 ends.

If the operator determines to delete the list, step H155 initializes the list D43, and the control in the print server 24 ends.

Connection confirming control

An example of connection confirming control carried out by the client 21 to confirm whether or not it is connected to the print server 24 will be explained. FIG. 19 is a flowchart showing the example.

In step H160, the client 21 sends a response request message to the network 20. Step H161 waits for a response from the network 20.

The print server 24 receives the message from the network 20, decodes the message, and starts the control of (b) portion of FIG. 19. If the print server 24 is available, it sends an available message to the network 20, and the control in the print server 24 ends.

If the print server 24 is not available in the step H162, it sends an unavailable message to the network 20, and the control in the print server 24 ends.

Upon receiving the response, the client 21 releases the wait state, and the control in the client 21 ends. During the wait state, a waiting period is counted, and if the period exceeds a predetermined value, the control in the client 21 ends.

If the client 21 receives the available message from the network 20, the client 21 determines that network connection to the print server 24 is normal, and in the other case, it determines that the same is abnormal.

Another method of ensuring security

Figure 20:
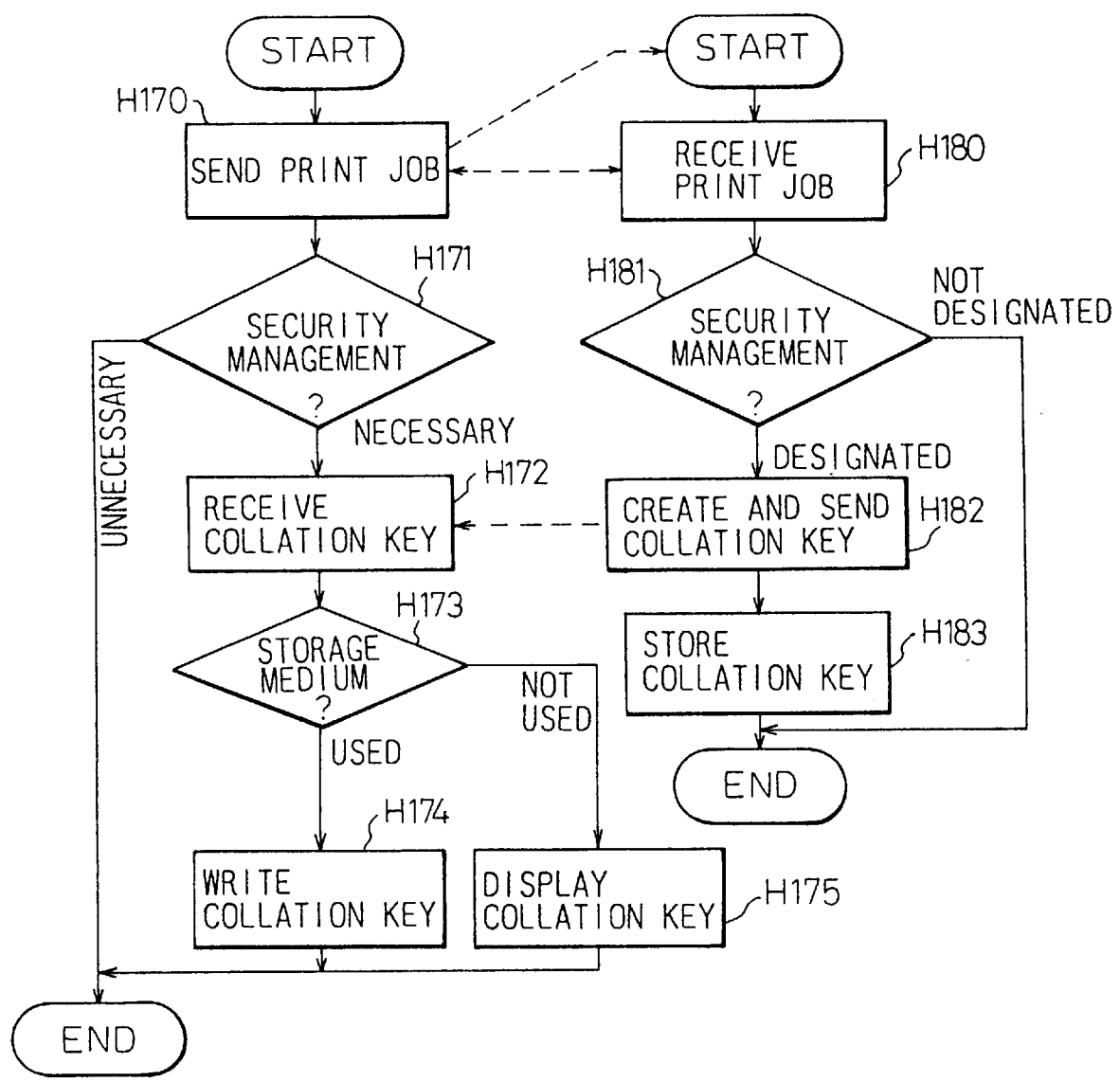
FIGS. 20(*a*) & 20(*b*) are a flowchart explaining a second example of the print job inserting control according to the present invention.

Another method of ensuring security will be explained. Instead of the control procedure of FIG. 11, a control procedure of FIG. 20 is employed. The print servers 24 and 25 are provided with an additional control procedure of FIG. 21. The CPUs 40b and 50b always carry out this control procedure in parallel with other control procedures carried out in each of the print servers 24 and 25.

Second example of print job inserting control

A second example of the print job inserting control will be explained. In this example, the client 21 sends a print job to the print server 25. The print server 25 has the arrangement of FIG. 8. An operator controls the keyboard 53 of the client 21 and selects a print job inserting operation. Then, the CPU 30b of the client 21 starts the control of (a) portion of FIG. 20.

Step H170 is the same as the step H80 of FIG. 11. Namely, it sends a print job to the network 20. In addition to the print job setting operation, the operator must carry out a collation key output specifying operation to determine whether or not a storage medium is used.

The step H170 sends the collation key output specification to the network 20 together with the print job set values and print data, The print server 25 receives these data from the network 20 and starts the control of (b) portion of FIG. 20.

Step H180 is the same as the step H84 of FIG. 10. Namely, it accepts the print job. Steps H181, H182, and H183 create a collation key, send it to the network 20, and store it. This completes the control. These steps are the same as the steps H85, H86, and H87 of FIG. 11.

The step H182 creates the collation key if the collation key output specification instructs to use the storage medium. If it instructs not to use the storage medium, a collation key of several digits to ten and several digits is created from random numbers.

In steps H171 and H172, the client 21 receives the collation key from the network 20. These steps are the same as the steps H81 and H82 of FIG. 11.

Step H173 checks the collation key output specification. If the collation key output specification instructs to use the storage medium, step H174 writes the collation key into the storage medium. This step is the same as the step H83 of FIG. 11. Then, this control ends.

If the collation key output specification instructs not to use the storage medium, step H175 displays the collation key on the display 32. The step H175 waits for an operator entering a display stop instruction. When the operator enters the display stop instruction, this control ends.

Second example of printing control

Figure 21:
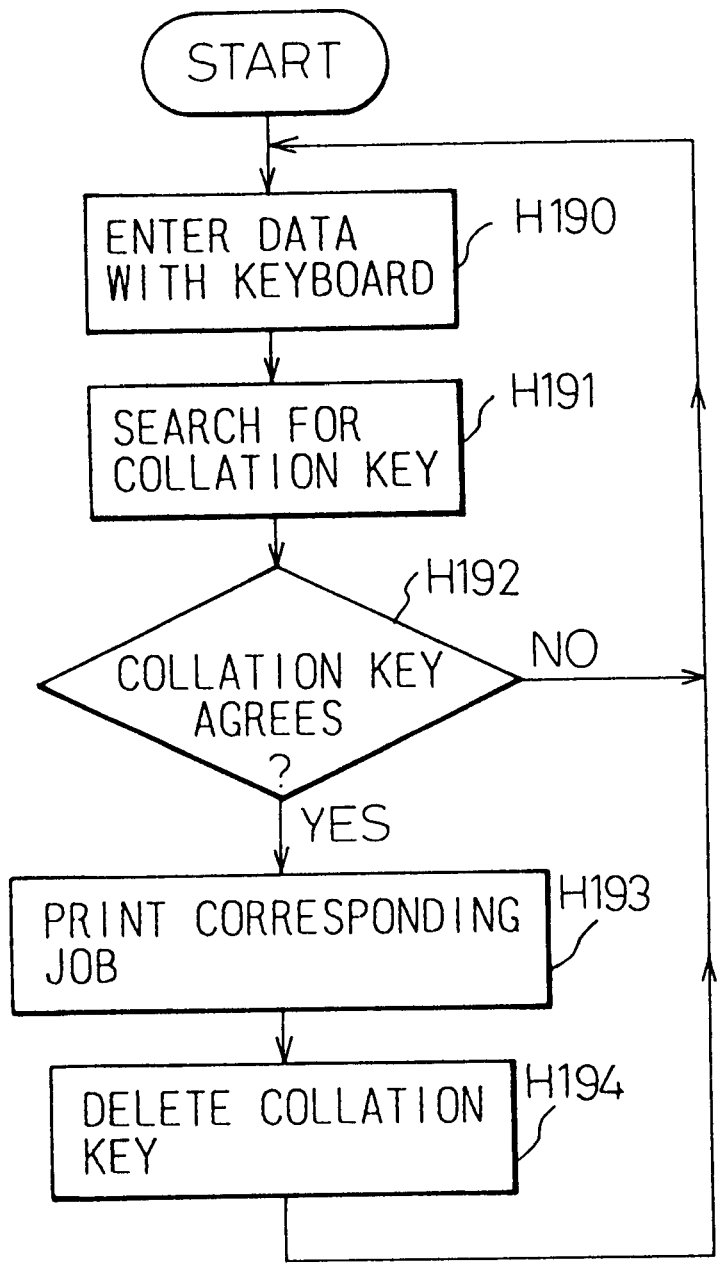
FIG. 21 is a flowchart showing a second example of the printing control in the print server according to the present invention.

A second example of the printing control will be explained. FIG. 21 is a flowchart showing the additional control procedure provided for the print servers 24 and 25. Due to this addition, the step H94 of (b) portion of FIG. 12 is provided with control for waiting the interrupt print flag D72a to indicate an interrupt print unrequested state before setting the flag D72a to an interrupt print requesting state.

The steps H92 and H93 of (b) portion of FIG. 12 set the flag D72a to the interrupt print unrequested state if a collation key disagrees with codes. This control is replaced with control of setting the flag D72a to the interrupt print unrequested state only when the step H94 sets the flag D72a to the interrupt print requesting state.

If the print server is of the arrangement of FIG. 8, the keyboard 53 is operated in step h190, and the keyboard controller 50f provides the CPU 50b with codes, which are stored in the memory 50c in time series. When a specific key of the keyboard 53 is operated, the stored data are deleted. When another specific key of the keyboard 53 is operated, step H191 starts.

If the print server is of the arrangement of FIG. 7, the ten-key pad 45 is operated in the step H190, and the ten-key controller 40h provides the CPU 40b with codes, which are stored in the memory 40c in time series. When a specific key of the ten-key pad 45 is operated, the stored data are erased. When another specific key of the ten-key pad 45 is operated, the step H191 starts.

The step H191 tests whether or not a spool area pointer is registered in the held print (queued print job) management region D75. If it is not registered, step H192 is carried out, and the flow returns to the step H190. At this time, the stored codes are deleted.

If the spool region pointer is registered, a collation key D70h in each spool region D70 indicated with a registered spool region pointer D74a is sequentially read and compared with the codes. If the job control block pointer D62a indicates the singular value mentioned above, the step H192 is carried out, and the flow returns to the step H190. At this time, the stored codes are erased.

If there is any spool region D70 whose collation key agrees with the codes, step H193 waits for the interrupt print flag D72a in the interrupt print management region D72 to indicate the interrupt print unrequested state. If the flag D72a indicates this state, the flag D72a is set to the interrupt print requesting state.

The step H193 waits for the interrupt print flag D72a to indicate an interrupt print enabled state, When the flag D72a indicates this state, the step H193 prints print data D70i in the spool region D70 whose collation key has agreed with the codes. After the completion of the printing, step H194 deletes the stored codes and sets the flag D72a to the interrupt print unrequested state.

The step H194 releases the spool region D70 whose collation key has agreed with the codes. The spool region pointer indicating the spool region D70 is removed from the held print management region D75. The flow then returns to the step H190.

If the print server receives a security print job for which no storage medium has been assigned, the print server holds the print job until a collation key displayed at the client is entered.

In this way, any security print job is kept in the print server, if no storage medium is allotted for the job. When a user who made the security print job sends the job to the print server, a collation key is displayed on the client device of the user. The user memorizes or writes down the collation key and goes to the print server to let it print the security print job in front of the user.

Figure 22:
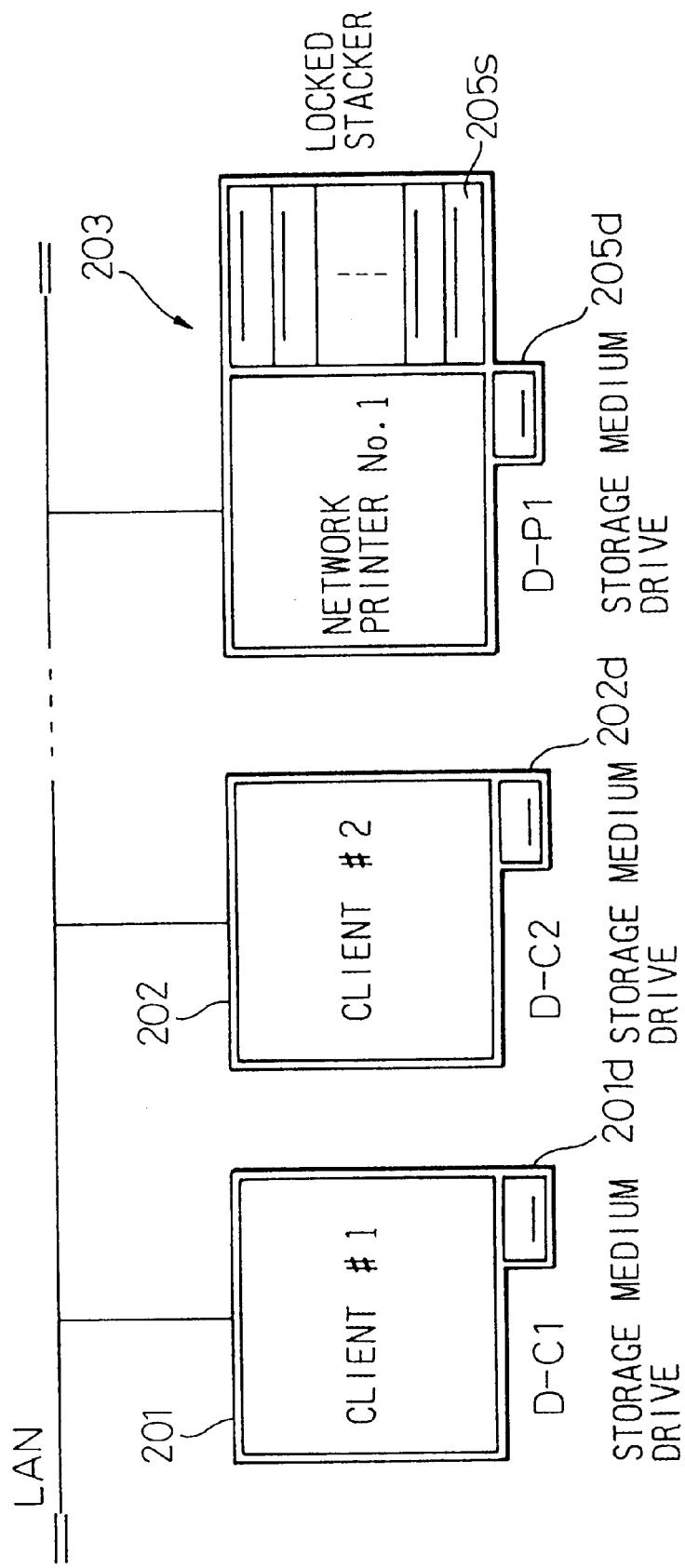
FIG. 22 is a block diagram showing a second embodiment of the present invention.

FIG. 22 is a block diagram showing a second embodiment of the present invention. A net work such as a LAN is connected to a plurality of clients 201 (#1) and 202 (#2) and a network printer 203 (No. 1) serving as a shared print server. A security ensuring system for this network will be explained.

If there is only the shared print server and there are no local printers, it is difficult to handle a security print job. It is uncertain when the network printer prints the security print job. Accordingly, a user must run to the network printer as soon as he or she sends the job to the network printer and must wait for a long time in front of the printer until it prints the job. This is unreasonable.

To solve this problem, the first embodiment (FIGS. 5 to 21) of the present invention handles a collation key between a client and a print server through a common storage medium. A user goes to the network printer, installs the storage medium in the printer, and starts printing, thereby ensuring the security of print results. This embodiment starts the printing of a specified job only when a storage medium having a corresponding collation key is installed in the print server. Accordingly, the user must go to the printer and wait at there until the job is completely printed. This is inconvenient when it is urgent or when the number of printing is large.

The second embodiment of the present invention solves the drawbacks of the first embodiment.

In FIG. 22, the printer of the shared print server 203 has ordinary stackers (trays) and locked stackers 205s usually locked with electronic locks. Each locked stacker may have boxes to receive printed sheets job by job. The boxes may include ordinary boxes with no locks and individually lockable (locked) boxes. The lockable boxes may be allocated for specific users, respectively, or dynamically allocated for jobs. It is possible to employ the fixedly allocated and dynamically allocated boxes together. In the following explanation, the "stacker" may be the fixedly allocated box or the dynamically allocated box. The locked stacker 205s is incorporated in the network printer. In FIG. 22, the locked stacker 205s is a separate structure from the network printer for the sake of explanation. In practice, the locked stacker 205s is integrated with the network printer.

One of the clients adds a security request to a print job and send them to the network printer 203. The security request takes one of the following three methods, instead of users specifying one of the methods, any one of the methods may be set as a system default,

* Method 1

This method outputs a print job through interactive operations between the client and the print server. The print server provides the client with various data such as data related to whether or not print results are provided to the stacker and waits for a response from the client. Depending on the response, one of the methods 2 and 3 is selected.

* Method 2

This method preferentially outputs a print job to the ordinary stacker. The print job is queued until a storage medium is installed in a storage medium drive DP1 of the network printer, and when the medium is installed, priority is given to the job and print results are delivered into the ordinary stacker.

* Method 3

This method outputs a print job to the lockable stacker. The print job is queued until the lockable stacker becomes available, and when it becomes available, the job is printed and print results are delivered into the locked stacker. This stacker is fixedly or dynamically allotted for the job. Each user may specify the same locked stacker. In this case, jobs of one user are delivered into the same stacker if the stacker has a sufficient space. It is possible to specify whether or not a given job is handled prior to a usual job. If this job is not printed yet when a corresponding storage medium is installed in the network printer, it is possible to change the job to the ordinary stacker (the method 2).

Upon receiving a security request, the print server checks the contents of the request and takes necessary steps.

Method 2

The print server activates the same process as that of the first embodiment, puts the security job in a queue, and notifies the client of management data. Upon receiving the management data, the client recognizes that the job has been correctly accepted, and writes the management data into a predetermined storage medium. The method 2 is basically the same as the first embodiment, although it involves slight changes in a flag area related to the method in the management data.

Method 3

The print server notifies the client of management data for the security job and checks to see whether or not the locked stacker is available. Namely, it checks to see whether or not the locked stacker is empty, or whether or not the stacker has a space if the stacker is used by the same user.

If the stacker is available, the print job is printed with respect to the stacker.

If the stacker is not available, the print server monitors the availability of the stacker and an insertion of a corresponding storage medium, and as soon as printing is enabled, prints the job.

The printing is carried out after estimating a space in the stacker according to the number of print pages if the number is known, and if not, the quantity of print data. If a stacker full sensor (to be explained later with reference to FIG. 27) detects during printing that the remaining space of the stacker is insufficient, another locked stacker is secured, and the remaining pages are delivered into this stacker. If no other locked stacker is available, a processed position of the job is marked, and the job is suspended. Thereafter, a normal job is printed with respect to the ordinary stacker. Whenever the locked stacker becomes available, the suspended job is resumed.

The clients have storage medium drives D-C1 and D-C2, respectively, to write management data into their storage media. The management data include information indicating that a security job is going to be printed into the locked stacker. A user brings the storage medium containing the management data to the network printer and installs the storage medium in the storage medium drive D-P1 of the print server. During a monitoring period, the print server inspects the management data of the installed medium to find a corresponding print job. If there is no corresponding print job, the print server displays an error message, and if there is, it checks the situation of the job.

<1> If the print job has been printed and delivered into the locked stacker, the print server unlocks the stacker.

<2> If the print job is being printed into the stacker, one of the modes mentioned below is selected. One of the modes a and b may be preset in the system, or a user may select one when the user sends a job request or when the user installs the storage medium in the print server.
  a) The job is printed up to the last page, and the stacker is unlocked.
  b) The present page is finished into the stacker, and the stacker is unlocked. The remaining pages are delivered into the ordinary stacker.
  c) The present print job is cancelled.

<3> If the print job is not printed yet, the print server displays the matter on a display and lets the user select one of the modes mentioned below. One of the modes a, b, and c may be preset in the system, or the user may select one when requesting the job or when installing the storage medium.
  a) Wait until the locked stacker becomes available,
  b) Preferentially print the print job with respect to the ordinary stacker (the method 2).
  c) Switch the print job to the ordinary stacker.
  d) Cancel the print job.

When a storage medium storing the management data of a security job is installed in the print server, the print server unlocks the stacker. At this time, the print server takes one or both of the measures mentioned below to indicate the location of the stacker where print results of the job are stored.

Display a message indicating the location of the stacker that is keeping the print results on the display of the print server.

Turning on a lamp of the stacker.

The locked stacker is usually locked, and while a corresponding storage medium is in the print server, it is unlocked. A forcible unlocking mode may be provided for the following incidents:

The lock becomes unlocked due to system trouble.

A job was delivered into a dynamically allocated locked stacker, and the user who made the job did not take out the print results from the stacker for a long time. Accordingly, the stacker is unusable.

Once the stacker is unlocked, the user opens the door and picks out print result from the stacker. The user may try to remove the storage medium from the print server without picking out the print results from the stacker. This is detected by a sheet sensor (FIG. 27 to be explained later) in the stacker. The print server has modes mentioned below to deal with such incident. One of these modes may be set in the system, or may be selected by a user when the user inserts a security job.

The storage medium becomes unremovable until the stacker is emptied.

The display of the print server displays a warning message with or without alarming sound.

Data in the storage medium and spool data in the printer related to a security job that has been completely printed are deleted. The deletion is made according to one of the modes mentioned below. One of the modes may be set in the system, or a user may select one when inserting the security job.

The deletion is started after the job is delivered. The spool data are deleted after the job is delivered into the stacker. The data in the storage medium are provided with a processed mark while the medium is in the network printer. When the storage medium is reinstalled in the client drive, the data are actually deleted.

If the print results in the stacker are spoiled, the user must request the network printer to again print the print job. For this purpose, the network printer keeps the spool data, and if the user takes necessary steps before removing the storage medium, the same print job is printed and delivered to the ordinary stacker. After the storage medium is removed from the network printer, the spool data are deleted, and the data related to the job in the storage medium are provided with the processed mark while the storage medium is in the network printer. When the storage medium is installed in the client drive, the data are actually deleted.

The processed mark is attached to the storage medium after the print results are taken out of the stacker. This prevents the storage medium from being removed without removing the print results from the stacker, thereby checking an unlocked stacker.

When the stacker of the print server is emptied, the sheet sensor in the stacker detects this. The print server again locks the stacker and registers it as empty and available for another print job.

The storage medium drive D-P1 of FIG. 22 of the network printer is a 3.5-inch floppy disk drive or an IC card drive. The storage medium drives D-C1 and D-C2 of FIG. 22 of the clients are also 3.5-inch floppy disk drives or IC card drives. In FIG. 22, the print server and clients are connected to one another through a LAN. The client asks the network printer whether or not the stacker is available and then specifies an output method.

Figure 23:
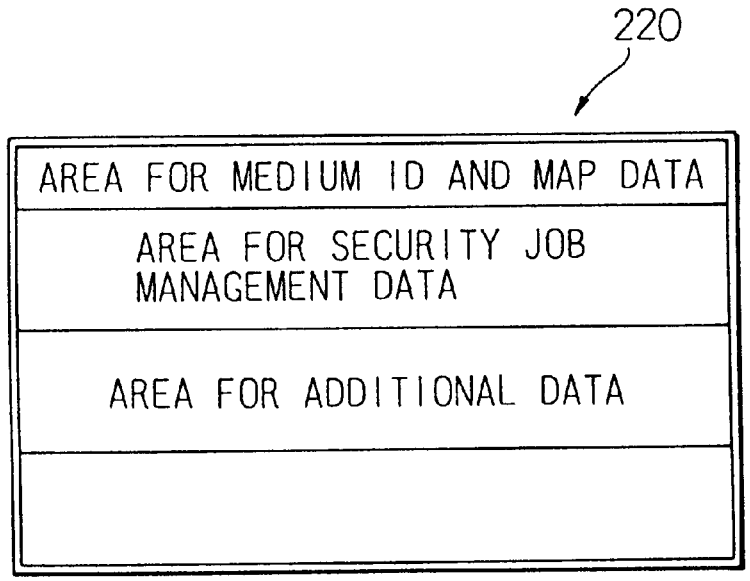
FIG. 23 shows a format of an external medium according to the second embodiment of the present invention.

FIG. 23 schematically shows a format of an external medium according to the second embodiment of FIG. 22.

In FIG. 23, a track 0 has an area for medium identification data and map data. A track 1 has an area for security job management data. An optional track (xx) has an area for additional data.

The data in the format 220 of the external medium will be explained.

Medium identification data

The data indicate that this medium can be processed and are made of a string of characters. The data are a kind of a volume header.

Map data

The data are used by the client and print server to control spaces in the medium block by block.

Security job management data

The data are used to recognize whether or not a security job sent by the client is correctly received by the print server.

FIGS. 24 and 25(a) through 25(c) show the details of a data structure in the external medium according to the second embodiment of the present invention. In particular, the figures show the details of security job management data stored in the external medium and acceptable by the print server.

In this case, it should be noted that there is a region in which some additional region is added to the spool region mentioned in FIG. 10(a).

Figure 25A:
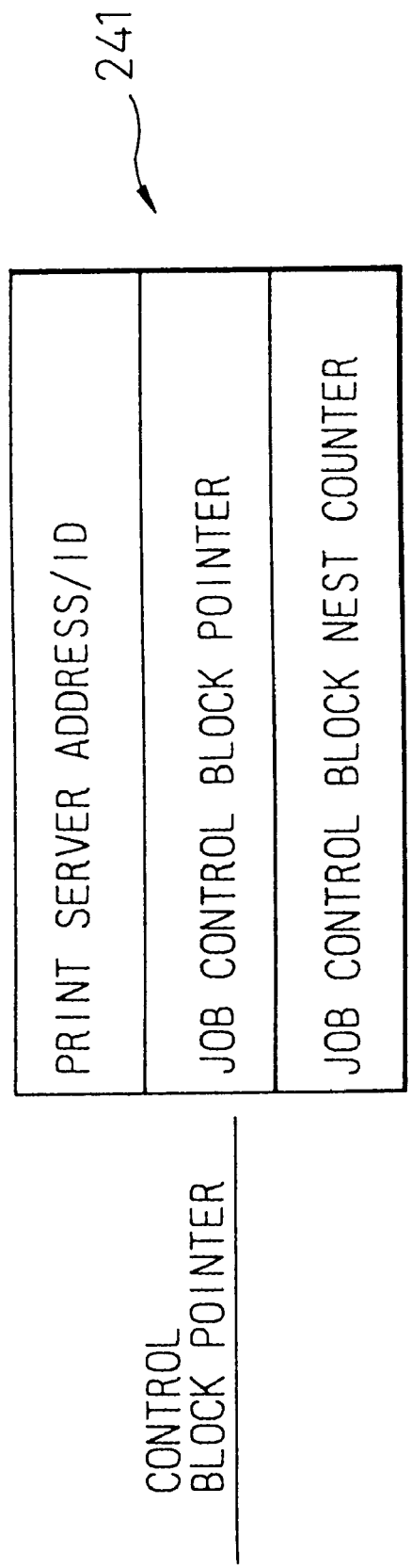
FIGS. 25(*a*) through 25(*c*) show other part of the data structure in the external medium according to the second embodiment of the present invention.
Figure 25B:
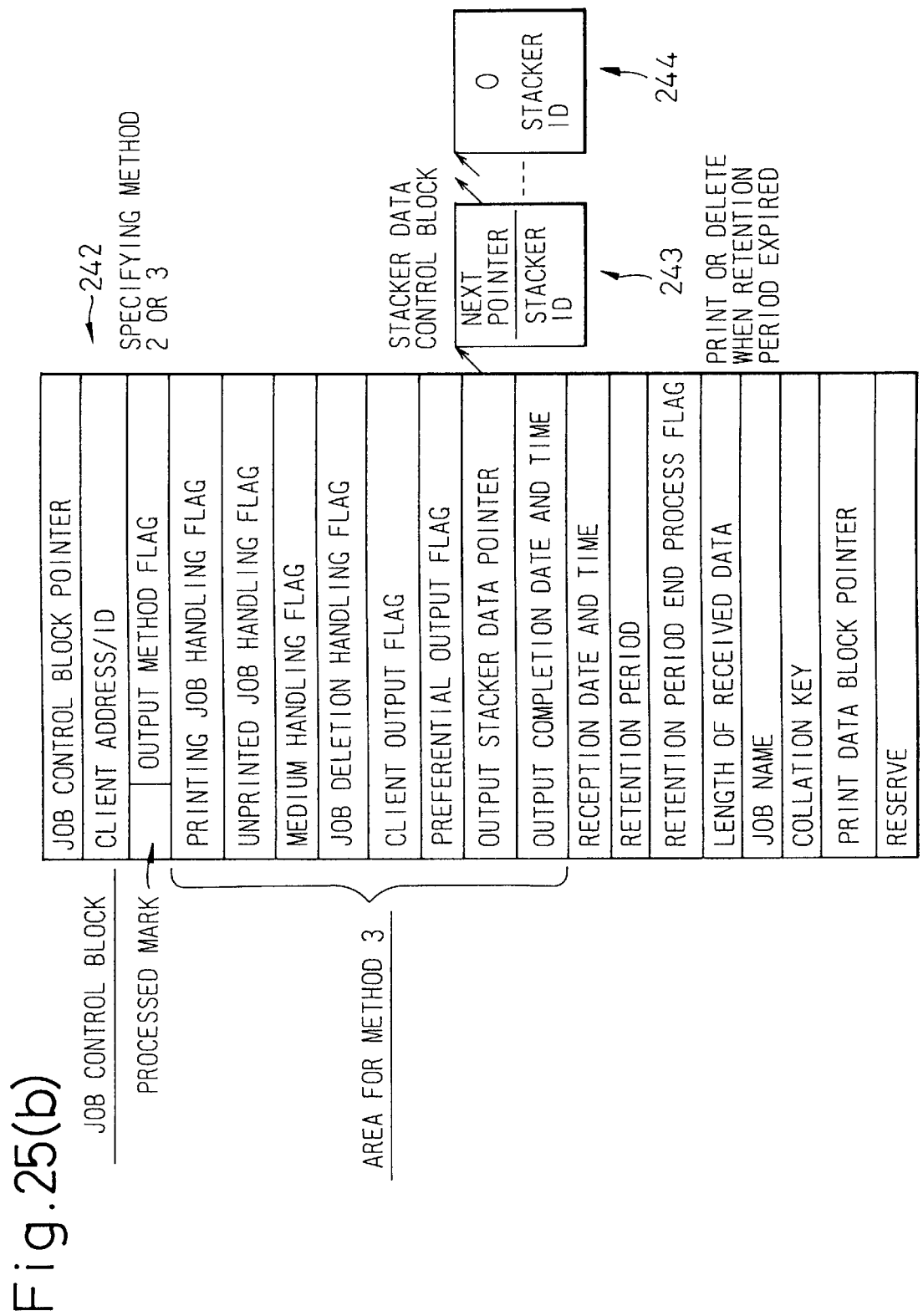
Figure 25C:
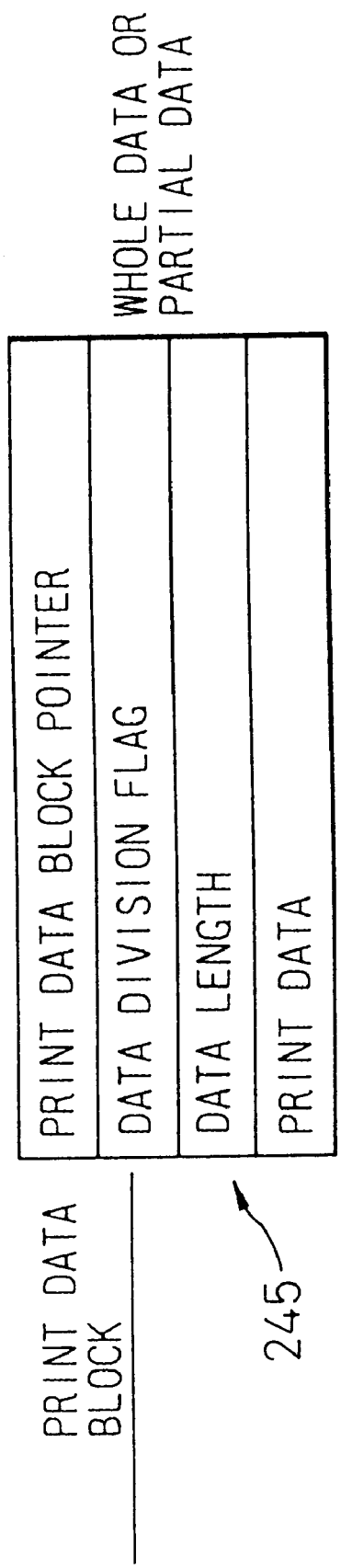

However, especially in FIGS. 25(a) through 25(c), an illustration of the former region will be omitted in order to simplify the description of FIGS. 25(a) through 25(c).

(1) The format of the external storage medium is common to the print server and clients. It is possible to employ a widely used MS-DOS or UNIX format. To improve the safety of operation, however, the second embodiment employs the special format. The medium is initialized in the client with dedicated utility software. A non-initialized medium may be initialized when the client sends a security job to and receives management data from the network printer. When the client requests the network printer to release a security job from a queue (holding state) or print the security job, the external storage medium must have the following data (FIGS. 23 to 25(c)):

<1> Identification data to indicate that the medium can be processed

<2> Output method specifying data

Data to specify method 2 or 3 (The following items are applicable only to the method 3.)

Data to specify how to treat the security job if the job is under printing when the medium is installed in the print server Wait until the last page of the job is delivered into the stacker.

Wait until the present page is delivered into the stacker, unlock the stacker, and let the printer print the remaining pages into the ordinary stacker.

Cancel the remaining pages of the job.

Data to specify how to treat the security job if the job is unprinted when the medium is installed in the print server Wait until the locked stacker becomes available.

Print the job into the ordinary stacker.

Cancel the job.

Data to specify a way of removing the storage medium

Disable the removing of the storage medium until the stacker is emptied.

Display a warning message on the display of the print server with or without alarming sound.

Data to specify a way of deleting data related to the security job

Start a deletion process once the job is completely printed.

Hold the data until the medium is removed from the print server so that a reprint request is acceptable.

Data to indicate whether or not the user is allowed to use the same locked stacker Data to indicate whether or not the security job is printed prior to a usual job.

Print the job prior to the usual job.

Print the job after the usual job.

<3> Management data provided by the network printer

Data common to the methods 2 and 3

Address or ID of the network printer that is holding the security job

Address or ID of the client that has sent the security job

Date and time of reception and retention period

Quantity of data received

A unique name, for example, a random number of 16 digits given by the print server to the security job Others Additional data for the method 3

Output stacker data pointer (initially 0)

This pointer relates to stacker IDs each being not 0. If the security job has been printed into the locked stacker and it there is an inquiry from the client to the print server, the print server informs the client of the matter and stacker data control blocks 243, 244, and so on that contain the stacker IDs.

Output completion date and time (initially 0)

These data are set according to information provided by the print server after the completion of the printing of the security job. If the job is under printing, or if the job has been partly printed and is waiting for the locked stacker to be available, a specific flag such as a leading bit of ON is set.

<4> The client is allowed to include part (fixed bytes from the start) or the whole of print data of the security job in the additional data.

(2) The following protocols <1> to <6> are supported between the clients and the network printer.

<1> Before transmitting a security job, the client inquires the print server whether or not the transmission is acceptable and about data related to available stackers. The data related to available stackers include whether or not locked stackers are available, a list of ordinary and locked stackers allocated for the client and their numbers, and a list of stackers which can be dynamically allotted stackers and their numbers. When receiving a response to the inquiry, the client displays the contents of the response. If no response comes over a predetermined period, the client displays the matter.

<2> If the security job is transmissible the client selects the method 2 or 3 according to the data related to available stackers. If the print server has no locked stackers, only the method 2 can be selected. The client transmits the security job to the print server. At this time, the client informs the print server of a retention period for the job, i.e., a maximum period for waiting a locked stacker to be available in the case of the method 3, whether or not the job is deleted after the retention period, and whether or not the job is printable into an ordinary stacker after the retention period. Finally, the client sends a transmission completion notice to the print server, to complete the transmission.

<3> The print server (e.g., network printer) may instruct the client to suspend or terminate the transmission if a spool space becomes full during the reception of the security job from the client. If the client suspends the transmission accordingly, the network printer issues a resume instruction after the matter is solved. On receiving the suspend instruction, the client waits for the resume instruction, and upon receiving the same, restarts the transmission of the security job. If no response is received within a predetermined period, the client notifies the network printer of discarding the job. When receiving the termination instruction, the client terminates the transmission, displays the matter, and waits for an instruction from the user. If the job is terminated, the network printer abandons related data including received data.

<4> If the network printer receives no transmission end notice from the client within a predetermined period, the network printer determines that the client has terminated the transmission, abandons related data, and does not carry out the following processes. After completely receiving the security job, the network printer determines whether or not the job is a security job. If it is the security job, the network printer queues the job in an internal spool device of the printer, creates a unique job name and management data including the reception date and time, retention period, and length of the received data (job), and notifies the client of these pieces of data. If the retention period requested by the client is longer than the maximum retention period set in the system, the requested retention period will be shortened. If the job is not successfully received due to some reason, the network printer informs the client of the unsuccessful reception of the job and abandons related data including the received data.

<5> The client receives from the network printer the job name and management data, or the unsuccessful reception notice. If no reply is received within a predetermined period due to the suspension of the network printer or other reasons, the client determines that time is out.

<6> The client must notify the network printer within a predetermined period, which must be shorter than the retention period, that the management data have been received and correctly stored. If the network printer receives no such notification from the client within the period, or if the network printer receives a notification from the client that the client abandons the management data, the network printer deletes the queued security job and related data.

(3) The network printer always monitors the following items even during printing:

<1> Transmission of a security job from a client
<2> Installation of an external medium (item (5) that will be described below)
<3> Inquiry, etc., from a client (item (7) that will be described below)
<4> Remaining time of the retention period of a queued job
<5> States of the locked stackers
<6> Availability of the locked stackers for a job to be processed according to the method 3
   Processing state of a usual job if the usual job has priority
   Availability of the locked stackers
   Free space, i.e., empty space, in the stacker that is dedicated to the user After completely receiving the security job, the network printer queues the job in the internal spool device.

When the remaining time in the item <4> is 0, the network printer checks the flag indicating a process to be taken after the retention period. If the flag indicates to delete the job, the network printer deletes the job in the spool device. If the flag indicates to print the job, the network printer queues the job as a usual print job in the internal spool device. The data representing the queued, deleted, or printed state of the job and other data related to the job are kept in the printer until timing determined by the printer comes. Before such timing, these data are sent to the client in response to an inquiry of the client, as mentioned in an item (7) below, or they are displayed on the panel when the medium is installed in the network printer, as mentioned in an item (5) below.

If the locked stacker becomes available according to the monitoring mentioned in the item <6> above, the security job with the method 3 is picked out of the spool device and is printed into the locked stacker. At the same time, management data for the stacker are updated.

If the security job is output into the user's locked stacker, an empty space in the stacker is updated so that the empty space is used by the next job of the same user.

If the security job is output into the fixedly allocated stacker, the stacker cannot be utilized for other jobs until the print results are picked out to empty the stacker.

The printing is carried out after estimating a space in the stacker according to the number of print pages if the number is known, and if not, the quantity or length of print data. If the stacker full sensor detects during printing that the remaining space of the stacker is insufficient, another locked stacker is secured, and the remaining pages are delivered into this stacker. If no other locked stacker is available, a processed position of the job is marked, and the job is suspended. Thereafter, a normal job is printed with respect to the ordinary stacker. Whenever the locked stacker becomes available, the suspended job is resumed.

(4) After the security job is correctly accepted by the network printer, the network printer sends the management data to the client. The client stores the management data and other data in the external medium.

<1> If no medium is installed in the medium drive, or if an installed medium is write-protected, the client displays a message to prompt the user to install a correct medium and waits for the action. If the situation is not corrected within a predetermined period, the client notifies the network printer to discard the job.

<2> If the installed medium is not initialized in the format, the client displays a message asking the user to install a correct medium or let the client initialize the medium. In the latter case, the client initializes the medium in the format.

<3> If a correct medium is installed, the client secures a control block for the job and writes the data in the control block. The client checks the control block pointer list 232 shown in FIG. 24 to find print server entries, e.g., network printer entries 241 and 242 (FIGS. 25(*a*) and 25(*b*)). If there are no network printer entries, a new entry is formed, and specified job control blocks 234 (FIG. 24) are chained. Each specified job control block contains the next pointer, management data for a corresponding job, and an additional data pointer. If there are the entries, the print data control block (or print data block) of the job in question is inserted at the end of the chain, and the chain is updated. In this way, the control block is secured. If the client receives a reception impossible notice or if a time-out occurs, the client notifies the user of the matter.

(5) The user who prepared the security job brings the external medium to the network printer to obtain print results of the job. The user installs the external medium in the medium drive of the network printer. After detecting that the medium has been set, the network printer checks the following:

<1> Medium identification data
<2> The control block pointer list 232 to see whether or not there is a security job control block for the printer
<3> Whether or not data in the control block agree with the queued job in the spool device If the medium is invalid according to the item <1>, or if there is no job according to the item <2>, the matter is displayed on the panel to let the user know the matter.

If a job agreed by both the medium and print server is found according to the item <3>, the following processes are carried out according to the specified output method.

Figure 24:
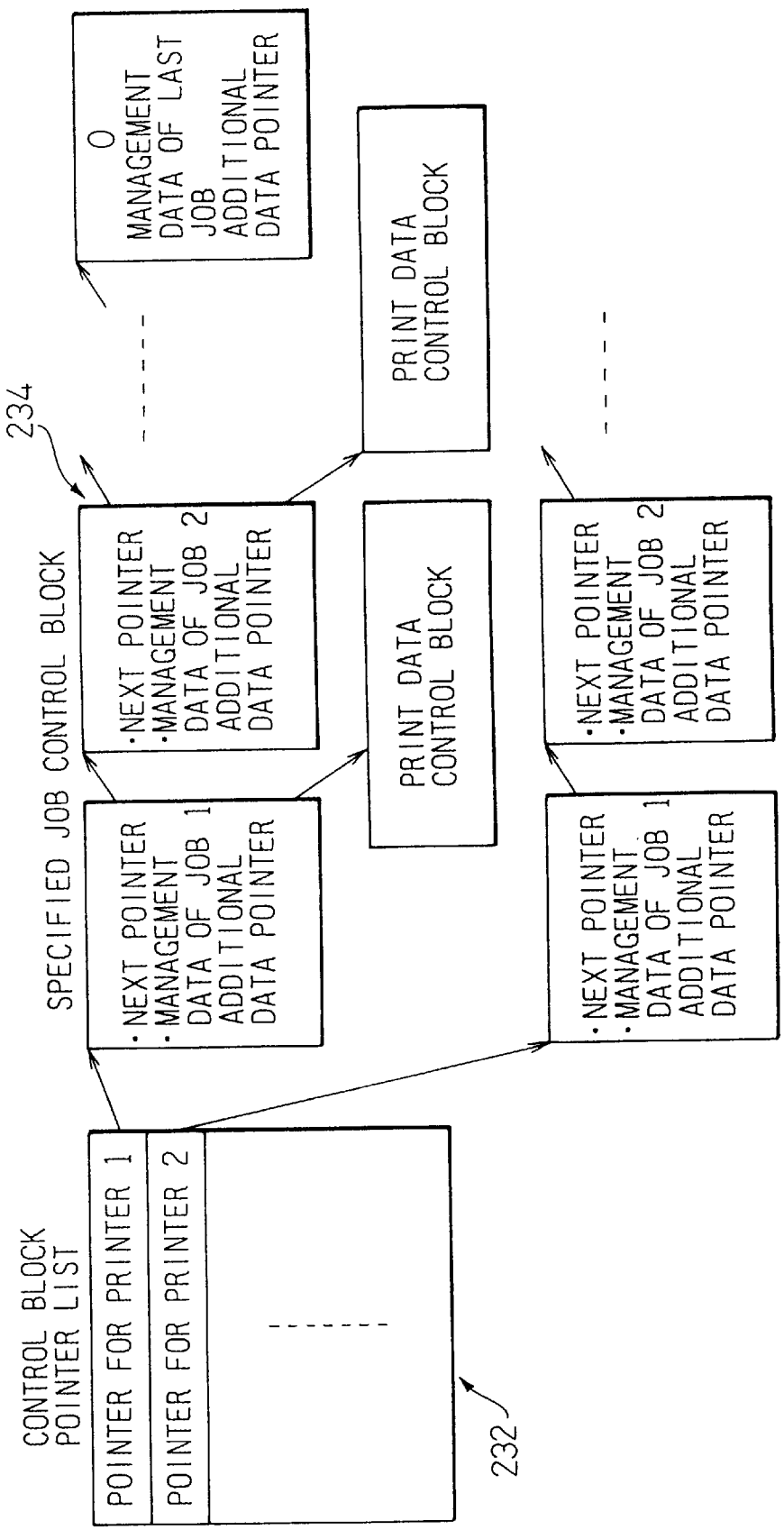
FIG. 24 shows part of a data structure in the external medium according to the second embodiment of the present invention.

If the job employs the method 2 and if the job has been deleted or printed due to an expiration of the retention period according to the check item <3>, the matter is displayed on the panel. If necessary, related management data are printed at the timing mentioned in an item (6) below. At the same time, the related control block and print data block 245 are removed from the control block chain (FIG. 24). If there is a queued job corresponding to the control block data, the item (6) is carried out.

If the job employs the method 3, the check item <3> determines whether or not the job has been completely printed, is under printing, or is unprinted. A process to be carried out after releasing the locked stacker will be explained in an item (8).

If the job has already been output, the stacker that is holding print results is found, and the stacker is unlocked.

If the job is under printing with respect to a stacker, the panel of the print server displays a present mode a) or b) mentioned below in the control block. The user may manipulate the panel to change settings in the control block and the control data of the spool device. Namely, the user selects one of the following modes a) to c):

a) Unlock the stacker after the last page is delivered.
b) Unlock the stacker after the present page is delivered into the stacker and print the remaining pages with respect to the ordinary stacker.
c) Cancel the print job.

If the job is not yet printed, the print server displays the matter as well as one of the modes a) and b) mentioned below in the control block related to a process carried out later. The user may manipulate the panel to change the settings of the control block and the control data of the spool device. Namely, the user selects one of the modes a) to d):

a) Wait until the locked stacker becomes available.
b) Preferentially output the job into the ordinary stacker (method 2).
c) Switch to the ordinary stacker.
d) Cancel the job.

The client may send a plurality of security jobs and store various pieces of management data in the same external storage medium. In this case, the jobs stored in the medium may employ the methods 2 and 3 for the entries 242 of the specified job control blocks of FIG. 24. It is checked whether or not all jobs have been completely printed and delivered. For the jobs employing the method 3, the locked stackers are collectively unlocked. For the jobs employing the method 2, job conditions are successively displayed according to operations on the print server panel. A list of management data of the jobs may be collectively printed into the ordinary stacker after the completion of the presently processed job. For the jobs employing the method 3 that are presently processed or not yet processed, the conditions of them are successively displayed according to operations on the print server panel. It is possible to change these jobs. The priority of the jobs employing the method 2 that are not yet processed may be higher than the jobs employing the method 3 and having higher priority than usual jobs.

(6) The network printer checks the external medium and spool device. If there is at least one job employing the method 2, it is processed prior to the other jobs in the spool device. If there is a job under printing, one of the following modes is selected and fulfilled:

<1> Print the present page, temporarily queue the remaining pages, and print the remaining pages after the preferential job.
<2> Print the present job up to the last page thereof.

One of these modes may be set in the print server. Once priority is given to the user, the network printer picks out the control blocks in the medium one by one in order of the chain and processes a corresponding job in the spool device. After the completion of the job, the job is deleted from the spool device. At the same time, the control block and related print data block are deleted from the medium, and the chain is updated. This process is carried out until the medium has nothing to output. After the completion of all jobs, the job that was being processed before this priority process is resumed. The medium is removed from the drive, and the state monitoring item (3) is continued.

If the medium is removed during the processes (5) and (6) or if the medium is write protected, the network printer displays a warning message to continue the process. If it is impossible to continue the process, the network printer terminates the process and carries out a necessary postprocess.

FIG. 26 shows a control block in the lockable stacker according to the present invention, to clarify the managing conditions of the locked stacker. The lockable stacker involves control blocks 252, 253, 254, and 255 for controlling stacker sections in the lockable stacker. The locked stacker typically has about 10 stacker sections. These stacker sections will simply be called the stackers for the sake of simplicity of explanation.

A job to be processed according to the method 3 employs the control block pointers 251 in the locked stacker, to retrieve busy and empty stackers in the locked stacker. Each control block of the locked stacker contains a stacker ID for specifying the stacker, the storable number of printed sheets, the number of printed sheets stored, and a job ID that is using the stacker.

If an available stacker is found after searching the control block pointers 251 in the locked stacker, a queued job suitable for the data stored in the control block of the available stacker is printed into the stacker. Thereafter, the management data of the stacker are updated.

(7) The protocol of the item (2) supports not only the subitems <1> to <6> of the item (2) but also the following service functions. The client receives management data from the network printer and stores them in an external medium, as mentioned in the item (4). After the reception of the management data, the external medium is installed in the drive, to carry out the following functions with respect to the network printer in connection with the queued Job:

<1> Inquire a situation.
<2> Change a retention period.
<3> Delete the job from the spool device.
<4> Cancel the security specification and print the job as a usual job.
<5> Change the security specification of the job from the method 3 to 2, or from the method 2 to 3, or the settings of the method 3.

The network printer sends responses to the client with respect to these items, and the client changes the contents of the medium according to the responses.

(8) The external storage medium storing the management data for the security job is installed in the printer, and the printer prints the job corresponding to a control block in the storage medium. The printer delivers print results into one of the stackers and unlocks the stacker. At this time, the location of the stacker is displayed in one or both of the following ways. If the print results are stored in a plurality of the stackers, all the stackers are unlocked and their locations are displayed.

The locations of the stackers that hold the print results are displayed on the display of the printer.

Lamps of the corresponding stackers are turned on.

Figure 27:
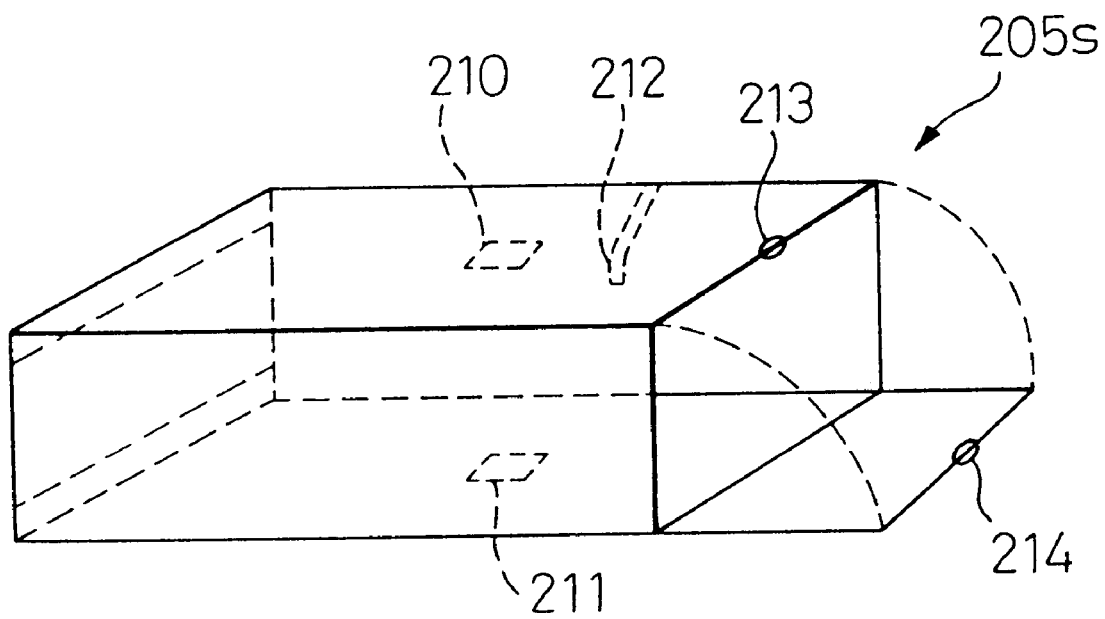
FIG. 27 is a perspective view showing sensors in the locked stacker according to the second embodiment of the present invention.

FIG. 27 shows elements such as sensors disposed in the locked stacker 205s of the network printer.

Lock elements 213 and 214 of the stacker are usually closed. While a corresponding storage medium is in the printer, they are opened. There is a mode to allow a manager of the printer to forcibly open all locks or the lock of a stacker that is closed over a predetermined period. When the manager enters a password into the control panel of the printer, or when the manager installs a master storage medium in the medium drive, a maintenance mode is activated to open all locks or the lock of the stacker that has been closed over the predetermined period. Instead of the electronic locks, it is possible to employ mechanical locks that can be opened with a key kept by the manager or a maintenance personnel.

The locked stacker will be forcibly opened in the following occasions:

The stacker is unlocked due to system trouble.

The dynamically allotted locked stacker is continuously in use for a long time.

The stacker is unlocked, and the user opens the door thereof and picks out print results out of the stacker. The user may try to remove the storage medium without picking out the print results out of the stacker. To prevent this, the print server has modes mentioned below. The modes may be set and reset by the user when the user inserts a security job or when the user changes the specification of the job. A light emitting element (LED) 211 emits a light beam, which is detected by a sheet sensor 210 to determine whether or not the stacker has print results.

Disable the removal of the storage medium until the stacker is emptied.

Display a warning message on the display of the printer with or without alarming sound.

After a security job is completely printed, related data in the storage medium and related spool data in the network printer are deleted. Deletion modes may be set and reset by the user when inserting the security job and when changing the specification of the job.

The deletion modes are as follows:

Start a deletion process just after the completion of printing of the job, delete the spool data after print results are delivered into the stacker, provide the related data in the storage medium with a processed mark while the medium is in the network printer, and actually delete the data having the processed mark when the storage medium is installed in the client or printer.

Keep the data for the user may try to reprint the job if the print results in the stacker are spoiled. Before removing the storage medium, the user requests reprinting according to guidance displayed on the control panel. The print server reprints the job held in the spool device and delivers print results into the ordinary stacker. If the storage medium is removed, the related spool data are deleted, and the related data in the storage medium are provided with a processed mark while the storage medium is in the printer. When the storage medium is installed in the client or printer, the control block provided with the processed mark is actually deleted during an initial process.

The processed mark is applied to the storage medium when the print results are removed from the stacker, i.e., when the sheet sensor 210 detects that the stacker becomes empty. This prevents the storage medium from being removed before the print results are removed from the stacker, thereby preventing the stacker from being unlocked thereafter.

When the sheet sensor 210 confirms that the stacker is empty, the print server again locks the stacker, which is registered as an available empty stacker for the next print job.

The locked stacker 205s in the network printer has not only the sheet sensor 210 but also a stacker full sensor 212. The sensor 212 detects whether or not there is any free space in the stacker during printing. If the sensor 212 detects that there is no free space in the stacker, delivering print results into the stacker is stopped, and the remaining pages are delivered into another locked stacker.

(9) The client employs utility software to check specified job control blocks in the storage medium and sorts and arranges them to change priority of a plurality of jobs. Any job attached to a print data control block may be viewed. These processes may be carried out on a client that is different from the client that has inserted the job.

To clarify a difference between the first and second embodiments of the present invention, client-server inclusive steps will be explained.

Figure 28:
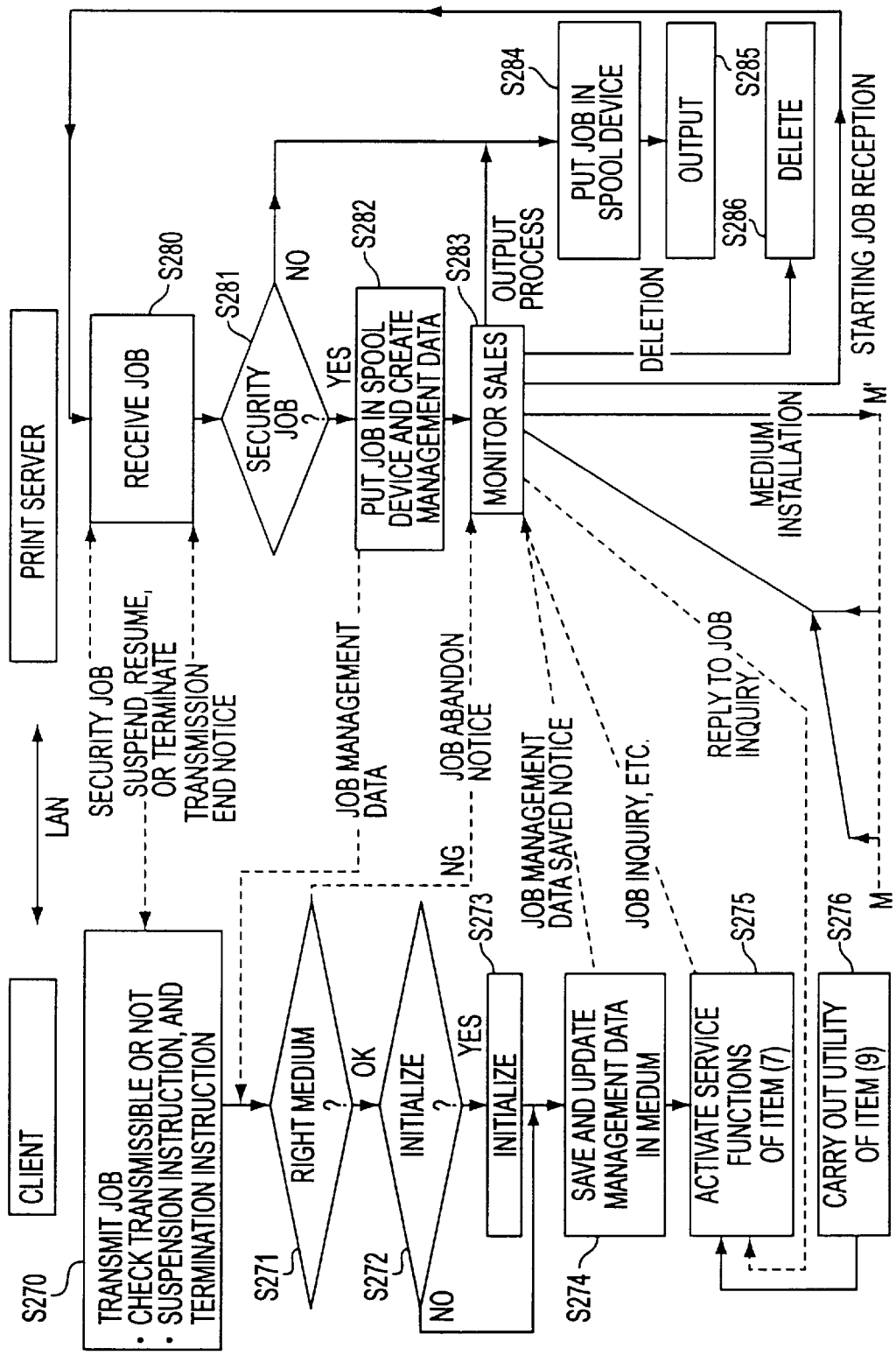
FIG. 28 is a flowchart 1 explaining all-inclusive processing steps according to the first embodiment of the present invention.
Figure 29:
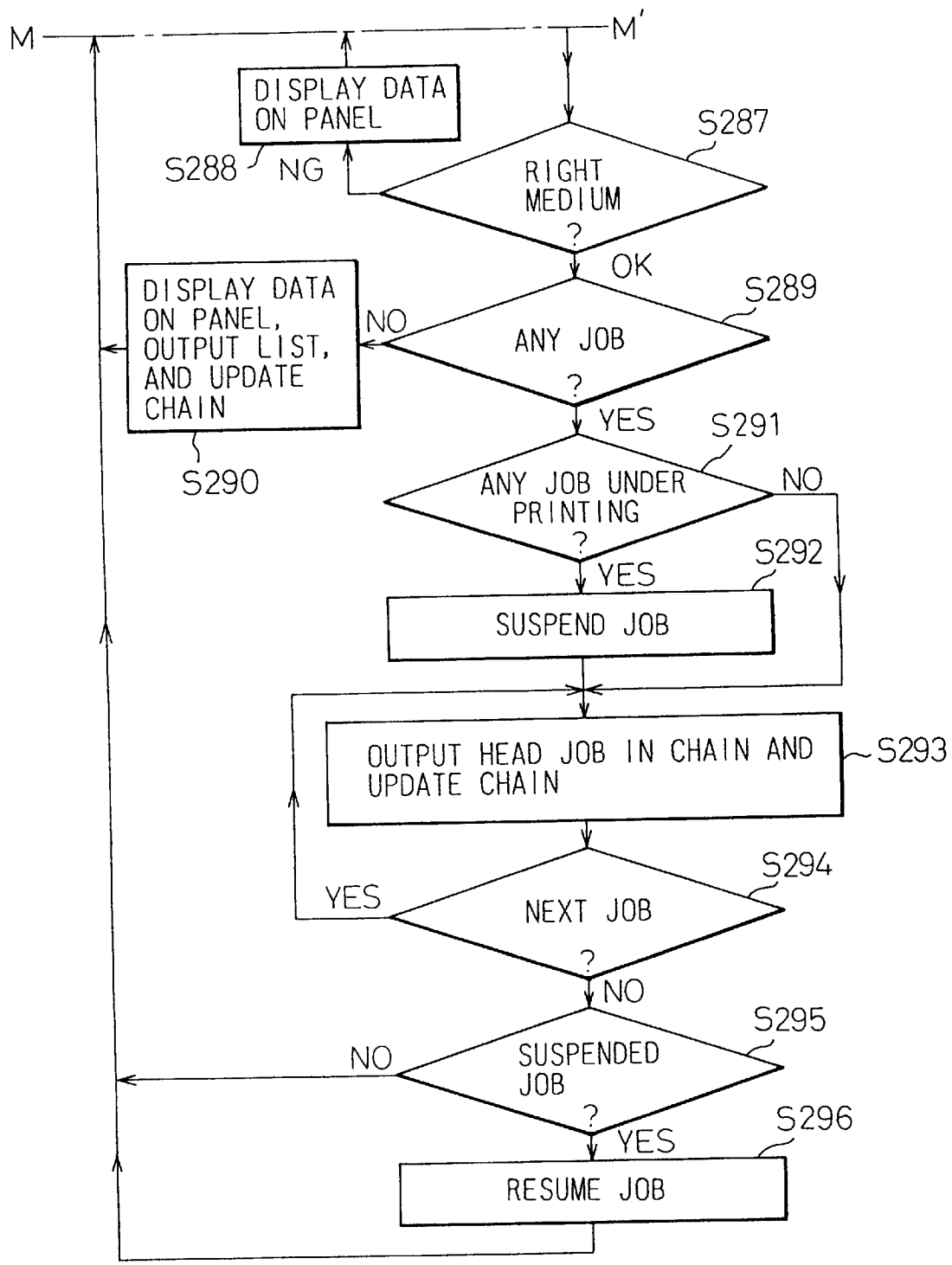
FIG. 29 is a flowchart 2 explaining the all-inclusive processing steps according to the first embodiment of the present invention.

FIGS. 28 and 29 are flowcharts showing all-inclusive steps according to the first embodiment of the present invention.

In step S270 of FIG. 28, a client sends a print job request to a print server, e.g., a network printer 203. When the client needs security printing, the client sends a security print job request to the network printer 203 in the step S270. The security job transmission process includes checking whether or not the transmission is enabled, whether or not there is a suspension instruction, and whether or not there is a termination instruction.

In step S280, the print server (network printer) receives the print job request, sends data related to the availability of a stacker to the client, and waits for a reply from the client.

In step S281, the print server determines whether or not the print job requires security printing. If YES, the print server queues the job the internal spool device and creates management data in step S282. The print server sends the management data to the client. If there is no security request in the step S281, the print server queues the job in the internal spool device in step S284 and prints the job into the ordinary stacker in step S285.

In step S271, the client checks an external storage medium whether or not it is normal. If the storage medium has an abnormality, the client sends a job abandon notice to the print server, and the storage medium must be replaced with another. If the storage medium is normal, step S272 determines whether or not the storage medium must be initialized. If it must be initialized, step S273 initializes the storage medium.

In step S274, the client stores the job management data from the print server in the storage medium, updates the contents of the storage medium, and notifies the print server that the job management data have been stored.

In step S275, the client activates the service functions such as inquiring the queued job as mentioned in the item (7). The client asks the print server for these service functions.

In step S276, the client employs the utility software to check specified job control blocks in the storage medium as mentioned in the item (9) to sort and arrange the blocks. If there is a job having a print data control block, the print data of the job are visible.

In step S283, the network printer always monitors, even during printing, operation states such as the transmission of a security job from the client, the installation of a storage medium, an inquiry from the client, and the management of remaining time of the retention period of the queued job (i.e., the held job), After completely receiving the security job, the network printer puts the job in a queue in the internal spool device in the step S284.

If the remaining time of the retention period of the queued job is 0, the network printer checks a flag indicating a client-specified process to be carried out after the retention period. If it is specified to delete the job, the network printer deletes the job from the spool device in step S286. If it is specified to output the job, the queued Job is again queued in the internal spool device as a normal print job. Data indicating the queued, deleted, or printed state of the job are kept in the network printer until an occasion, for example, elapse of a predetermined period determined in the network printer occurs. These data are sent to the client in response to an inquiry or are displayed on the panel in step S288 of FIG. 29 when the storage medium is installed in the network printer in step S287 of FIG. 29.

To obtain print results, a user who prepared the security job brings the storage medium to the network printer and installs the same in the storage medium drive of the network printer. In step S289, the network printer detects that the storage medium has been installed. If it is confirmed that the installed storage medium is a right one, the network printer secures a control block and write the above data in the block in step S291. If the storage medium is defective and it is impossible to write the data in the medium, the network printer displays or prints the matter, to let the user know the matter in step S290. At the same time, the network printer updates a chain of control blocks.

The network printer checks the storage medium and internal spool device in step S290, and if there is at least one job to be output, processes the job prior to the other jobs. In this case, the other jobs are queued in step S292, and after the preferential job is completely printed, they are resumed in order of the chain of control blocks in steps S293 and S294.

If there is a job under printing in step S295, the network printer waits until the present page is complete, or until the last page of the job is complete. When preferential printing is enabled, the network printer picks out the control blocks in the storage medium one by one in order of the chain and processes a corresponding job in the spool device. After a job is completely output, the job is deleted from the spool device. At the same time, the corresponding control block and related data control block are deleted from the storage medium, and the chain is updated. The preferential printing is carried out until all jobs in the storage medium are completely printed. After the completion, the job that was being processed before the preferential printing is resumed in step S296. The storage medium is removed from the drive, and the state monitoring step S283 of FIG. 28 is continued.

FIGS. 30, 31, 32, and 33 are partial flowcharts 1 to 4 showing all-inclusive steps according to the second embodiment of the present invention. Differences from the first embodiment will be mainly explained.

If the locked stacker is not specified, steps S300, S310, S311, and S322 correspond to the steps S270, S280, S281, and S282 of FIG. 28, respectively. Accordingly, these steps will not be explained.

Figure 30:
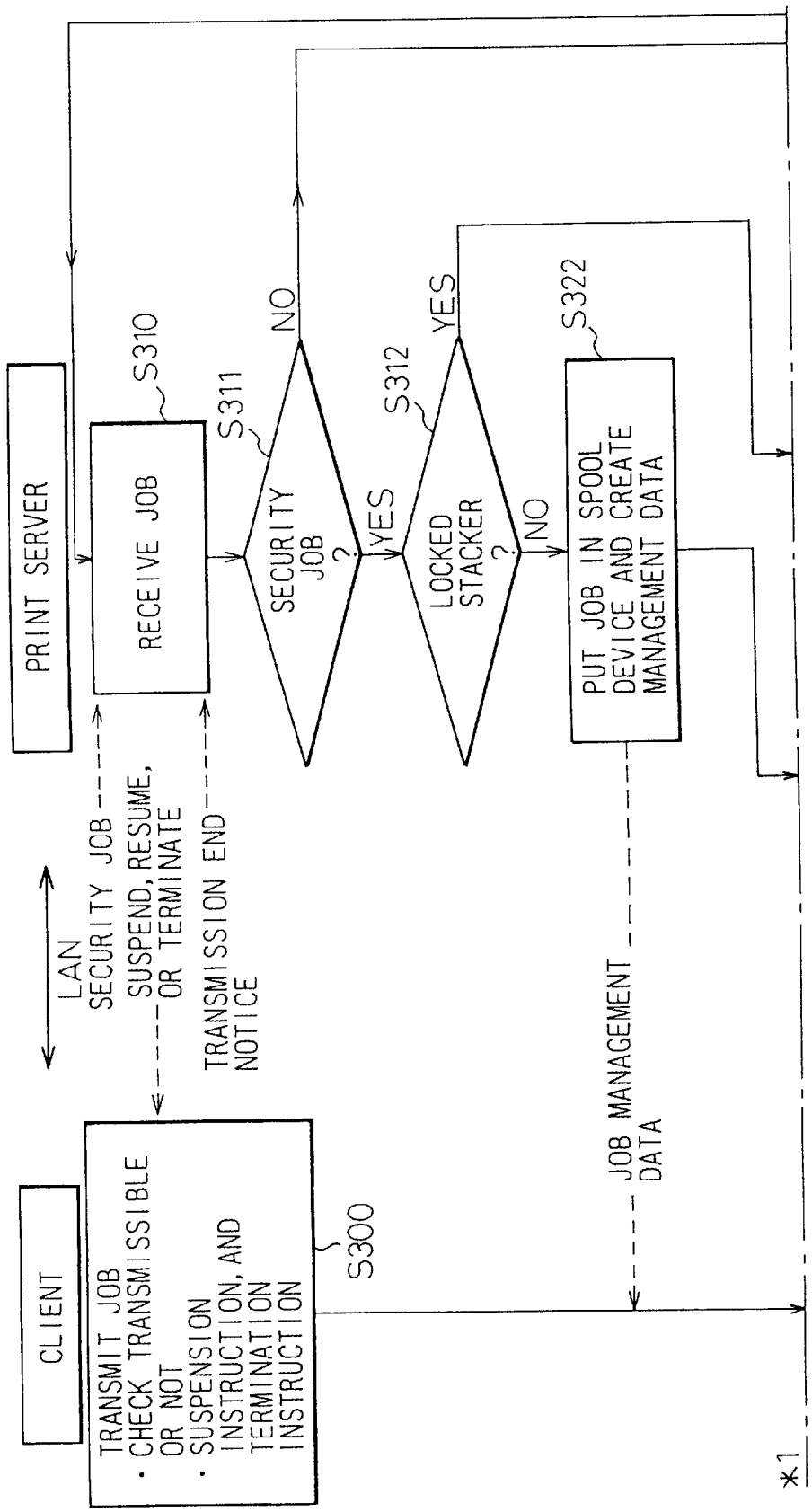
FIG. 30 is a flowchart 1 explaining all-inclusive processing steps according to the second embodiment of the present invention.
Figure 31:
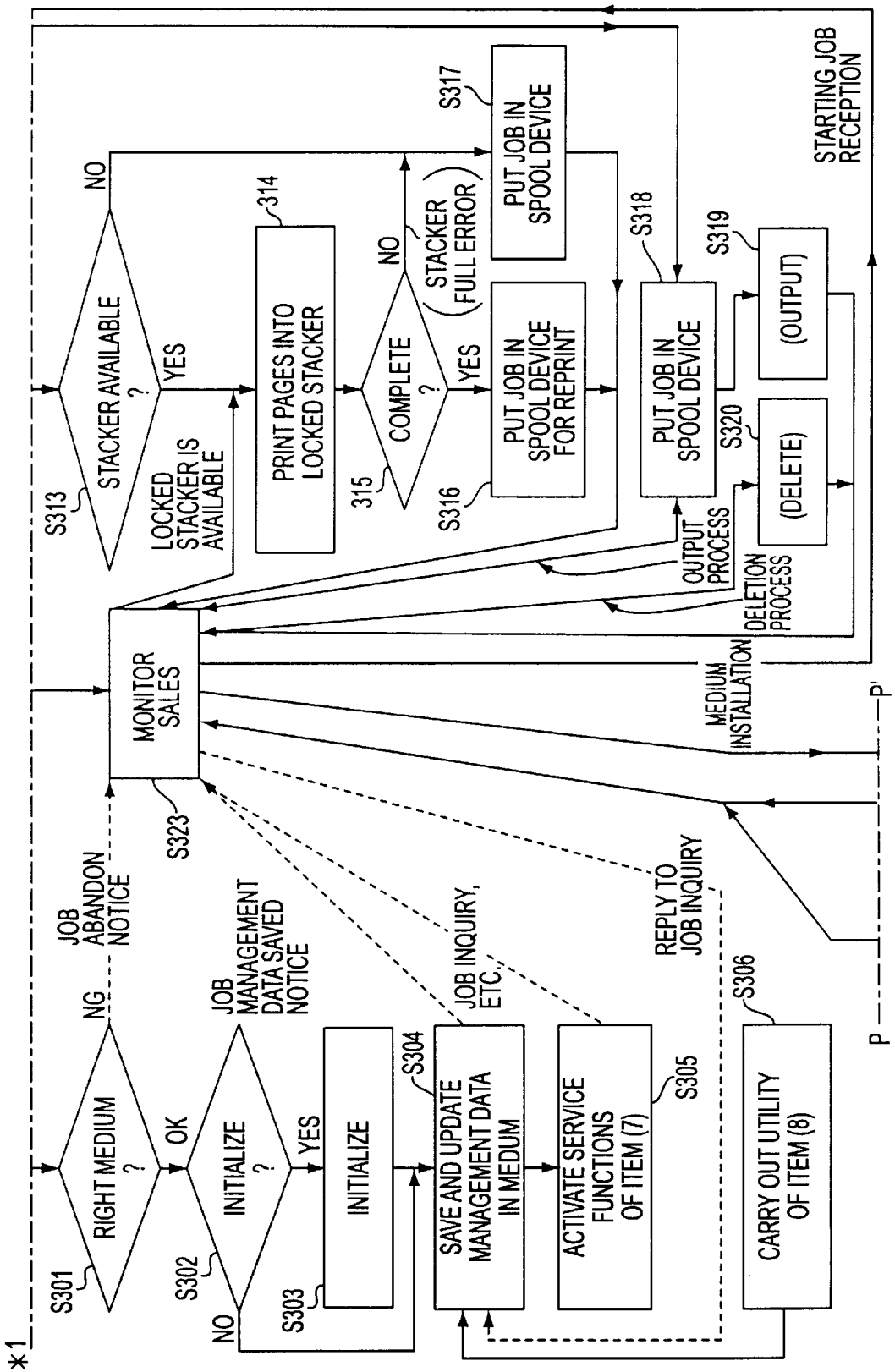
FIG. 31 is a flowchart 2 explaining the all-inclusive processing steps according to the second embodiment of the present invention.

If step S312 of FIG. 30 determines that the locked stacker is specified, the print server checks whether or not the locked stacker is available in step S313 of FIG. 31. If it is not available, the print server queues the print job in the internal spool device in step S317 of FIG. 31 and monitors situations in step S323 of FIG. 31 until the locked stacker becomes available.

If the locked stacker becomes available, the print server picks out the queued job out of the internal spool device, prints the job into the locked stacker, and updates the management data about the stacker in step S323.

If the locked stacker is dedicated to the user, the number of sheets the stacker still accepts is updated, and it not, the stacker is disabled for another job until the print results are removed from the stacker to empty the stacker.

Printing is carried out in step S314 after checking the number of pages to be printed if the number is known, and if the number is unknown, the quantity of print data. If the stacker full sensor detects that a space in the stacker is insufficient to receive the printing job in step S315, another locked stacker is secured and the remaining pages are printed into this stacker. If no other locked stacker is secured, a mark is applied to a processed position of the job, and the job is temporarily queued in the internal spool device in step S316.

Thereafter, a normal print job is processed with respect to an ordinary stacker. When the locked stacker becomes available, the suspended job is resumed.

Steps S318, S319, and S320 of FIG. 31 correspond to the steps S284, S285, and S286 of FIG. 28, respectively. Accordingly, these steps will not be explained again.

When the security job is correctly accepted by a print server, e.g., a network printer, the client receives management data from the network printer. The client stores the management data and other data in the storage medium. Steps S327, S328, S329, and S350 of FIG. 32 for checking the storage medium are the same as the steps S287, S288, S289, and S290 of FIG. 29, respectively. Accordingly, these steps will not be explained again.

Figure 33:
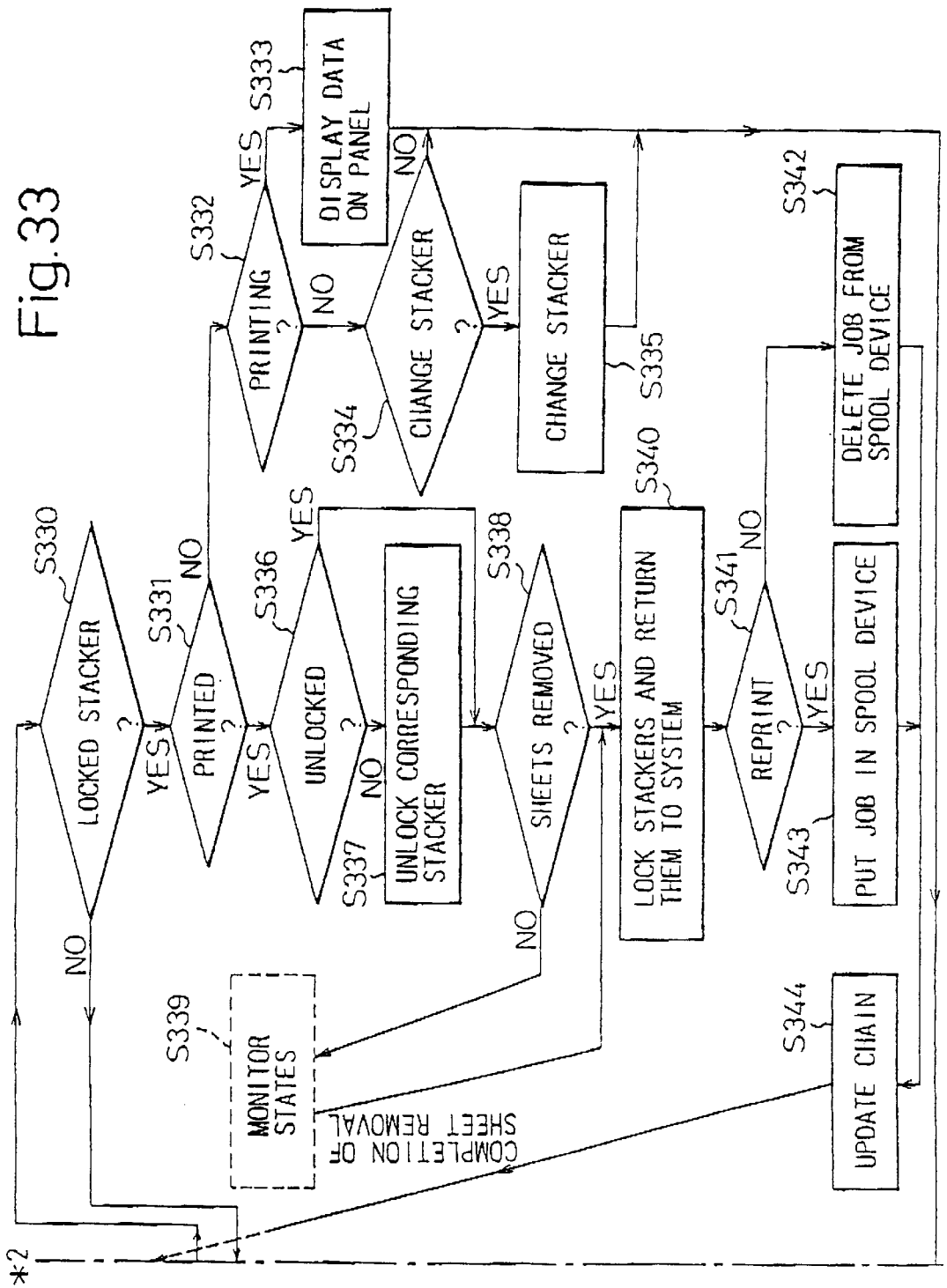
FIG. 33 is a flowchart 4 explaining the all-inclusive processing steps according to the second embodiment of the present invention.

If step S330 of FIG. 33 determines that the print job specifies the locked stacker, step S331 of FIG. 33 determines if the job has been printed, is under printing, or is not yet printed according to the checking of the step S323 of FIG. 31.

If the job is complete, the print server finds the position of the stacker that is holding print results of the job and unlocks the stacker in steps S336 and S337. If the is under printing with respect to the stacker in step S332, a present set mode in a corresponding control block is displayed on the panel of the print server in step S333.

If the job is not yet printed, the print server displays the situation as well as a present mode set by the user for the next process in the control block. If the mode is to switch to an ordinary stacker in step S334, the print job is switched to the ordinary stacker in step S335. If the mode indicates no change in the stacker, the job is suspended until the locked stacker becomes available.

In step S337, the print server unlocks the stacker while displaying the position of the stacker. If print results are stored in a plurality of stackers, all the stackers are unlocked and their positions are displayed.

Namely, the network printer displays the positions of the stackers that contain the print results of the job, and lamps of the stackers are turned on.

The locks of the stackers are usually closed, and while the storage medium is in the network printer, the corresponding stacker is unlocked. There is a mode that allows a manager of the printer to forcibly unlock all stackers or a stacker that is locked over a predetermined period.

After the stacker is unlocked, the user opens the door thereof and picks out the print results from the stacker. The user may try to remove the storage medium without picking out the print results out of the stacker. To prevent this, the print server has a mode to disable the removing of the storage medium until the stacker is emptied, or a node to display a warning message on the display of the printer.

The data in the storage medium related to the printed security job and the spool data in the network printer are deleted. Deletion conditions are set and reset when or after the security job is inserted by the is user.

Step S338 determined whether or not the user has completely taken out the print results. This determination is finished in step S339 by monitoring the inside of the stacker with use of the sheet sensor in the corresponding stacker. Here, it should be noted that this step S239, is equivalent to the step S323 described before.

When the sheet sensor confirms that the stacker has been emptied, the print server again locks the stacker and records the stacker as an empty stacker that is available for the next job in step S340.

If step S341 determines that there is a reprint request, the job is queued in the internal spool device, and the chain of control blocks is updated in steps S343 and S344. If there is no reprint request, the print job in question is deleted from the internal spool device.

Figure 32:
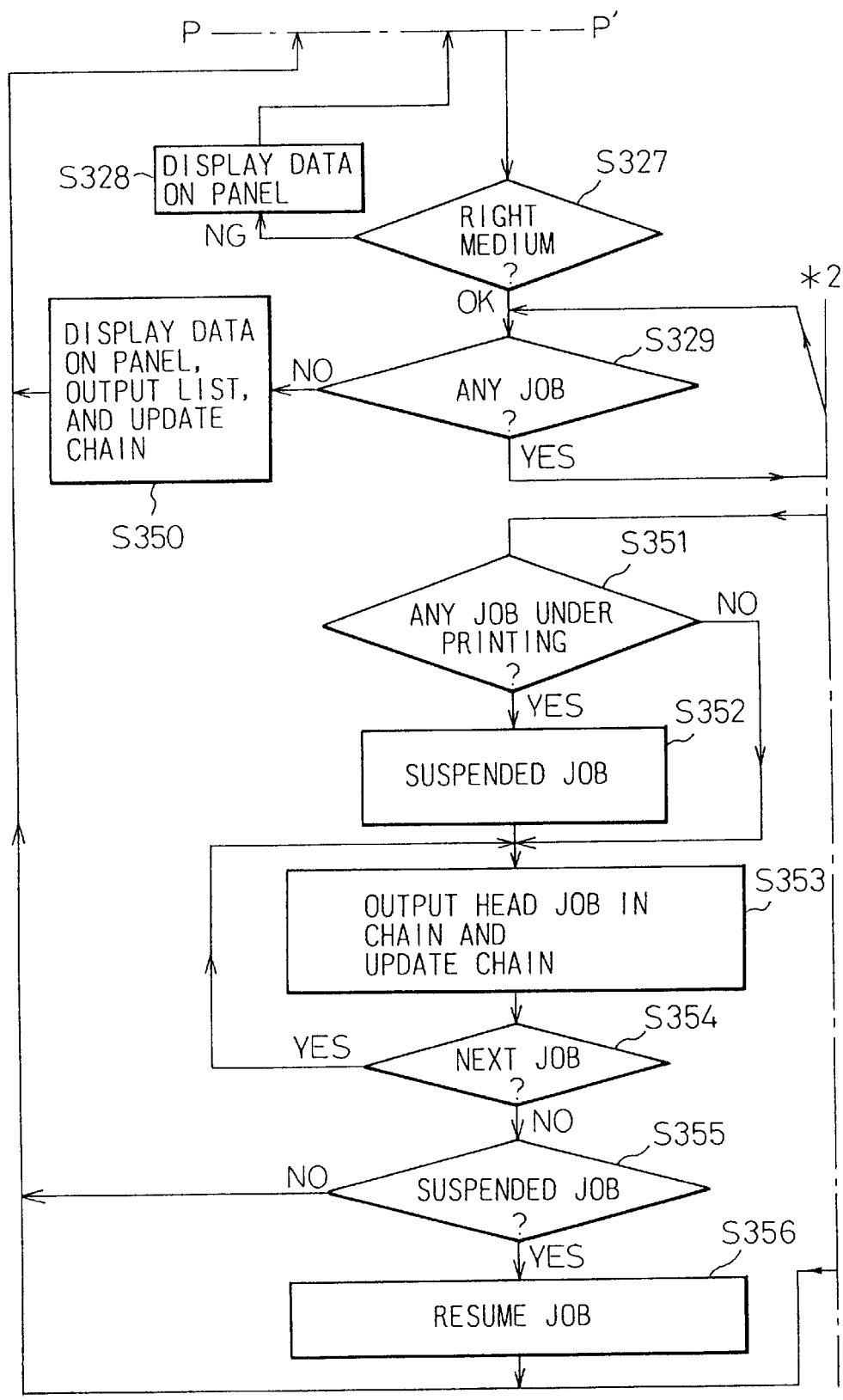
FIG. 32 is a flowchart 3 explaining the all-inclusive processing steps according to the second embodiment of the present invention.

Steps S351, S352, S353, S354, S355, and S356 of FIG. 32 for handling a plurality of jobs in the print server correspond to the steps S291, S292, S293, S294, S295, and S296, respectively. Accordingly, these steps of FIG. 32 will not be explained.

As explained above, the second embodiment ensures security of a print job even if a client has no locally connected printer and there is only a network printer. Even if the client is distanced from the printer, the second embodiment ensures the security as if the client is coupled with a locally connected printer. The second embodiment preferentially outputs a security job to a locked stacker, to ensure the security of the job, improve easiness in using the network printer, minimize the number of locally connected printers, and save an office space.

Compared with the first embodiment, the second embodiment additionally has the locked stacker function to minimize an output waiting time. This greatly improves the convenience of a print server such as a network printer.

The present invention has been exemplarily explained with reference to the specific embodiments. For those skilled in the art, it will be easy to make various modifications and changes over these embodiments. Accordingly, the present invention is not limited to these embodiments. The modifications and changes also fall within the scope of the present invention as long as they do not depart from the spirit of the present invention specified in attached claims.

As explained above, the present invention provides a method of ensuring the security of a shared unit that prints a print job in the presence of a user who has made the print job. Unlike the prior art, print results of a security print job will never be picked up by other users. In this way, the present invention ensures the security of a common output unit, i.e., a shared output unit.

According to the present invention, a given print job is printed prior to other jobs in the presence of a user who prepared the job. Accordingly, the user who goes to the printer to receive print results in a security condition will not wait for a long time.

The present invention processes a queued job shortly, so that queued jobs will never be queued full.

The present invention allows a user to set a retention period of a job. This improves convenience.

The present invention allows a user to specify a way of solving a queued job, to improve convenience.

The present invention allows a user to know the processing situation of a queued job, to improve convenience.

The present invention allows a user to reset processing conditions of a queued job, to improve convenience.

A print server of a security system according to the present invention carries out a security print job in the presence of a user that made the print job. Unlike the prior art, print results of the job will never be picked up by other users. Since the security job is printed prior to other jobs, the user will not wait for a long time in front of the print server.

The print server of the security system of the present invention directly connects a printer to a network. Unlike the prior art, the present invention requires no work-stations, to minimize the system, lower the cost, and reduce a facilities space.

According to the security system of the present invention, a client stores a notified collation key in an external storage medium. A combination of the client and print server ensures security.

According to a method of ensuring the security of a shared output unit of the present invention, a security print job is printed in the presence of a user who prepared the job. Unlike the prior art, print results of the security job will never be picked out by other users.

The present invention thus ensures the security of the shared output unit.

The method of the present invention is applicable to a client-print server environment. Even if the client has no local printer and there is only a network printer, the security of a print job is ensured as if the client is locally connected to a printer. The job is printed and delivered into a locked stacker prior to other jobs. This ensures the security of the job and convenience, minimizes the number of local printers, and improves the space efficiency of an office.

The printer of the print server of the security system according to the present invention has not only an ordinary stacker but also a locked stacker. The locked stacker is formed integrally with the print server and has a sheet outlet that is usually locked. If the client specifies the locked stacker to hold print results of a print job, the print job is queued until the locked stacker becomes available. When the locked stacker becomes available, the print job is processed. Due to the locked stacker, a user is not requested to run to the print server just after sending the print job to the print server. Namely, the user will not wait for a long time in front of the shared print server. This results in minimizing the output waiting time after inserting a print job and greatly improving the convenience of the network printer.

This system employs a controller for controlling various print jobs between the client and the print server. The controller controls the print server to handle various print jobs including those using the ordinary stacker and those using the locked stacker. Accordingly, the shared print server sufficiently functions as a local printer that ensures high security. The embodiments of the present invention preferentially output a security print job to any of the ordinary and locked stackers. In addition, a user is allowed to change the preferential output of a print job. For example, if the print job is not yet processed with respect to the locked stacker when the storage medium is installed in the print server, the user may change it to the preferential output mode to the ordinary stacker to print the job quickly.

If a stacker full sensor detects during printing a job that a remaining space in a stacker is insufficient for the job, another locked stacker may be secured to print the remaining pages of the job. If no other locked stacker is available, the print job is provided with a mark indicating the processed position of the job and is temporarily queued. Then, another job is processed with respect to the ordinary stacker. As soon as the locked stacker becomes available, the temporarily queued job is resumed. This arrangement quickly processes print jobs without leaving them incomplete for a long time.

If the locked stacker is closed for a long time, a user can open an electronic lock of the stacker and pick out print results from the stacker. This prevents the locked stacker from being closed for a long time, or from being monopolized by one user. Accordingly, this arrangement ensures smooth operation of the locked stacker, fulfills the security of print results in the locked stacker, and prevents the long waiting time.

I claim:

1. A system for maintaining security which has a plurality of clients connected to a network to designate print jobs via the network connected thereto, comprises a print server which receives the print jobs designated from said plurality of clients and executes an output process, and guarantees security concerning the output of said print server, said print server being used in common by said plurality of clients;

said print server including a storage medium drive unit for driving a storage medium having the same specifications as that of the case of said clients, and further including a locked stacker wherein a portion for taking out the output result is locked, and a stacker for an ordinary output without function for locking the output result;

said locked stacker can be designated as a destination of output concerning the print jobs that are thrown from said clients onto said network;

based upon management of a state of using said locked stacker, a process is executed on the side of said print server in regard to which locked stacker is assigned to said print job and then management data related to said print job are sent to the side of said clients, and it is possible to output said print job into the locked stacker of said print server;

after said management data are stored in said storage medium, said storage medium is separately loaded in the storage medium drive unit of said print server on the side of said clients; and upon loading said storage medium, the electronic lock of the corresponding locked stacker is unlocked to take out the output result from said locked stacker;

said system for maintaining security further comprising a control unit for controlling a variety of print jobs between said client and said print server, said control unit controlling an internal spool and an internal memory in said print server to cope with either a print job for normal output or a print job that designates said locked stacker as the destination of output, and to maintain security equivalent to that of a locally connected printer where said print server is used in common, and to provide preferential output to said stacker for an ordinary output or to said locked stacker;

wherein a maximum retention period that corresponds to a maximum value of the retention time for holding the print job as a temporarily held job is set in the internal spool of said print server after the security designated job is received for designating said locked stacker to the destination of output but before executing the output process of said print job; and wherein when the retention time for holding said print job as a temporarily held job has exceeded said maximum retention period, the security designated job corresponding to said job being temporarily held is set to either a mode of being deleted from said internal spool or a mode of being treated and output as a print job for an ordinary output after the holding of the output process of said print job has been canceled, and wherein the client is allowed to request, to said print server, a retention period for temporarily holding said print job as a temporarily held job together with the throwing of the security designated job onto the network to designate said locked stacker to the destination of output, and said print server employs said maximum retention period as a retention period to store it in the internal memory of said print server when the value of the retention period requested by the client is longer than said maximum retention period, employs said requested retention period as a retention period and stores it in the internal memory of said print server in other cases, and transmits the content stored in said internal memory to the client together with various data in order to obtain agreement between the client and the print server in regard to which one of said requested retention period or said maximum retention period be employed.

2. A system for maintaining security according to claim 1, wherein the electronic lock of said locked stacker is unlocked by safe and reliable collation checking which is based upon storage data that cannot be known from outside the common storage medium of said client and said print server.

3. A system for maintaining security according to claim 1, wherein a paper sensor is provided in the stackers that need be checked in said print server that is equipped with one or more locked stackers, in order to check whether or not the output result of said print job is reliably taken out from said stackers, and alarm is produced or preventive measure is taken to prevent said output result from not being taken out.

4. A system for maintaining security according to claim 3, wherein provision is made of a mechanism that prevents said storage medium from being taken out as a measure for preventing the output result of said print job from not being taken out.

5. A system for maintaining security according to claim 2, wherein vacant state of the locked stacker is managed for each of the locked stackers based upon the data from the paper sensors in the locked stackers in order to grasp the vacant state related to presence or absence of the papers for outputting the print job, and locked stacker needed by the client is reliably assigned or returned depending upon the management of said vacant state.

6. A system for maintaining security according to claim 2, wherein the locked stacker requested by the client is not only assigned in a fixed manner but is also assigned and returned dynamically and reliably.

7. A system for maintaining security according to claim 2, wherein the electronic lock of said locked stacker can be unlocked as required by using a storage medium storing a master code of a person who manages said print server, in order to cope with trouble in said system for maintaining security or to cope with long-term occupation of said locked stacker.

8. A system for maintaining security according to claim 1, wherein it is allowed to output again the output result of said print job by holding the data of the print job within the internal spool in said print server until said storage medium is removed from said print server, in order to cope with damage concerning the output result of the print job in said locked stacker.

9. A system for maintaining security according to claim 8, wherein said locked stackers are each provided with a paper sensor for grasping the vacant state related to the presence or absence of the papers for outputting the print job, a processed mark is imparted at a moment when it is detected by said paper sensor that the output result of said print job is taken out from said locked stacker, and the data of said storage medium related to the print job with said processed mark is deleted when said storage medium is loaded again in the client or in the print server.

10. A system for maintaining security according to claim 8, wherein said locked stackers are each provided with an intra-stacker full sensor for checking whether or not the papers for outputting said print job are fully stacked in the corresponding locked stackers, output to said locked stacker is discontinued during the output process of said print job based upon the data from said intra-stacker full sensors, and another locked stacker is assigned to output the remaining non-processed print job.

11. A system for maintaining security according to claim 10, wherein when it is not allowed to assign the print job to said another locked stacker, a mark is attached to the position of the output process-done data of said print job, another job is processed while temporarily holding said print job, and when any locked stacker is placed in an empty state, the output result of the print job corresponding to said temporarily held job is output into said locked stacker.

12. A system for maintaining security according to claim 1, wherein said client is allowed to determine a mode of output process of said print job thrown onto said network by inquiring said print server whether said locked stacker can be utilized or not prior to transmitting the security designated job that designates said locked stacker to the destination of output.

13. A system for maintaining security according to claim 1, wherein the client is allowed, at the same time, to request, to said print server, a method of handling said security designated job as to whether or not security designated job corresponding to said temporarily held job should be deleted from the internal spool in said print server after said employed retention period has passed or be handled and output as a print job for or ordinary output after the holding of the output process of said print job has been canceled, and when the method of handling said security designated job is requested from said client and when the time for holding said print job as a temporarily held job has exceeded said maximum retention period, said print server regards the contents requested by the client to be effective taking the precedence over the process of setting either to a mode of deleting the security designated job that corresponds to said temporarily held job from said internal spool or a mode of handling and outputting the security designated job as a print job for an ordinary output after the holding of the output process of said print job has been canceled, and when no request is issued from the client, said print server regards the contents of the process that should be set to either one of said modes to be effective, and stores it in the internal memory in said print server and sends it to the client together with various data.

14. A system for maintaining security which has a plurality of clients connected to a network to designate print jobs via the network connected thereto, comprises a print server which receives the print jobs designated from said plurality of clients and executes an output process, and guarantees security concerning the output of said print server, said print server being used in common by said plurality of clients;

said print server including a storage medium drive unit for driving a storage medium having the same specifications as that of the case of said clients, and further including a locked stacker wherein a portion for taking out the output result is locked, and a stacker for an ordinary output without function for locking the output result;

said locked stacker can be designated as a destination of output concerning the print jobs that are thrown from said clients onto said network;

based upon management of a state of using said locked stacker, a process is executed on the side of said print server in regard to which locked stacker is assigned to said print job and then management data related to said print job are sent to the side of said clients, and it is possible to output said print job into the locked stacker of said print server;

after said management data are stored in said storage medium, said storage medium is separately loaded in the storage medium drive unit of said print server on the side of said clients; and upon loading said storage medium, the electronic lock of the corresponding locked stacker is unlocked to take out the output result from said locked stacker;

when said locked stacker was designated as a destination of output, said print server being able to designate an operation for changing a mode of the subsequent output process concerning a print job that is being output or is going to be output to said locked stacker;

when the print job is not yet printed, the print server displays status and a mode in the control block related to a process to be carried out later, a user may manipulate a panel to change settings of the control block and the control data of the spool device, the user selecting one of the modes:
  a) wait until the locked stacker becomes available;
  b) preferentially output the print job into the ordinary stacker;
  c) switch to the ordinary stacker; and
  d) cancel the job;

wherein a maximum retention period that corresponds to a maximum value of the retention time for holding the print job as a temporarily held job is set in the internal spool of the said print server after the security designated job is received for designating said locked stacker to the destination of output but before executing the output process of said print job, and wherein when the retention time for holding said print job as a temporarily held job has exceeded said maximum retention period, the security designated job corresponding to said job being temporarily held is set to either a mode of being deleted from said internal spool or a mode of being treated and output as a print job for an ordinary output after the holding of the output process of said print job has been canceled; and wherein the client is allowed to request, to said print server, a retention period for temporarily holding said print job as a temporarily held job together with the throwing of the security designated job onto the network to designate said locked stacker to the destination of output, and said print server employs said maximum retention period as a retention period to store it in the internal memory of said print sever when the value of the retention period requested by the client is longer than said maximum retention period, employs said requested retention period as a retention period and stores it in the internal memory of said print server in other cases, and transmits the content stored in said internal memory to the client together with various data in order to obtain agreement between the client and the print server in regard to which one of said requested retention period or said maximum retention period be employed.

15. A system for maintaining security according to claim 14, wherein the electronic lock of said locked stacker is unlocked by safe and reliable collation checking which is based upon storage data that cannot be known from outside the common storage medium of said client and said print server.

16. A system for maintaining security according to claim 14, wherein a paper sensor is provided in the stackers that need be checked in said print server that is equipped with one or more locked stackers, in order to check whether or not the output result of said print job is reliably taken out from said stackers, and alarm is produced or preventive measure is taken to prevent said output result from not being taken out.

17. A system for maintaining security according to claim 16, wherein provision is made of a mechanism that prevents said storage medium from being taken out as a measure for preventing the output result of said print job from not being taken out.

18. A system for maintaining security according to claim 15, wherein vacant state of the locked stacker is managed for each of the locked stackers based upon the data from the paper sensors in the locked stackers in order to grasp the vacant state related to presence or absence of the papers for outputting the print job, and locked stacker needed by the client is reliably assigned or returned depending upon the management of said vacant state.

19. A system for maintaining security according to claim 15, wherein the locked stacker requested by the client is not only assigned in a fixed manner but is also assigned and returned dynamically and reliably.

20. A system for maintaining security according to claim 15, wherein the electronic lock of said locked stacker can be unlocked as required by using a storage medium storing a master code of a person who manages said print server, in order to cope with trouble in said system for maintaining security or to cope with long-term occupation of said locked stacker.

21. A system for maintaining security according to claim 14, wherein it is allowed to output again the output result of said print job by holding the data of the print job within the internal spool in said print server until said storage medium is removed from said print server, in order to cope with damage concerning the output result of the print job in said locked stacker.

22. A system for maintaining security according to claim 21, wherein said locked stackers are each provided with a paper sensor for grasping the vacant state related to the presence or absence of the papers for outputting the print job, a processed mark is imparted at a moment when it is detected by said paper sensor that the output result of said print job is taken out from said locked stacker, and the data of said storage medium related to the print job with said processed mark is deleted when said storage medium is loaded again in the client or in the print server.

23. A system for maintaining security according to claim 21, wherein said locked stackers are each provided with an intra-stacker full sensor for checking whether or not the papers for outputting said print job are fully stacked in the corresponding locked stackers, output to said locked stacker is discontinued during the output process of said print job based upon the data from said intra-stacker full sensors, and another locked stacker is assigned to output the remaining non-processed print job.

24. A system for maintaining security according to claim 23, wherein when it is not allowed to assign the print job to said another locked stacker, a mark is attached to the position of the output process-done data of said print job, another job is processed while temporarily holding said print job, and when any locked stacker is placed in an empty state, the output result of the print job corresponding to said temporarily held job is output into said locked stacker.

25. A system for maintaining security according to claim 14, wherein said client is allowed to determine a mode of output process of said print job thrown onto said network by inquiring said print server whether said locked stacker can be utilized or not prior to transmitting the security designated job that designates said locked stacker to the destination of output.

* * * * *